US011771014B2

(12) United States Patent
Neuhoff, Jr.

(10) Patent No.: US 11,771,014 B2
(45) Date of Patent: Oct. 3, 2023

(54) AUTOMATED HYDROPONICS SYSTEM

(71) Applicant: Robert V. Neuhoff, Jr., Van Alstyne, TX (US)

(72) Inventor: Robert V. Neuhoff, Jr., Van Alstyne, TX (US)

(*) Notice: Subject to any disclaimer, the term of this patent is extended or adjusted under 35 U.S.C. 154(b) by 0 days.

(21) Appl. No.: 17/840,445

(22) Filed: Jun. 14, 2022

(65) Prior Publication Data

US 2022/0304245 A1 Sep. 29, 2022

Related U.S. Application Data

(63) Continuation of application No. 16/746,684, filed on Jan. 17, 2020, now Pat. No. 11,363,761.

(60) Provisional application No. 62/793,489, filed on Jan. 17, 2019.

(51) Int. Cl.
*A01G 31/06* (2006.01)
*A01G 7/04* (2006.01)
*A01G 31/04* (2006.01)
*F16M 13/02* (2006.01)

(52) U.S. Cl.
CPC .......... *A01G 7/045* (2013.01); *A01G 31/045* (2013.01); *A01G 31/06* (2013.01); *F16M 13/02* (2013.01)

(58) Field of Classification Search
CPC ...... A01G 31/045; A01G 7/045; A01G 31/06; F16M 13/022; F16M 13/02
USPC ............. 211/191; 248/220.21, 224.8, 225.11
See application file for complete search history.

(56) References Cited

U.S. PATENT DOCUMENTS

| | | |
|---|---|---|
| 6,227,400 B1 | 5/2001 | Paladino |
| 6,325,350 B1 | 12/2001 | Mancuso |
| 6,637,170 B2 | 10/2003 | Ito |
| 8,042,776 B2 | 10/2011 | Johnson |
| 8,234,812 B1 | 8/2012 | Colless et al. |
| 8,627,598 B1 | 1/2014 | Souder |
| 9,169,961 B1 | 10/2015 | Jiang |
| 9,241,453 B1 | 1/2016 | Martin |
| 9,775,330 B1 | 10/2017 | Chen |
| 10,004,187 B1 | 6/2018 | Van Wingerden |
| 10,407,243 B1 | 9/2019 | Prout |
| 11,076,537 B2 * | 8/2021 | Glennerster ........... A01G 9/023 |
| 2007/0125921 A1 | 6/2007 | Wisen |
| 2008/0179476 A1 | 7/2008 | McGinness et al. |
| 2011/0116213 A1 | 5/2011 | Tai et al. |
| 2012/0261534 A1 | 10/2012 | Ozturk |
| 2013/0112826 A1 | 5/2013 | Johnson |
| 2015/0116997 A1 | 4/2015 | Tappert et al. |

(Continued)

*Primary Examiner* — Monica L Perry
*Assistant Examiner* — Megan J Moroney
(74) *Attorney, Agent, or Firm* — Ferguson Braswell Fraser Kubasta PC

(57) ABSTRACT

An apparatus is provided. There is a substantially rectangular frame having a plurality of corners with a light panel that is secured to the frame. Brackets a first opening are secured to each corner. Mounting members are secured to the brackets. The mounting members have: a first body; a second and third aligned openings formed in the first body; a fourth opening formed in the first body; and a plurality of second bodies, where each second body extends from the bottom face of the first body. Also, each second body includes a front and a rear, wherein the front of each second body is at least partially set back from the front face of the first body, and wherein the rear of each second body is substantially aligned with the rear face of the first body.

20 Claims, 78 Drawing Sheets

(56) References Cited

U.S. PATENT DOCUMENTS

| | | |
|---|---|---|
| 2017/0055461 A1* | 3/2017 | Neuhoff, Jr. .......... A01G 31/042 |
| 2017/0339846 A1 | 11/2017 | Lawrence et al. |
| 2018/0007850 A1 | 1/2018 | Dufresne et al. |
| 2018/0235156 A1* | 8/2018 | Blair .................... A01G 27/003 |
| 2019/0075735 A1 | 3/2019 | Ma |
| 2019/0166770 A1 | 6/2019 | Spiro |
| 2019/0307077 A1 | 10/2019 | Lert, Jr. et al. |
| 2019/0326849 A1 | 10/2019 | Gideon |
| 2019/0387689 A1 | 12/2019 | Matera et al. |

* cited by examiner

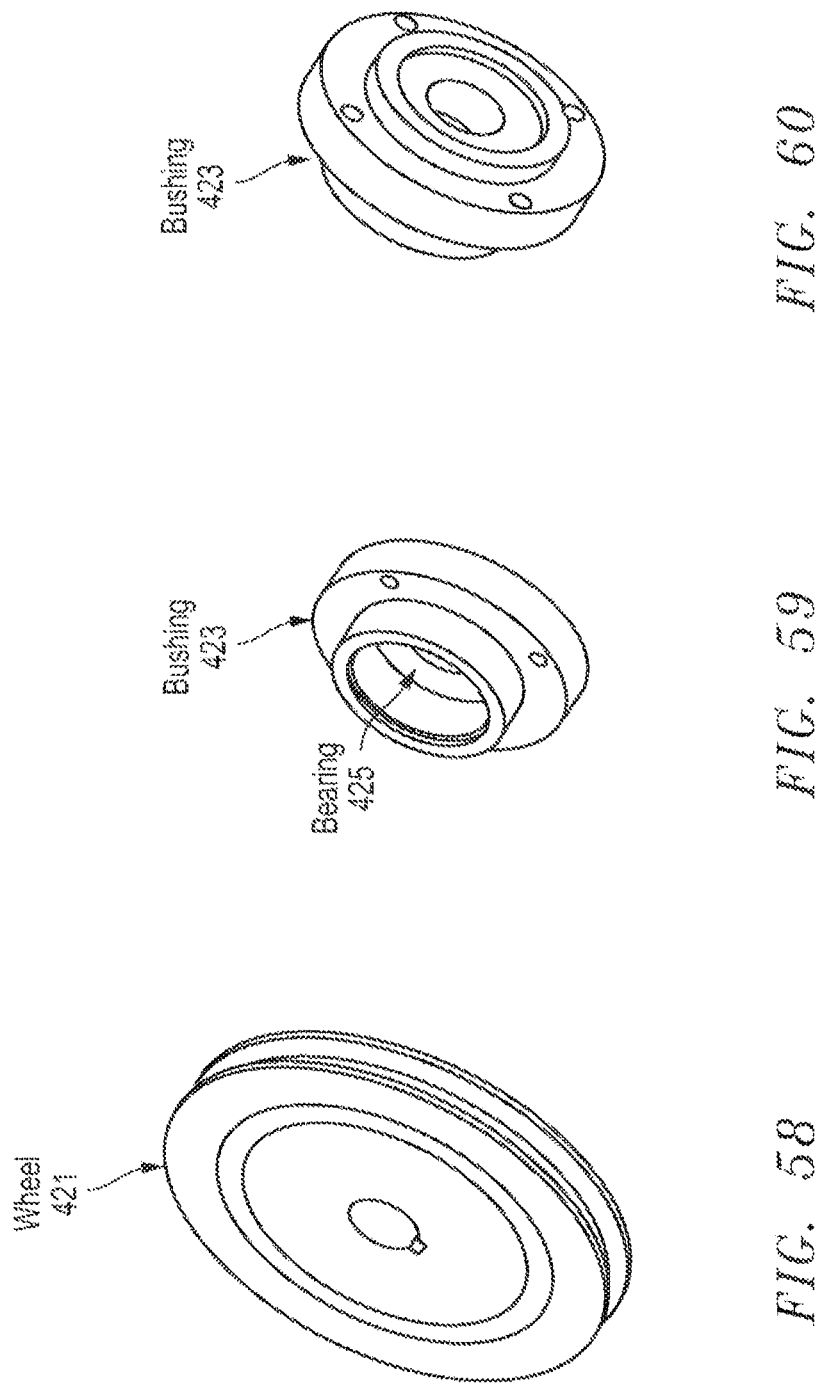

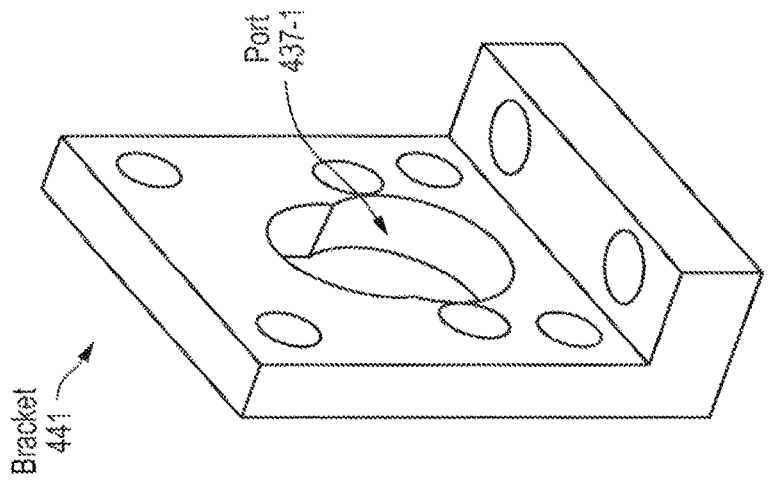
FIG. 66
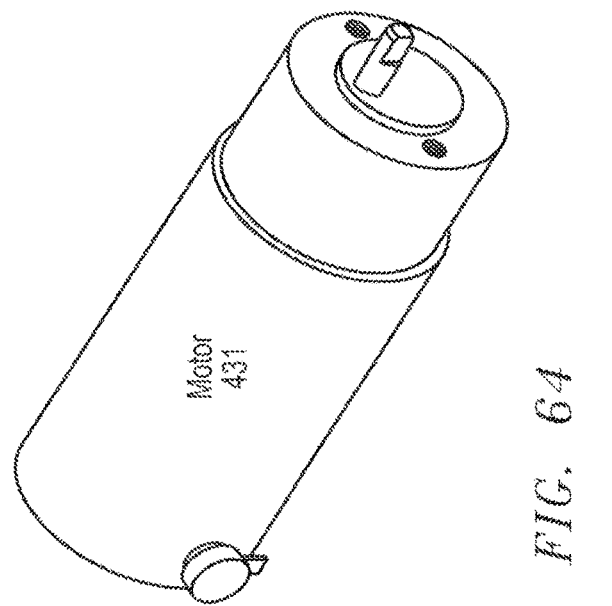
FIG. 64
FIG. 65

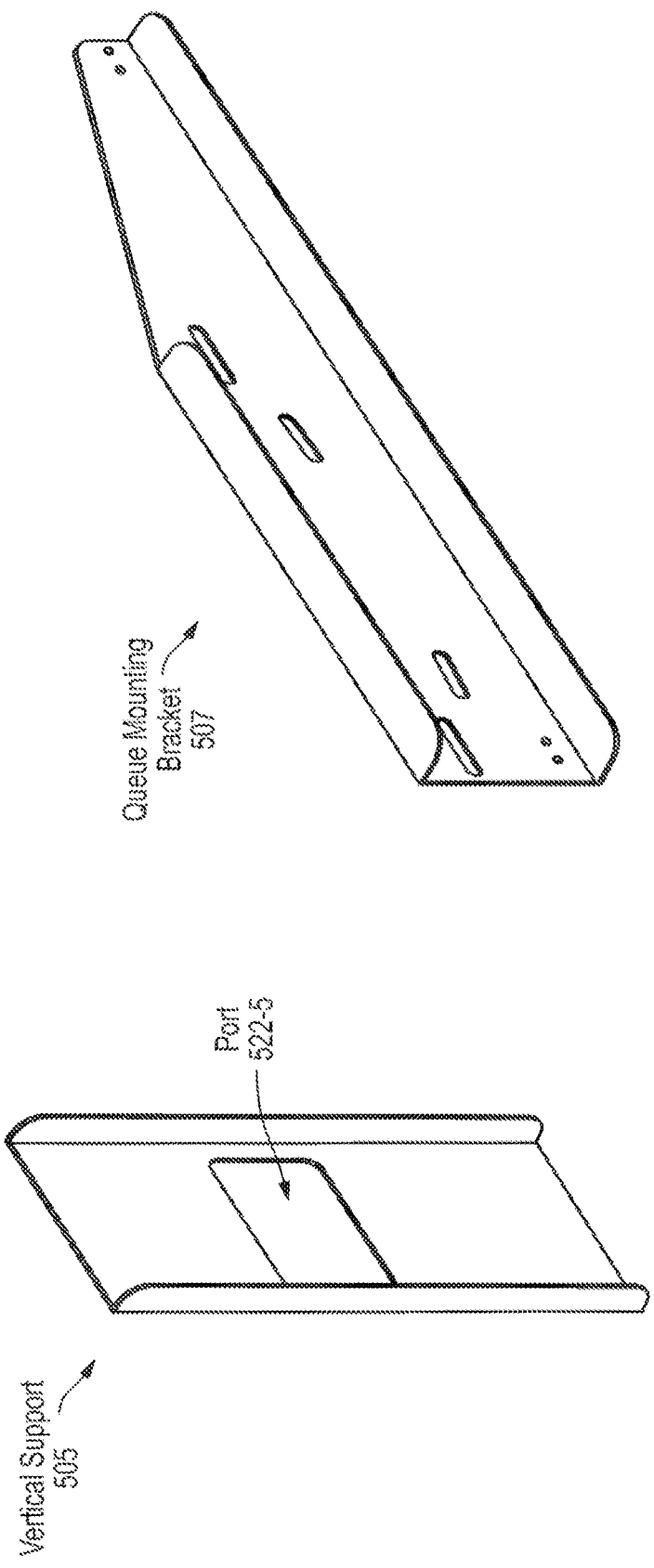

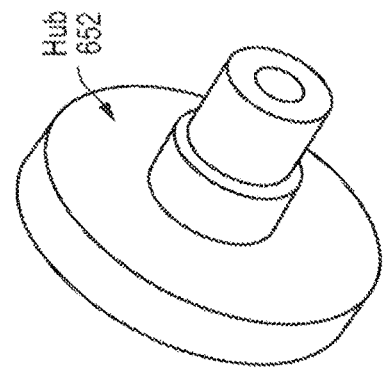
FIG. 111
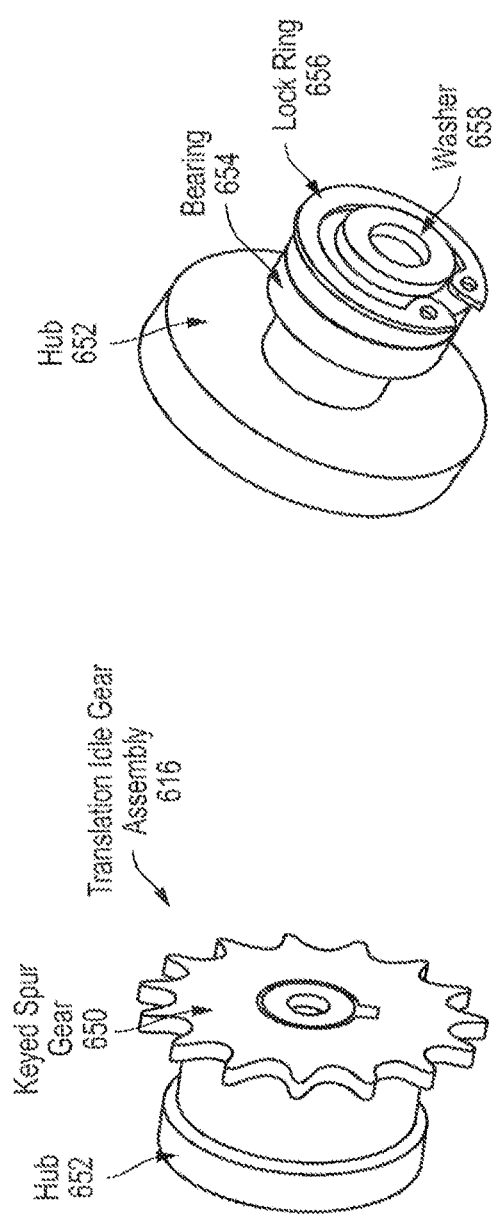
FIG. 110
FIG. 108
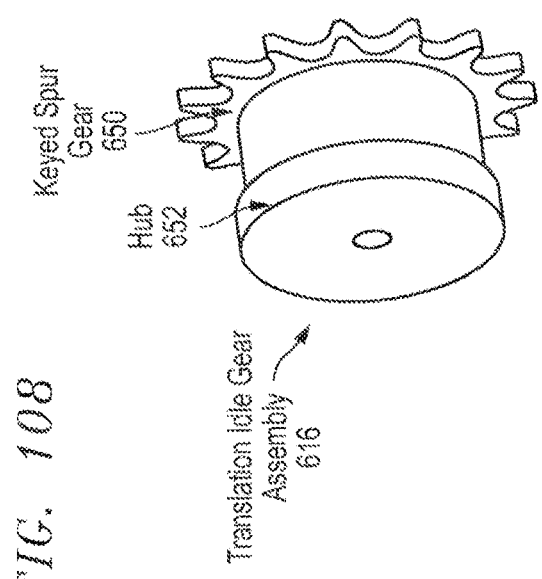
FIG. 109

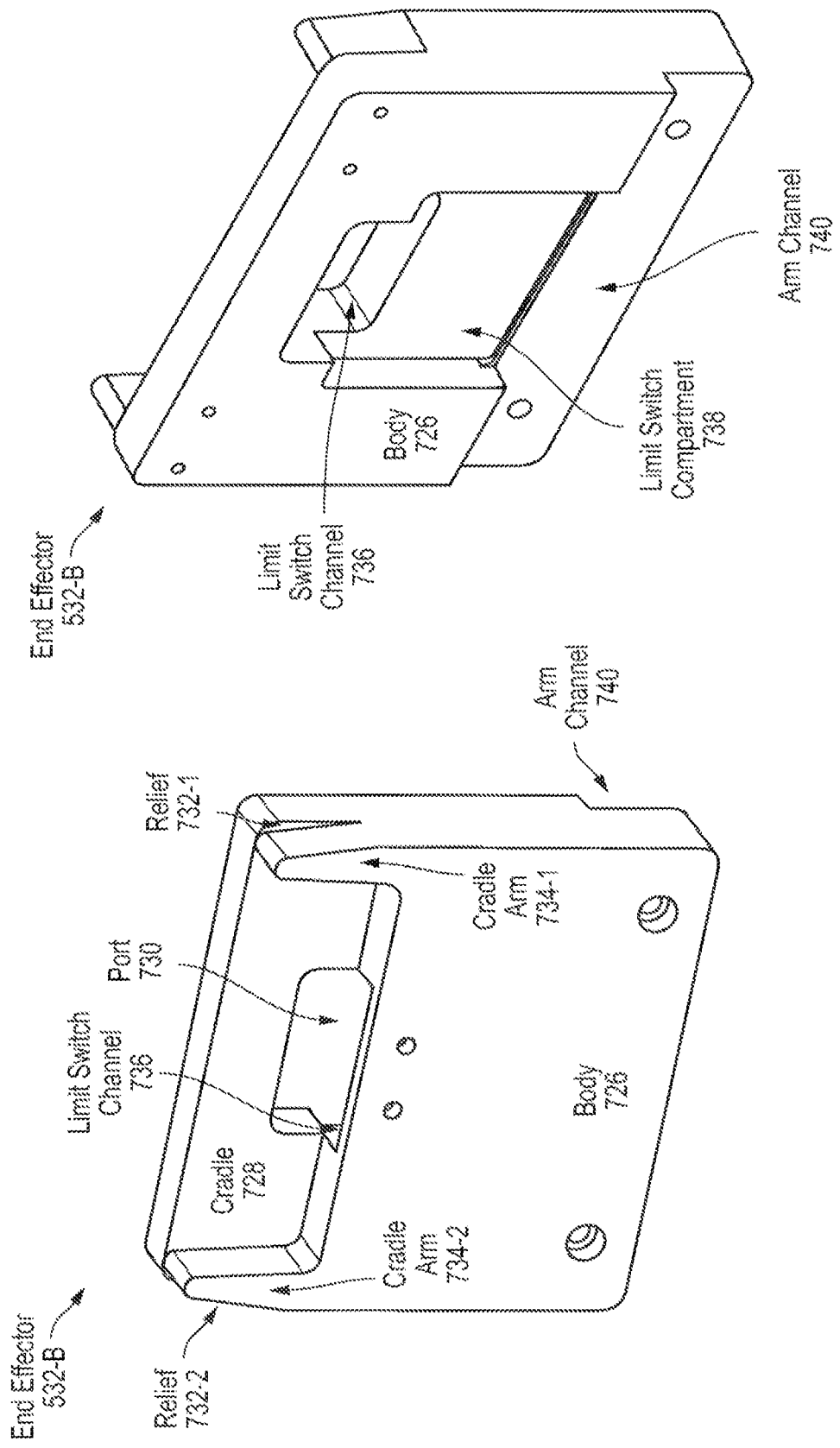

US 11,771,014 B2

AUTOMATED HYDROPONICS SYSTEM

CROSS-REFERENCE

This application is a continuation of U.S. patent application Ser. No. 16/746,648 entitled "AUTOMATED HYDROPONICS SYSTEM" filed on Jan. 17, 2020, which claims priority to U.S. Patent Application Ser. No. 62/793,489, entitled "AUTOMATED HYDROPONICS SYSTEM," filed on Jan. 17, 2019, all of which are hereby incorporated by reference for all purposes.

TECHNICAL FIELD

The invention relates generally to industrial automation and, more particularly, to automated industrial-scale hydroponics machinery.

BACKGROUND

Industrial automation has become increasingly used in agriculture, and, similarly, hydroponics and aquaponics has been the subject of projects in the maker movement. Yet, there has been very little development in industrial-scale hydroponics equipment. One example of an existing system that employs industrial robotics is Iron Ox Most of the http://ironox.com/produce.html. Many of these operations, though, require substantial manual labor. Thus, there is a need for additional automation equipment in the industrial agriculture space.

SUMMARY

An embodiment of the present disclosure, accordingly, provides an apparatus comprising: a substantially rectangular frame having a plurality of corners; a light panel that is secured to the frame; a plurality of brackets, wherein each bracket is secured to each corner, wherein each bracket includes first and second substantially rectangular plates that are perpendicular to one another, and wherein the first plate includes a first opening positioned substantially at the center of the first plate, and a plurality of mounting members, wherein each mounting member includes: a first body having a top face, a bottom face, and a front face, and rear face, wherein the top and bottom sides of the first body are substantially parallel to one another, and wherein the front and rear faces of the first body are substantially parallel to one another, and wherein the front side of the first body extends between and is substantially perpendicular to the top and bottom sides of the first body; a second opening formed substantially in the center front side of the first body and that extends into the first body; a third opening formed substantially in the center of the top side of the first body and that extends into the first body, and wherein the first body is secured to the first plate such that the third opening is substantially aligned with the first opening; a fourth opening formed in the bottom face of the first body and that extends into the first body, wherein the fourth opening is substantially aligned with the third opening, and wherein the second and fourth openings intersect; and a plurality of second bodies, wherein each second body extends from the bottom face of the first body, and wherein each second body includes a front and a rear, wherein the front of each second body is at least partially set back from the front face of the first body, and wherein the rear of each second body is substantially aligned with the rear face of the first body.

In accordance with an embodiment of the present disclosure, the front of each second body further comprises: an aligned face that is substantially aligned with the front face of the first body; a setback face that is substantially parallel to and spaced apart from the first face of the first body; and a channel formed between the aligned and setback faces.

In accordance with an embodiment of the present disclosure, the channel is substantially J-shaped.

In accordance with an embodiment of the present disclosure, the third and fourth openings are substantially circular, and wherein the third opening has a smaller diameter than the fourth opening, and wherein at least one of the mounting members further comprises an electrically conductive insert that is secured to the at least one of the mounting members in its fourth opening.

In accordance with an embodiment of the present disclosure, the light panel is electrically coupled to the insert through the third opening of the at least one of the mounting members.

In accordance with an embodiment of the present disclosure, the light panel further comprises: a housing that is secured to the frame; and a plurality of light emitting diodes (LEDs) secured to the housing that have emit a spectrum selected for plant growth.

In accordance with an embodiment of the present disclosure, the light panel further comprises a plurality of light panels.

In accordance with an embodiment of the present disclosure, each mounting member further comprises an electrically conductive insert that is secured to the at least one of the mounting members in its fourth opening.

In accordance with an embodiment of the present disclosure, an apparatus is provided. The apparatus comprises: a grow frame having first and second ends; a plurality of troughs secured to the first frame and arranged in a vertical stack on a plurality of levels, wherein each trough extends between the first and second ends of the grow frame, wherein each trough includes a reservoir; a plurality of socket assemblies, wherein each socket assembly is positioned to correspond to at least one trough, and wherein each socket assembly includes: a first dolly guide rail that is secured to the first frame; a second dolly guide rail that is secured to the first frame, wherein the first and second dolly guide rails are substantially parallel to one another, and wherein the first and second dolly guide rails are spaced apart from one another by a distance; a first set of lamp supports that is secured to the first dolly guide rail; and a second set of lamp supports that is secured to the second dolly guide rail; a service frame positioned proximate the first end of the first frame; a queue; a loader that is secured to the queue, wherein the loader has: a service lifter that is secured to the service frame, wherein the service lifter is configured to travel between the plurality of levels; a carriage that is secured to the service lifter, wherein the carriage is configured to move a tray between the queue and an aligned trough assembly from the plurality of trough assemblies; a first dolly staging rail that is secured to the service lifter; and a second dolly staging rail that is secured to the service lifter, wherein the first and second dolly staging rails are substantially parallel to one another, and wherein the first and second dolly staging rails are spaced apart from one another by the distance; and a light maintenance dolly that is secured to the loader, the light maintenance dolly including: a rolling frame that is dimensioned to span the distance, wherein the rolling frame is configured to rest on the first and second dolly staging rails during travel between the plurality of levels; a first and second lift arms that are substantially parallel to one another; and a plurality of panel lifters, wherein each panel lifter is secured to at the rolling frame and at least one of the first and second lift arms.

In accordance with an embodiment of the present disclosure, the apparatus further comprises a light assembly secured to the socket assembly, and wherein the first and second sets of lamp supports are positioned to support the light assembly that extends between the first and second dolly guide rails.

In accordance with an embodiment of the present disclosure, an apparatus is provided. The apparatus comprises a grow frame having first and second ends; a plurality of troughs secured to the first frame and arranged in a vertical stack on a plurality of levels, wherein each trough extends between the first and second ends of the grow frame, wherein each trough includes a reservoir; a plurality of socket assemblies, wherein each socket assembly is positioned to correspond to at least one trough, and wherein each socket assembly includes: a first dolly guide rail that is secured to the first frame; a second dolly guide rail that is secured to the first frame, wherein the first and second dolly guide rails are substantially parallel to one another, and wherein the first and second dolly guide rails are spaced apart from one another by a distance; a first sets of lamp supports that is secured to the first dolly guide rail; and a second set of lamp supports that is secured to the second dolly guide rail; a service frame positioned proximate the first end of the first frame; a queue, a loader that is secured to the queue, wherein the loader has a service lifter that is secured to the service frame, wherein the service lifter is configured to travel between the plurality of levels, a carriage that is secured to the service lifter, wherein the carriage is configured to move a tray between the queue and an aligned trough assembly from the plurality of trough assemblies; a first dolly staging rail that is secured to the service lifter; and a second dolly staging rail that is secured to the service lifter, wherein the first and second dolly staging rails are substantially parallel to one another, and wherein the first and second dolly staging rails are spaced apart from one another by the distance; a light maintenance dolly that is secured to the loader, the light maintenance dolly including: a rolling frame that is dimensioned to span the distance, wherein the rolling frame is configured to rest on the first and second dolly staging rails during travel between the plurality of levels; a first and second lift arms that are substantially parallel to one another; and a plurality of panel lifters, wherein each panel lifter is secured to at the rolling frame and at least one of the first and second lift arms, and wherein each panel lifter includes: an upper mounting bracket with a top face and a bottom face, wherein the upper mounting bracket has: a first opening formed in the bottom face of upper mounting bracket and that extends into the upper mounting bracket; a second opening formed in the top face of the upper mounting bracket and that extends into the upper mounting bracket, wherein the second opening is substantially aligned with the first opening, and wherein the second opening is smaller than the first opening, and wherein the first and second openings intersect; and a third opening that extends through the upper mounting bracket from its top face to its bottom face, wherein the third opening is spaced apart from the first and second openings; a lower mounting bracket with a top face, a bottom face, and a rear face, wherein the lower mounting bracket has: a plurality of motor mount openings that extend through the lower mounting bracket from the top face to the bottom face; a fourth opening formed in the bottom face of the lower mounting bracket and that extends into the lower mounting bracket; a fifth opening formed in the top face of the lower mounting bracket and that extends into the lower mounting bracket, wherein the fourth opening is substantially aligned with the fifth opening, and wherein the fifth opening is smaller than the fourth opening, and wherein the fourth and fifth openings intersect; a relief formed in the lower mounting bracket that extends from the rear face of the lower mounting bracket to the fourth and fifth openings; a countersunk tap formed in the read face of the lower mounting bracket and that extends through the lower mounting bracket, wherein the counter sunk tap extends across the relief; and a sixth opening that extends through the lower mounting bracket from its top face to its bottom face, wherein the sixth opening is spaced apart from the fourth and fifth openings; a lift bracket with a top face and a bottom face, wherein the lift bracket includes seventh and eighth openings that extend through the lift bracket from its top face to its bottom face; a first bearing secured in the seventh opening; a linkage secured in the eighth opening; a guide that extends through the first bearing and that is secured in the third and sixth openings; a second bearing secured in the first opening; a third bearing secured in the fourth opening; a leadscrew having a first shoulder and a second shoulder with a threaded member extending therebetween, wherein the first shoulder extends through the second bearing and at least a portion of the second opening, and wherein the second shoulder extends through the third bearing and the fifth opening, and wherein the threaded member extends through and engages the linkage; a motor secured to the lower mounting bracket through plurality of motor mount openings, wherein the motor has a drive shaft; and a transmission that is secured to the drive shaft and the second shoulder; a light assembly secured to the socket assembly, and wherein the first and second sets of lamp supports are positioned to support the light assembly that extends between the first and second dolly guide rails, wherein the light assembly includes: a substantially rectangular frame having a plurality of corners; a light panel having: a housing that is secured to the frame; and a plurality of LEDs secured to the housing that have emit a spectrum selected for plant growth; a plurality of brackets, wherein each bracket is secured to each corner, wherein each bracket includes first and second substantially rectangular plates that are perpendicular to one another, and wherein the first plate includes a first opening positioned substantially at the center of the first plate; and a plurality of mounting members, wherein each mounting member includes: a first body having a top face, a bottom face, and a front face, and rear face, wherein the top and bottom sides of the first body are substantially parallel to one another, and wherein the front and rear faces of the first body are substantially parallel to one another, and wherein the front side of the first body extends between and is substantially perpendicular to the top and bottom sides of the first body; a second opening formed substantially in the center front side of the first body and that extends into the first body;

a third opening formed substantially in the center of the top side of the first body and that extends into the first body, and wherein the first body is secured to the first plate such that the third opening is substantially aligned with the first opening; a fourth opening formed in the bottom face of the first body and that extends into the first body, wherein the fourth opening is substantially aligned with the third opening, and wherein the second and fourth openings intersect; and a plurality of second bodies, wherein each second body extends from the bottom face of the first body, and wherein each second body includes a front and a rear, wherein the front of each second body is at least partially set back from the front face of the first body, and wherein the rear of each second body is substantially aligned with the rear face of the first body.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 29 through 75 depict an example of the light maintenance dolly of FIGS. 18 and 19;

FIGS. 76 through 81 depict an example of the superstructure of the working assembly of FIGS. 18 and 19;

FIGS. 96 through 113 depict an example of the queuing assembly of FIGS. 18 and 19;

FIGS. 115 through 127 depict an alternate example for the carriage loader arm of the loading assembly of FIG. 112.

DETAILED DESCRIPTION

Figure 1:
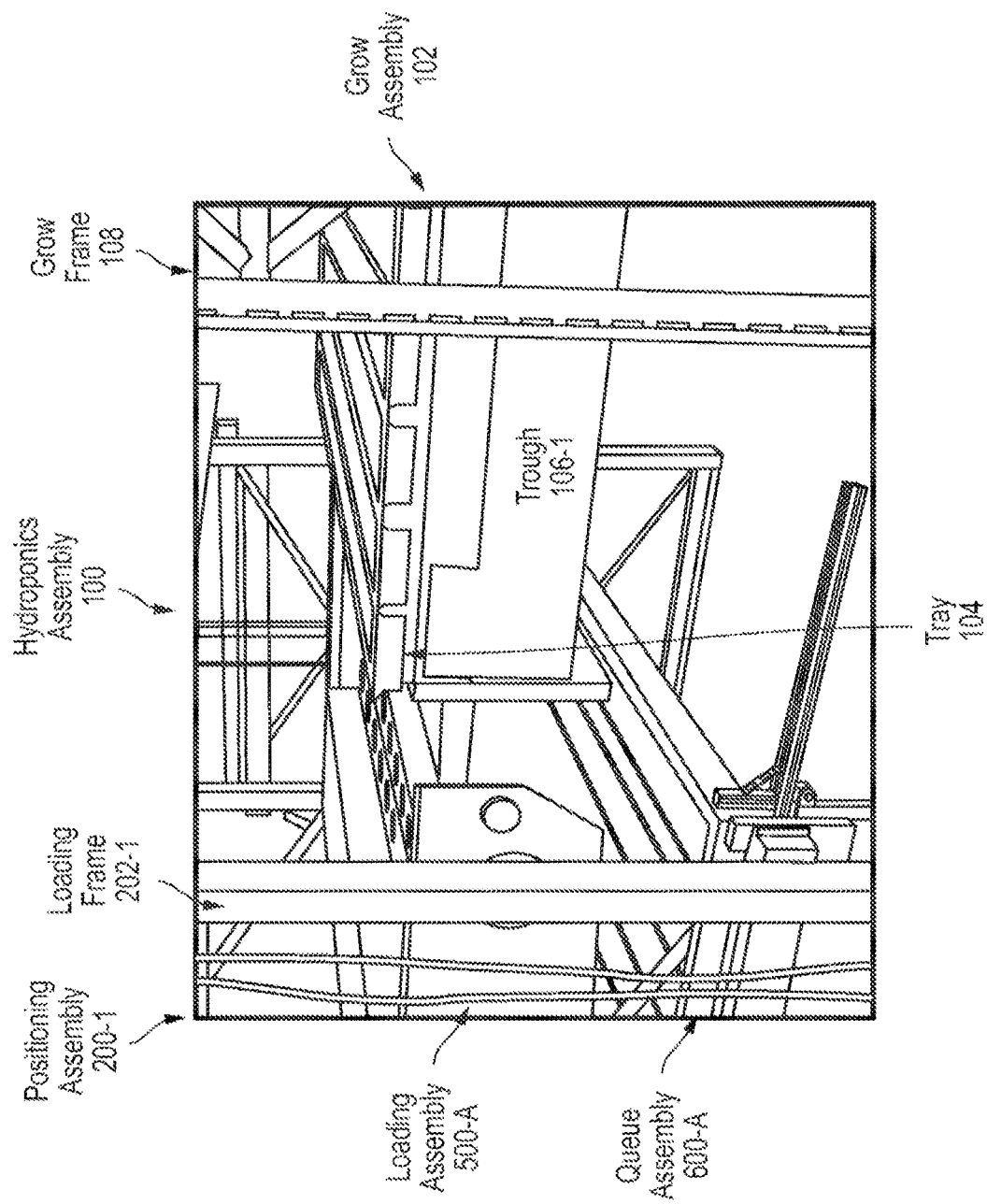
FIG. 1 is an example of a hydroponics assembly.

Refer now to the drawings wherein depicted elements are, for the sake of clarity, not necessarily shown to scale and wherein like or similar elements are designated by the same reference numeral through the several views.

Figure 2:
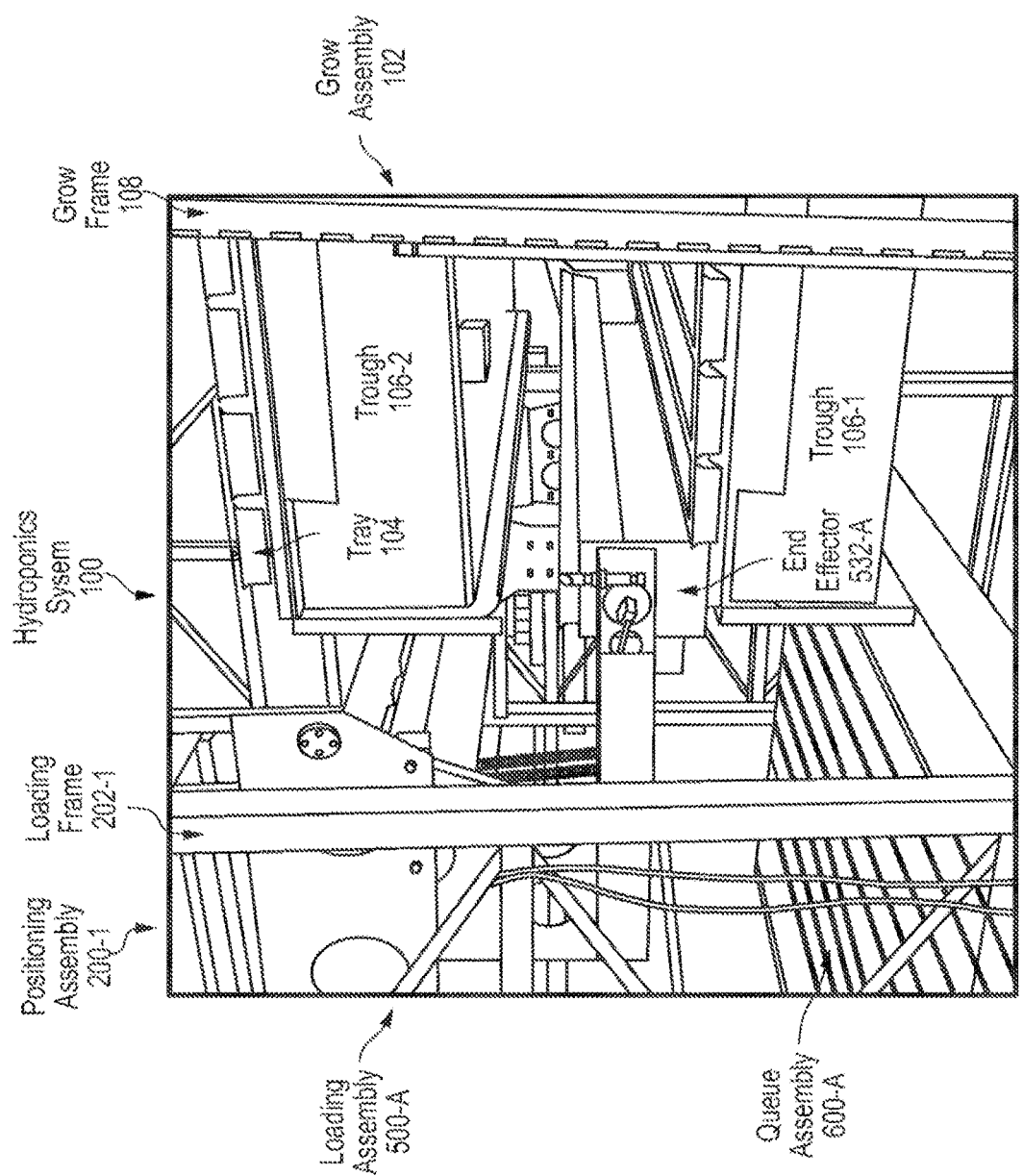
FIG. 2 is an example of tray loading with the hydroponics assembly of FIG. 1.
Figure 3:
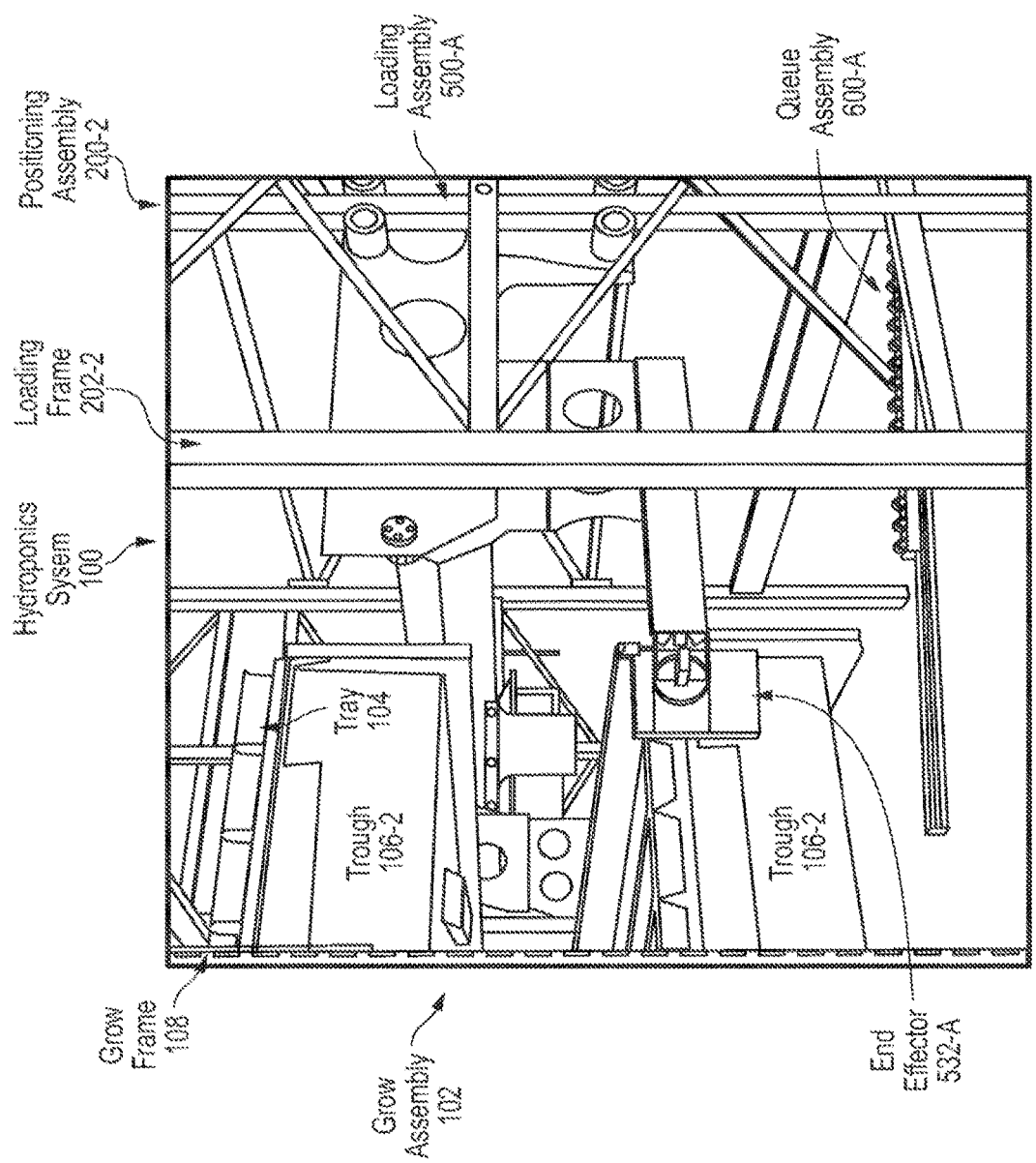
FIG. 3 is an example of tray unloading with the hydroponics assembly of FIG. 1.
Figure 4:
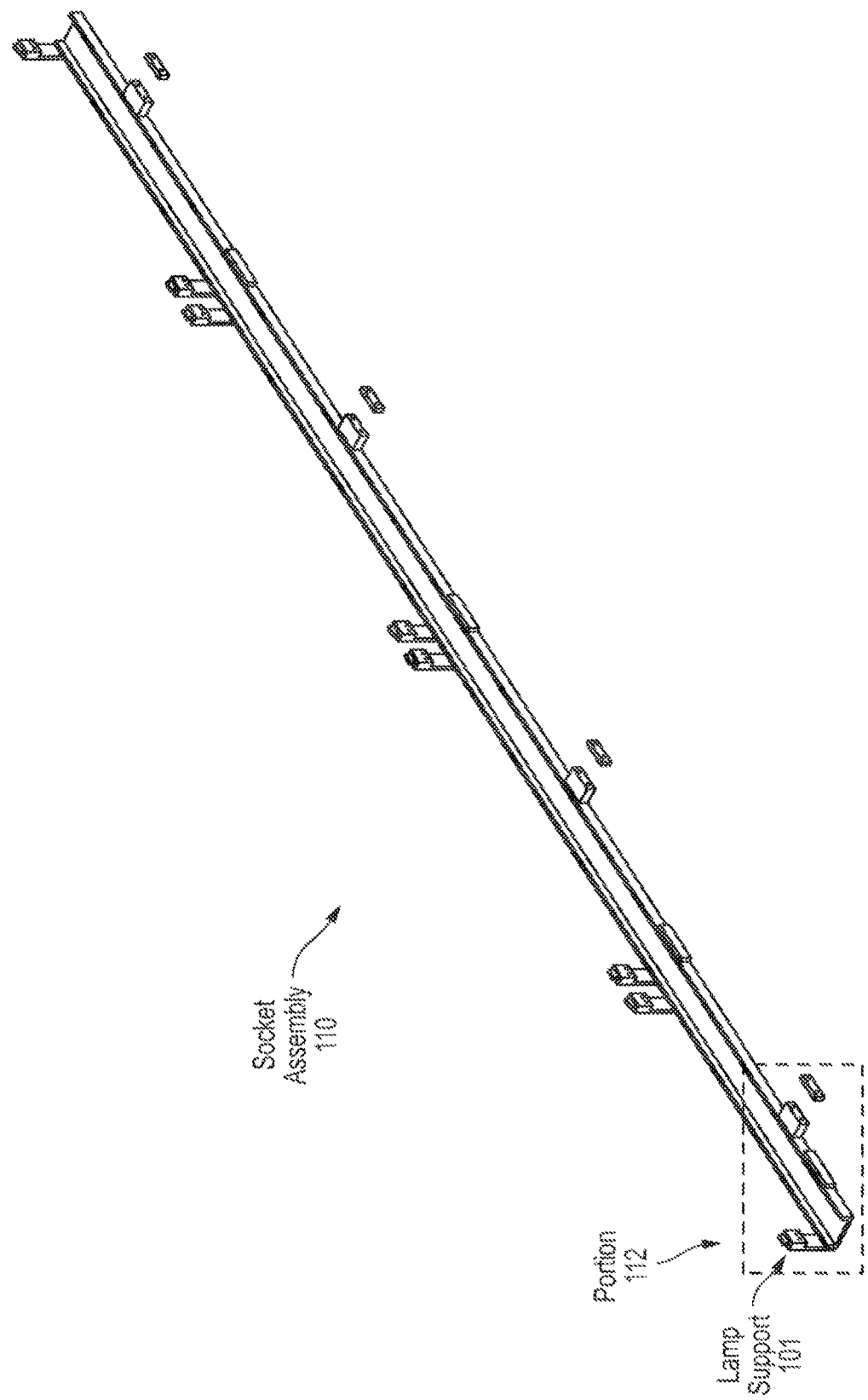
FIGS. 4 through 13 depict an example of a socket assembly used with the grow assembly for the hydroponics assembly of FIG. 1.
Figure 5:
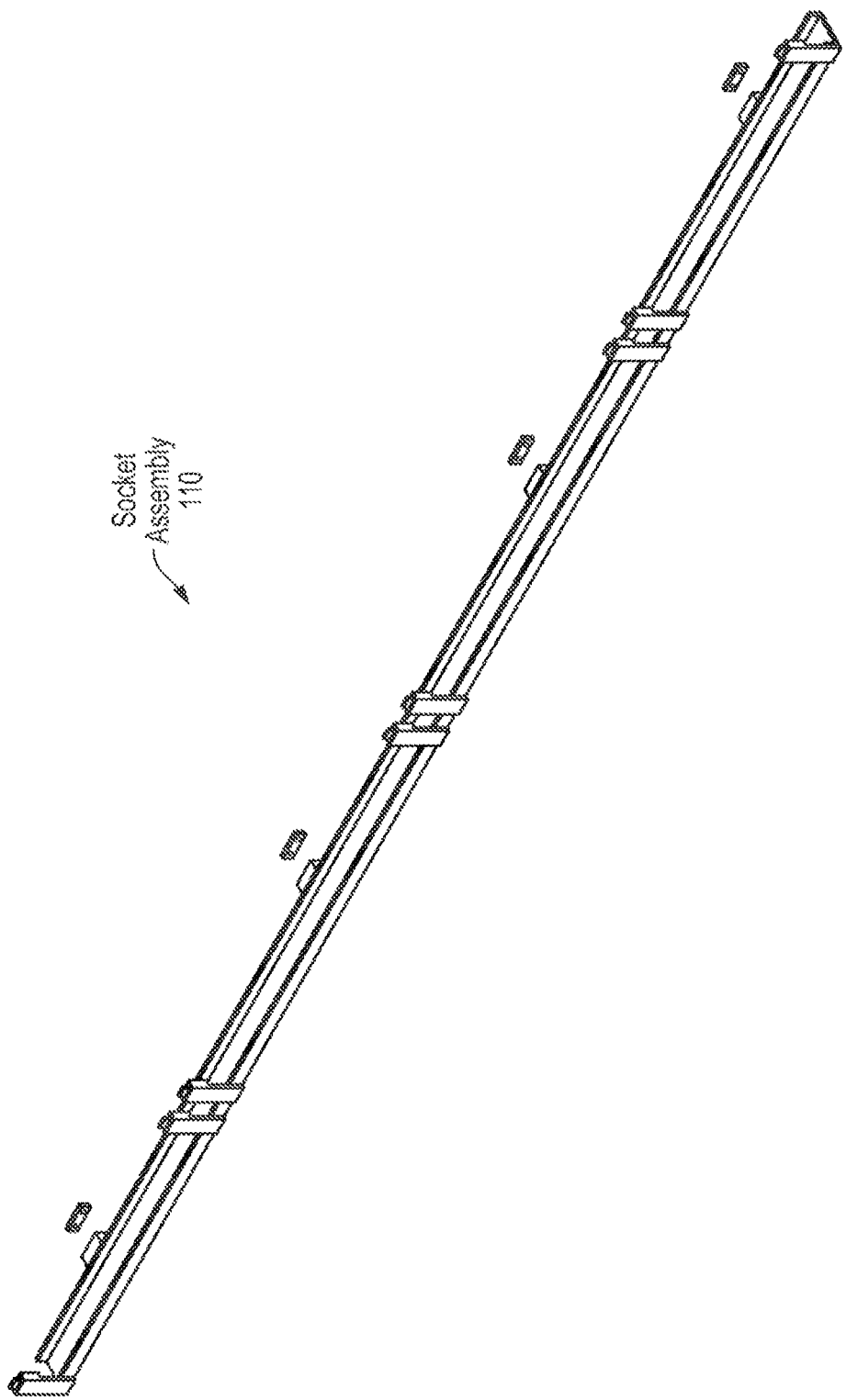

Turning to FIGS. 1 through 3, an example of a hydroponics assembly 100 in accordance with the present disclosure is shown. The hydroponics assembly 100 can be comprised of a pair of positioning assemblies 200-1 and 200-2 and a grow assembly 102. The grow assembly 102 is generally comprised of a several growing levels where plants may be grown. These levels are arranged vertically with each level having a trough 106 (e.g., trough 106-1 and 106-2). Typically, the troughs 106 are secured to the grow frame 108 (e.g., by welding, bolting, brazing, or gluing. The troughs 106 typically have a width dimensioned to hold a grow tray 104 and typically have a length sufficient to allow maturation of a specific species of plant (e.g., lettuce). Alternatively, the combined lengths of multiple troughs 106 (which may be spanned across multiple levels) may be sufficient to allow plant maturation. There may also be multiple troughs 106 per level. Each trough 106, either by itself, or in combination with other troughs, has a reservoir that is configured to hold a nutrient rich water adapted to allow the plants to gather nutrients and water through the roots which extend from the trays 104. Typically, the trays 104 sit above so as to allow the roots to extend into the nutrient rich water or float on the nutrient rich water within the reservoirs of the troughs 106, but may ride on a series of rollers included in rails secured to the top of the long sides of the troughs 106.

As shown in this example assembly 100, the grow assembly 102 has two ends: a loading end and an unloading end. The positioning assemblies 200-1 and 200-2 are positioned proximate the ends of the grow assembly 102 so as to service the grow assembly 102. In other words, the positioning assembly 200-1 generally has the ability to either place or remove trays 104 or service light panels (discussed below). Typically, in operation, the loading assembly 500 (e.g., 500-A) is able to lift a tray 104 from the queue assembly 600 (e.g., 600-A) using end effectors 532 (e.g., 532-A) or is able to remove a tray 104 from a trough 106 (e.g., 106-1) and place it in the queue assembly 600 (e.g., 600-A). Alternatively, the loading assembly 500 (e.g., 500-A) may move a tray 104 between levels. A shown in the examples of FIGS. 1 through 3, the queue assembly or queue 600-A may be a gravity fed roller assembly where the trays 104 are moved via gravity.

Turning to FIGS. 4 through 13, an example of a socket assembly 110 is shown. Usually, a pair of socket assemblies 110 are used on a per level basis within the grow assembly 102 and, typically, the pair of socket assemblies 110 mounted opposed to one another so as to substantially span the width of the trough 106. As such, the socket assemblies 110 are generally configured to provide mechanical support and power for light assemblies (discussed below).

Typically, the socket assemblies 110 are comprised of several sections or lengths that are secured to one another (e.g., bolted to the grow frame 108 adjacent thereto) so that each socket assembly 110 can span the length of the trough 106 to which it is associated. Each length or section of the socket assemblies 110 can include a dolly guide rail 114. The dolly guide rail 114 is typically formed of a metal (e.g., aluminum or steel) or other rigid material (e.g., polycarbonate) and can have a generally U-shaped cross-section. In the examples shown in FIGS. 4 through 8, the dolly guide rails 114 (as there are several lengths shown in the example) has a flattened U-shaped cross-section where the bottom and opposing sides are generally flat (albeit with each of the opposing sides having an inner taper with a width that decrease proportionally with its distance from the bottom). There may also be a guide and clamps for securing power cables (which have been omitted for the sake of simplicity from FIG. 4).

Figure 6:
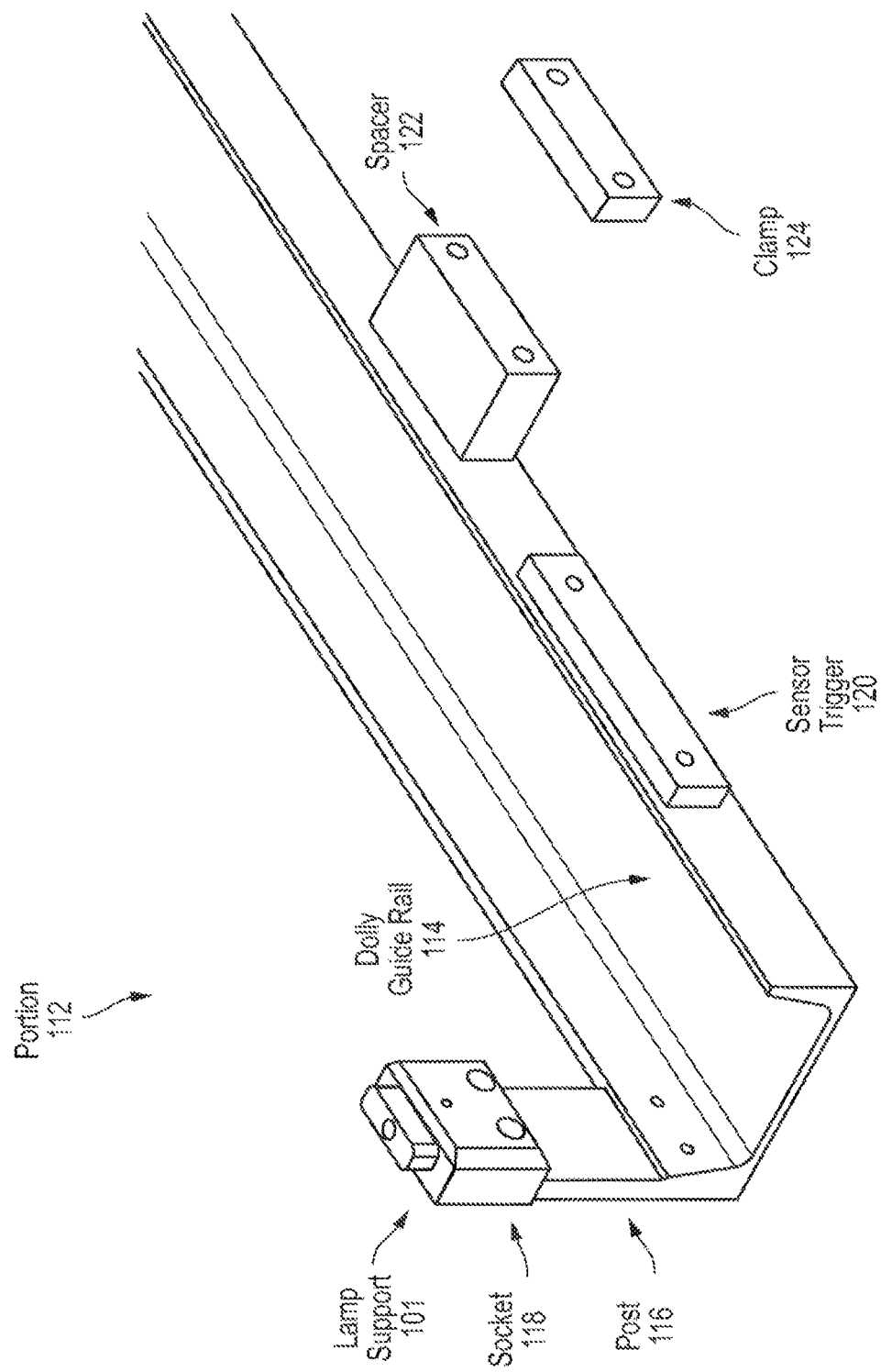
Figure 7:
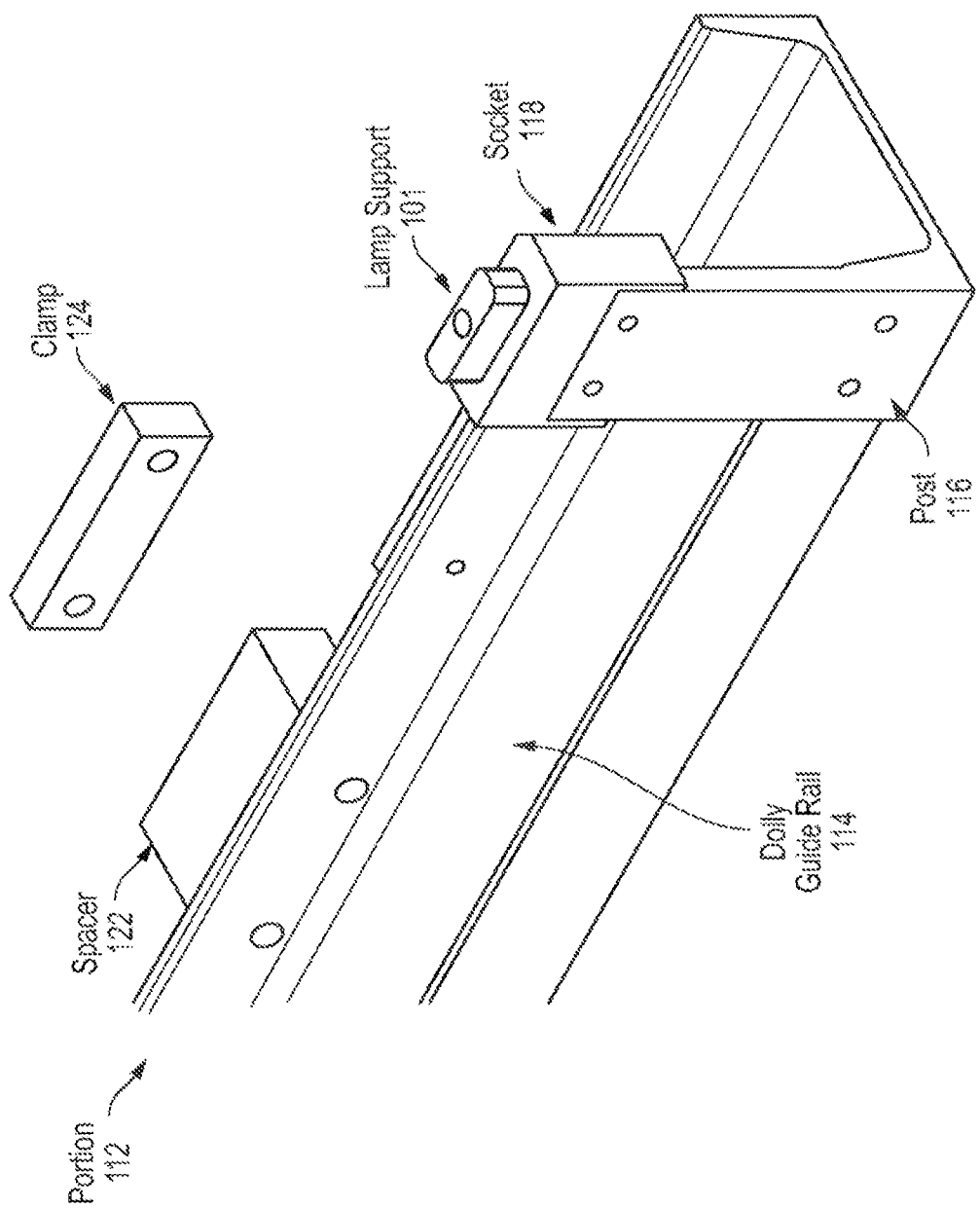
Figure 8:
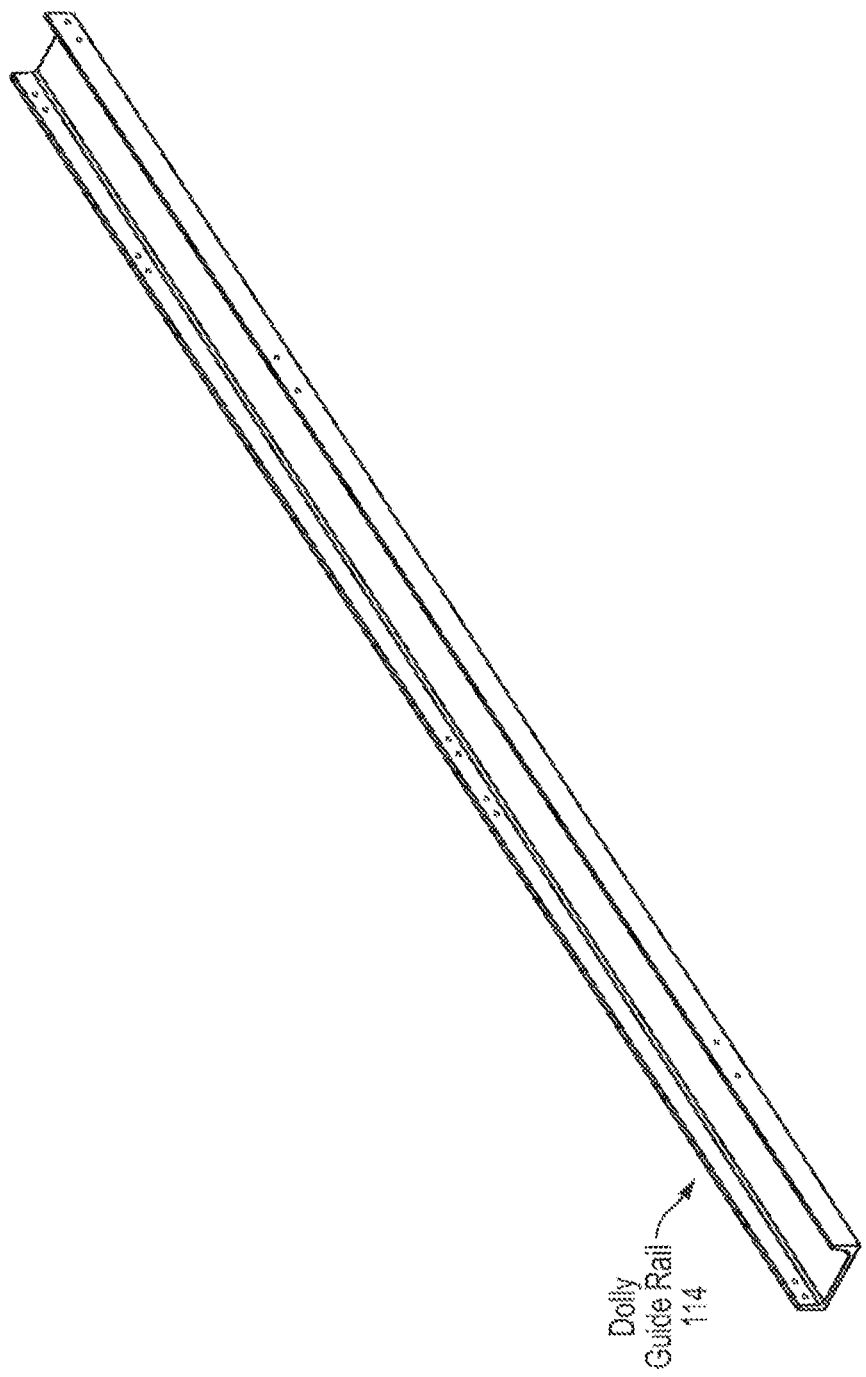

Generally, the dolly guide rail 114 includes multiple sets of holes within its vertical opposing sides. These holes (not labeled) can be through-holes or may be threaded such bolts and nuts can be used; in the example shown in FIGS. 4 through 8, all of the holes are threaded. As shown in the example of FIG. 6 (which more clearly shows portion 112), holes may be arranged a first vertical portion of the dolly guide rail 114 to allow for the use of spacers 122 and sensor triggers 120, while holes may be arranged on the opposite vertical portion of the guide rail 114 for use with lamp supports 101. In the example shown in FIGS. 4 through 8, the spacer 122 is used to create a separation between the grow frame 108 and socket assemblies 110 such that the distance between pairs of socket assemblies 110 are sufficient to allow the light maintenance dolly 400 to travel (discussed below). The clamp 124 may be used on the opposite side of the portion of the grow frame 108 to which the socket assembly 110 attaches so that the bolts (which can thread into the holds of the dolly guide rail 114) provide clamping pressure over a larger surface area. The sensor triggers 120, on the other hand, provide an obstruction used to align optical sensors which are secured on the light maintenance assemblies 400 (discussed below).

Now, turning to the lamp supports 101, these supports 101 are typically mounted on an opposite side from the grow frame 108 mounts (as discussed above). The lamp supports 101 are typically spaced apart from one another to support the corners of a light assembly 300. In other words, and as an example, four lamp supports 101 can be used for a single light assembly 300 so as to provide both mechanical support and electricity. Each lamp support can be comprised of a post 116 and socket 118 which are secured to one another. Typically, the post 116 and socket 118 are bolted together, and the post 116 can be of differing heights.

Figure 10:
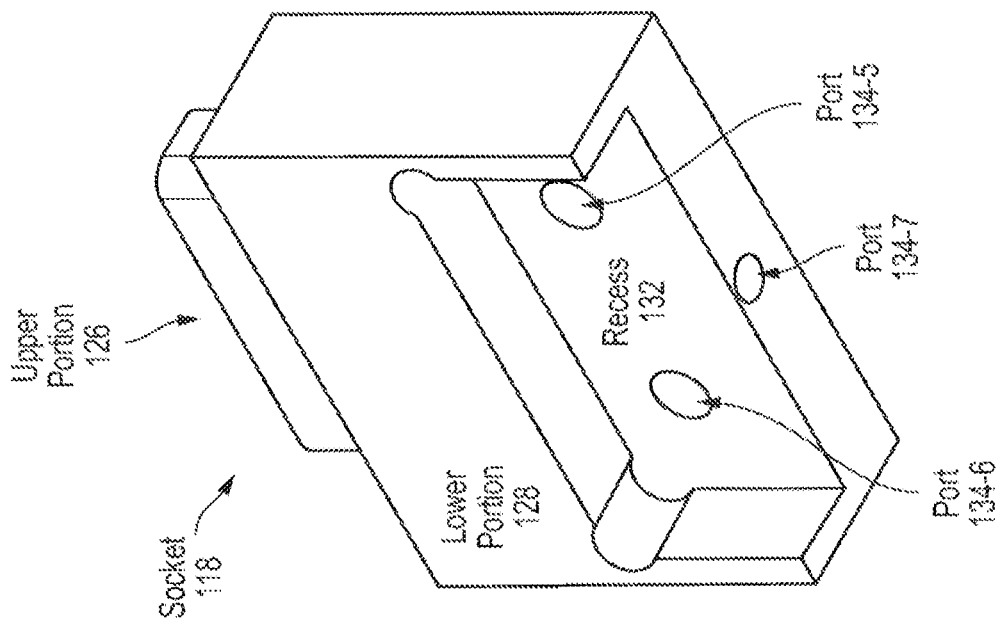
Figure 9:
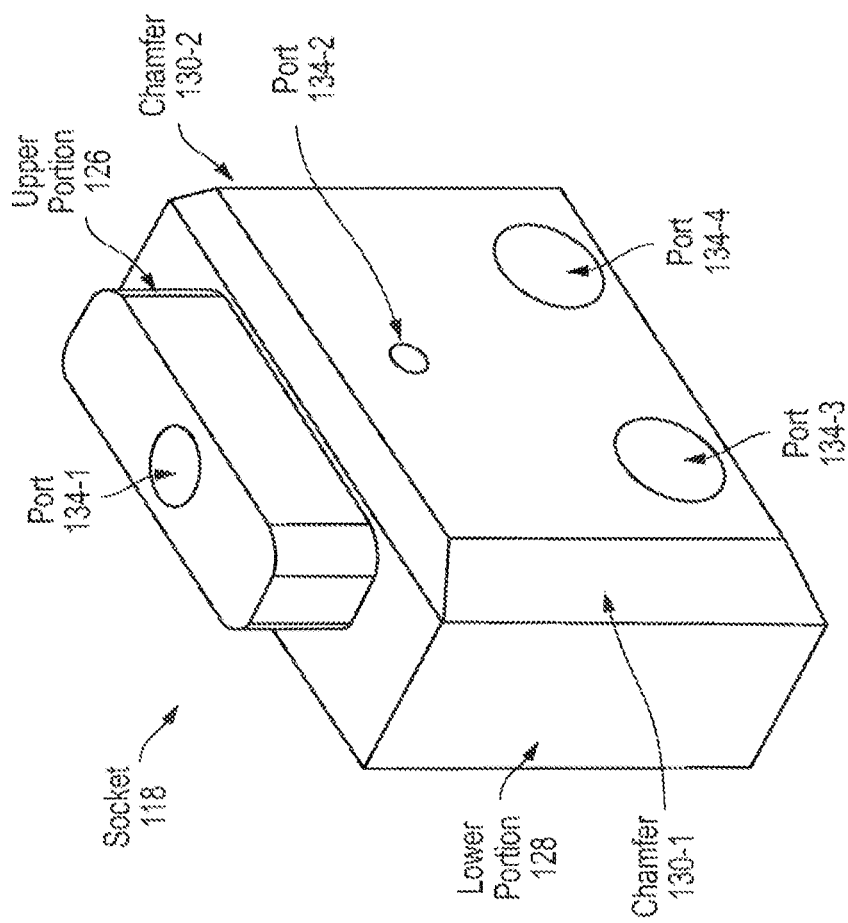

As shown in the example depicting in FIGS. 9 and 10, the socket 118 can be comprised of a lower portion of body 128 and an upper portion 126 or body—which can be formed of separated members secured to one another (e.g., by gluing or brazing) or be integrally formed. Typically, the socket 118 is formed of an electrically insulating material (e.g., polycarbonate). As shown in this example, the lower body 128 is generally parallelepiped-shaped with a front and opposite rear face, a top and opposite bottom face, and chamfers 130-1 and 130-2 (e.g. bevels). As shown in this example, the chamfers 130-1 and 130-2 extend between the top and bottom faces so as to narrow the front face. Additionally, as shown in this example, the upper body 126 extends from the top face of body 128. A recess 132 can also be formed rear face of the lower body 128, which causes the lower face of the lower body 128 to be smaller than that of the top face of the lower body and be generally U-shaped. Typically, this recess 132 is dimensioned to receive a portion of the post 116 such that the post 116 is flush with the rear face of the lower portion 128. In the example shown in FIG. 10, the recess 132 has a generally square cross-section with flared (e.g., rounded) corners (which allow the post 116 to more easily be seated).

Also, as shown, the upper portion 126 can also be parallelepiped-shaped but with a smaller cross-section than that of the body 128. Similarly, in this example, the upper portion 126 has a top face, and, as shown in this example, there are chamfers (e.g., bullnose) on each the four corners that extend from the top face of upper body 126. The upper body 126 may also be centered on the top face of the lower body 128.

Ports can also be formed in the socket 118. In this example depiction shown, ports 134-3 and 134-4 are formed in the front face of the lower body 128 and are respectively coaxial with ports 134-6 and 134-5 so as to form countersink clearance holes for bolts. Ports 134-1, 134-2, and 134-7 (which can be respectively formed in the top face of the upper body 126, front face of the lower body 128, and bottom face of the lower body 128) can extend through the socket 118 and can intersect one another. In this example, port 134-1 and 134-7 are round and coaxial with port 134-1 having a larger radius, while port 134-2 is perpendicular to ports 134-1 and 134-7.

Figure 11:
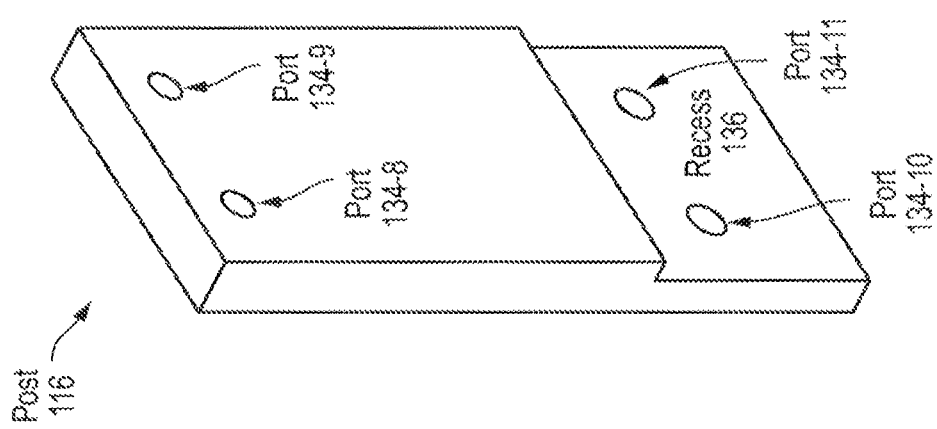

Now, turning to the post 116 in the example depiction of FIG. 11, it is generally parallelepiped-shaped with a front and opposite rear face. Near the top of the post 116 depicted in this example, there are a pair of ports 134-8 and 134-9 which are round and threaded. These ports 134-8 and 134-9 shown in this example are spaced apart from one another such that they are aligned with ports 134-6 and 134-5, respectively, when the post 116 is seated in recess 132 of socket 118—thus, allowing the socket 118 to be bolted to the post 116 where the bolt heads are countersunk. Like the example socket 118 depicted in FIGS. 9 and 10, the example post 116 has a recess 136. This recess 136 can allow the post 116 to be seated against the dolly guide rail 114 where ports 134-10 and 134-11 can be clearance holes for bolting the post 116 to the dolly guide rail 114.

Figure 12:
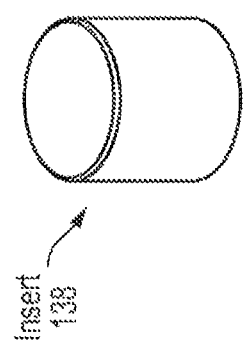
Figure 13:
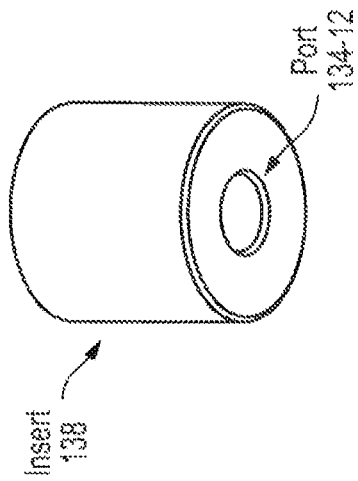

Collectively, the socket 118 and post 116 can provide mechanical support for a portion of a light assembly 300, but neither—in this example—provide an electrical connection. The electrical connection can be provided via an insert 138 (an example of which is shown in FIGS. 12 and 13). The insert 138 shown in this example has a generally cylindrical shape with a port 134-12 and is made of an electrically conductive material (e.g., copper or aluminum). The insert 138 can be dimensioned to form a clearance or slip fit with port 134-1 but have a diameter greater than port 134-7. A wire or other electrical connection (not shown) may be secured in port 134-12 such that the wire or electrical connection can extend through port 134-7 when the insert 138 is seated in socket 118. Then, to ensure some measure of mechanical stability in this example, a set screw (now shown) can be used in port 134-2 (which can be threaded) to hold the seated insert 138 in place.

Figure 15:
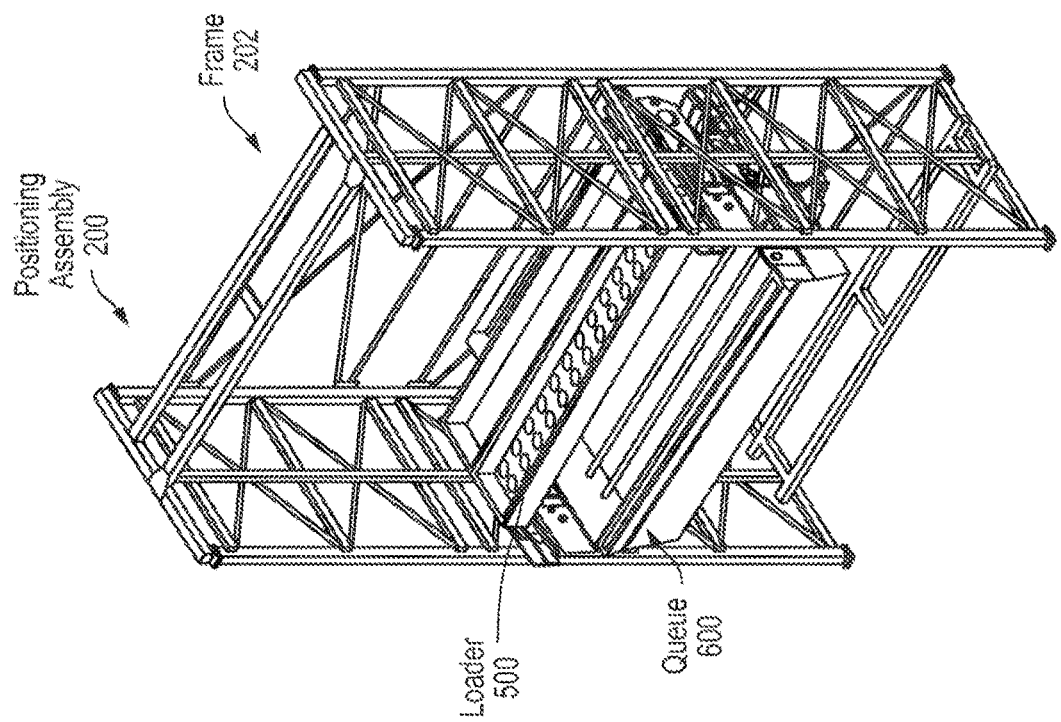
FIGS. 14 and 15 depict an example of the positioning assembly for the hydroponics assembly of FIG. 1.
Figure 14:
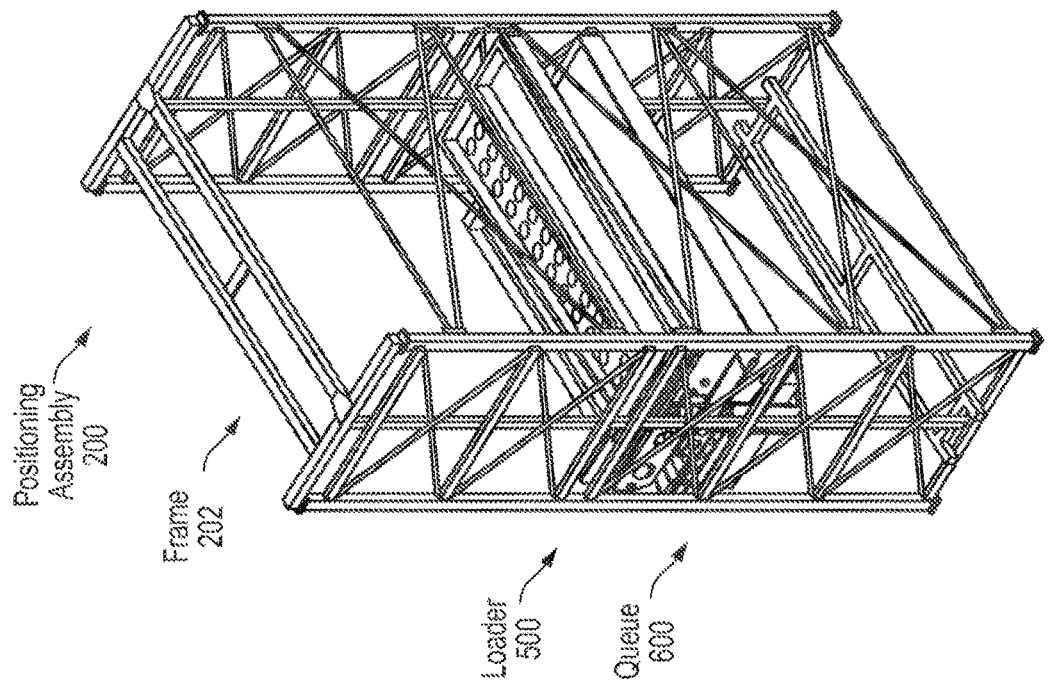
Figure 17:
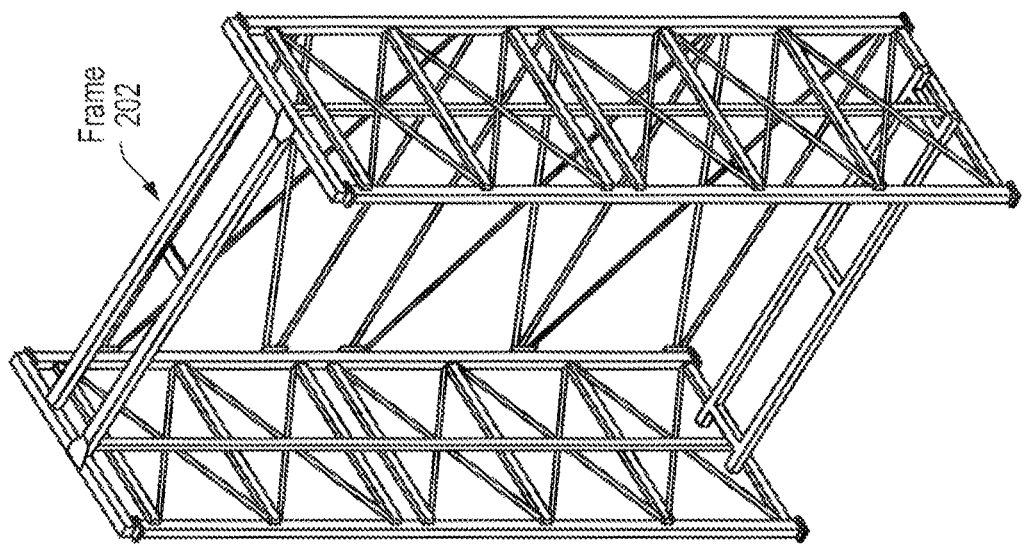
FIGS. 16 and 17 depict an example of the frame for the positioning assembly of FIGS. 14 and 15.
Figure 16:
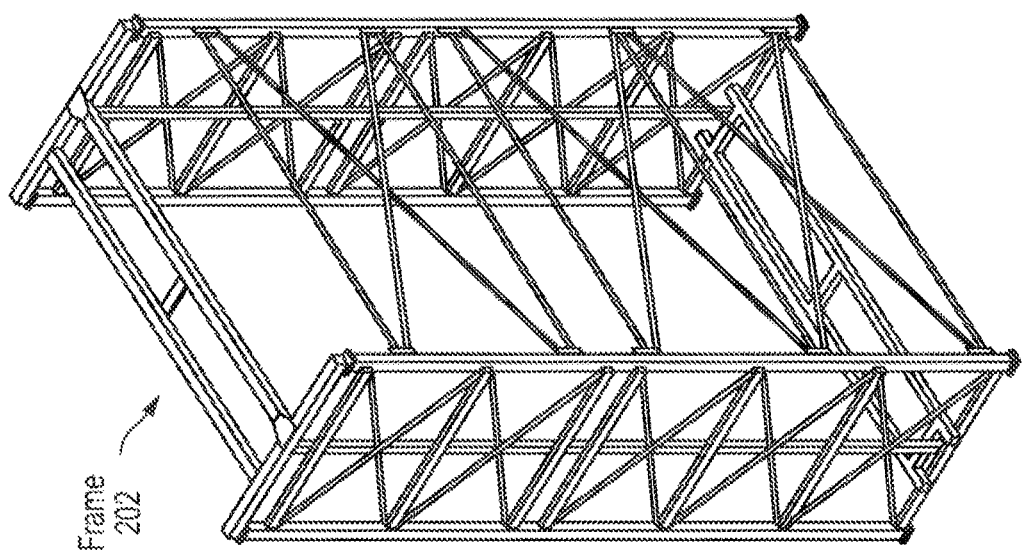
Figure 18:
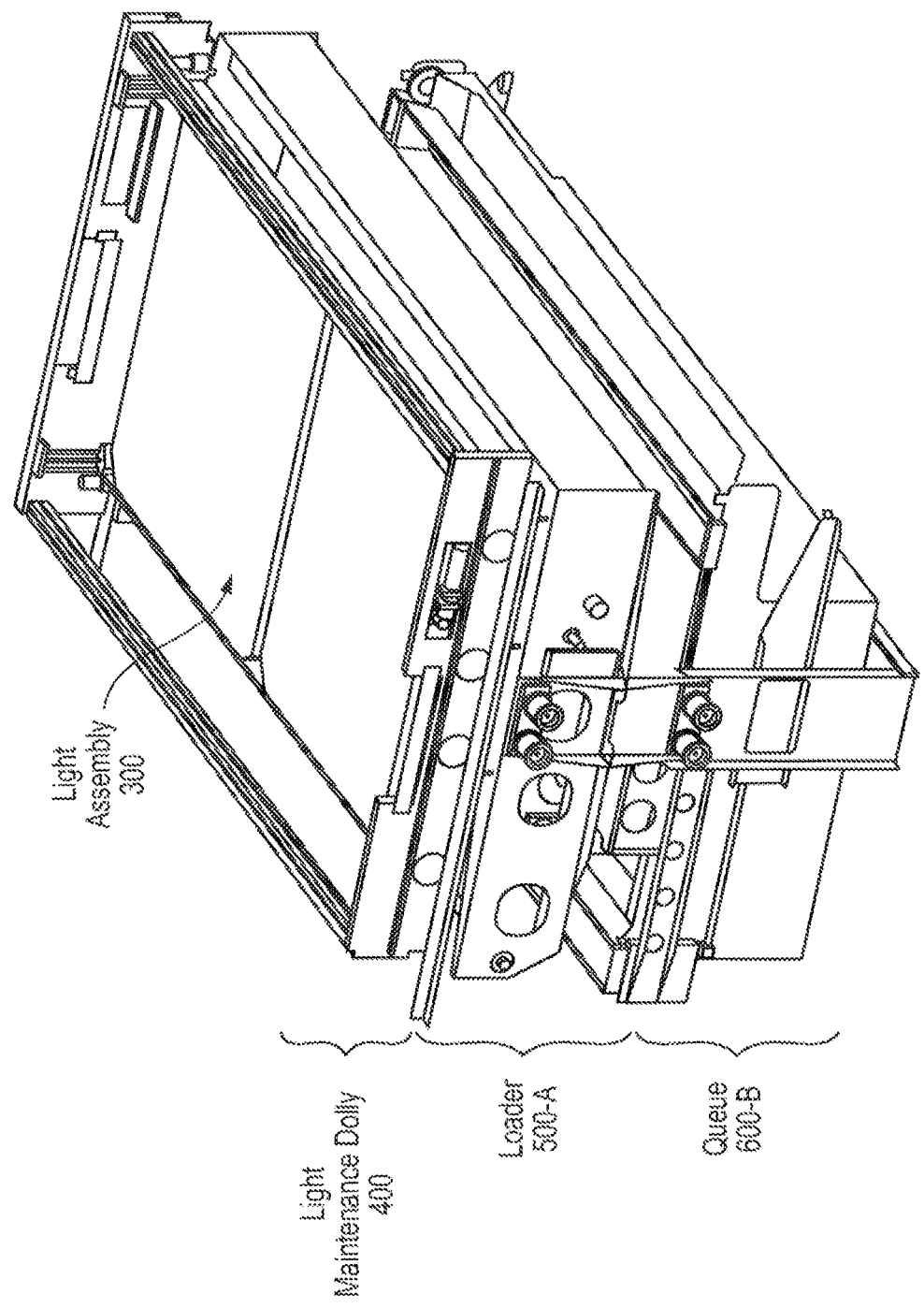
FIGS. 18 and 19 depict an example of the working assembly for the positioning assembly of FIGS. 14 and 15.
Figure 19:
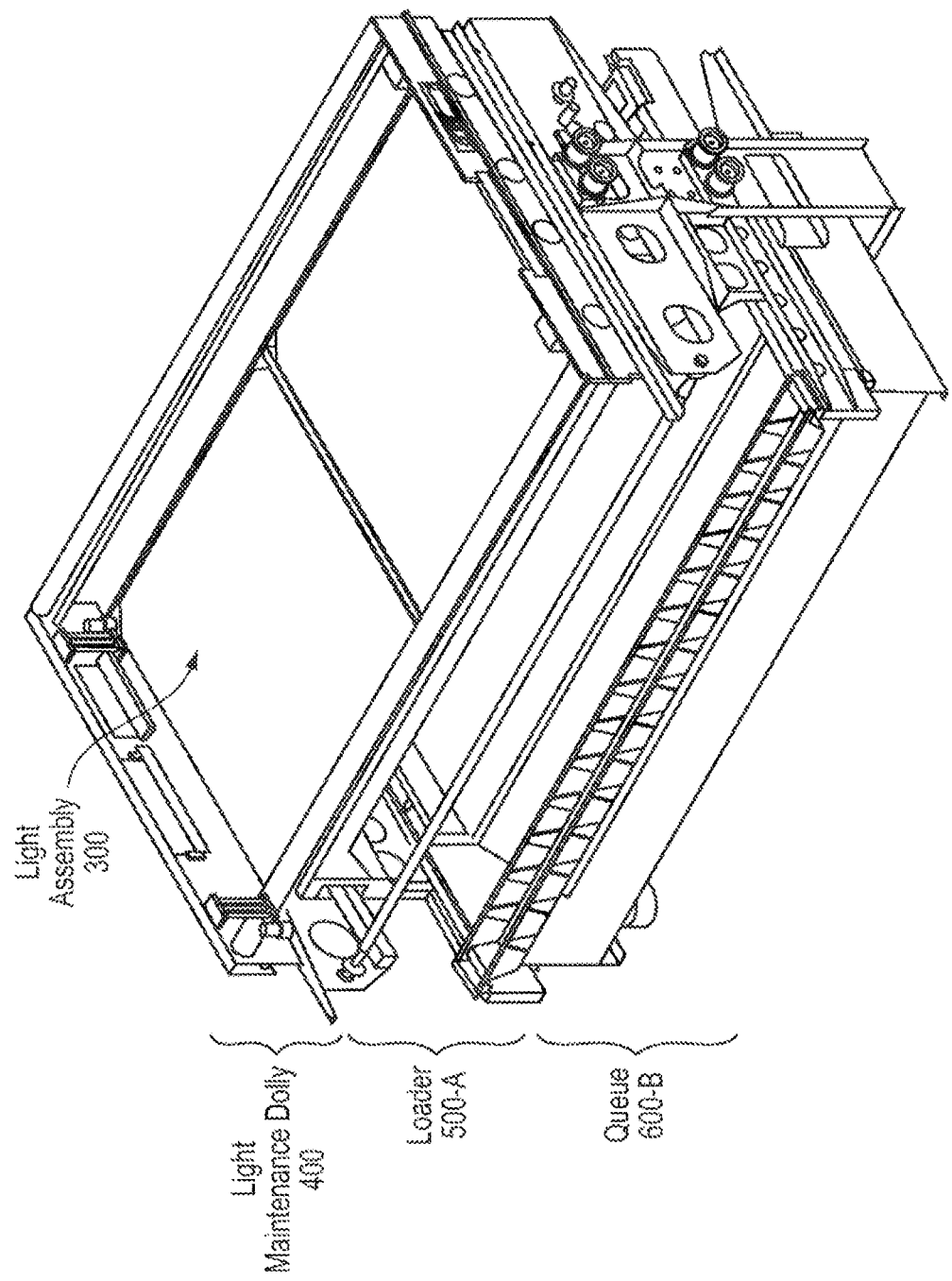

Now, turning to FIGS. 14 through 15, an example of a positioning assembly 200 can be seen. This positioning assembly 200 can be configured to load, unload, or move trays 104 from or to the grow assembly 102. It can be generally comprised of a frame 202, loader 500, and queue 600. In the example depicted, the loader 500 and queue 600 are secured to one another and are configured to move vertically on frame 202. Each of the loader 500 and queue 600 can have multiple, different configurations (which are described above with respect to FIGS. 1 through 3 above and below). One example configuration for both the loader 500-A and queue 600-B can be seen in FIGS. 18 and 19. An example of the light maintenance dolly 400 and light assembly 300 (which typically "rides" on the loader 500) can also be seen in FIGS. 18 and 19.

Figure 20:
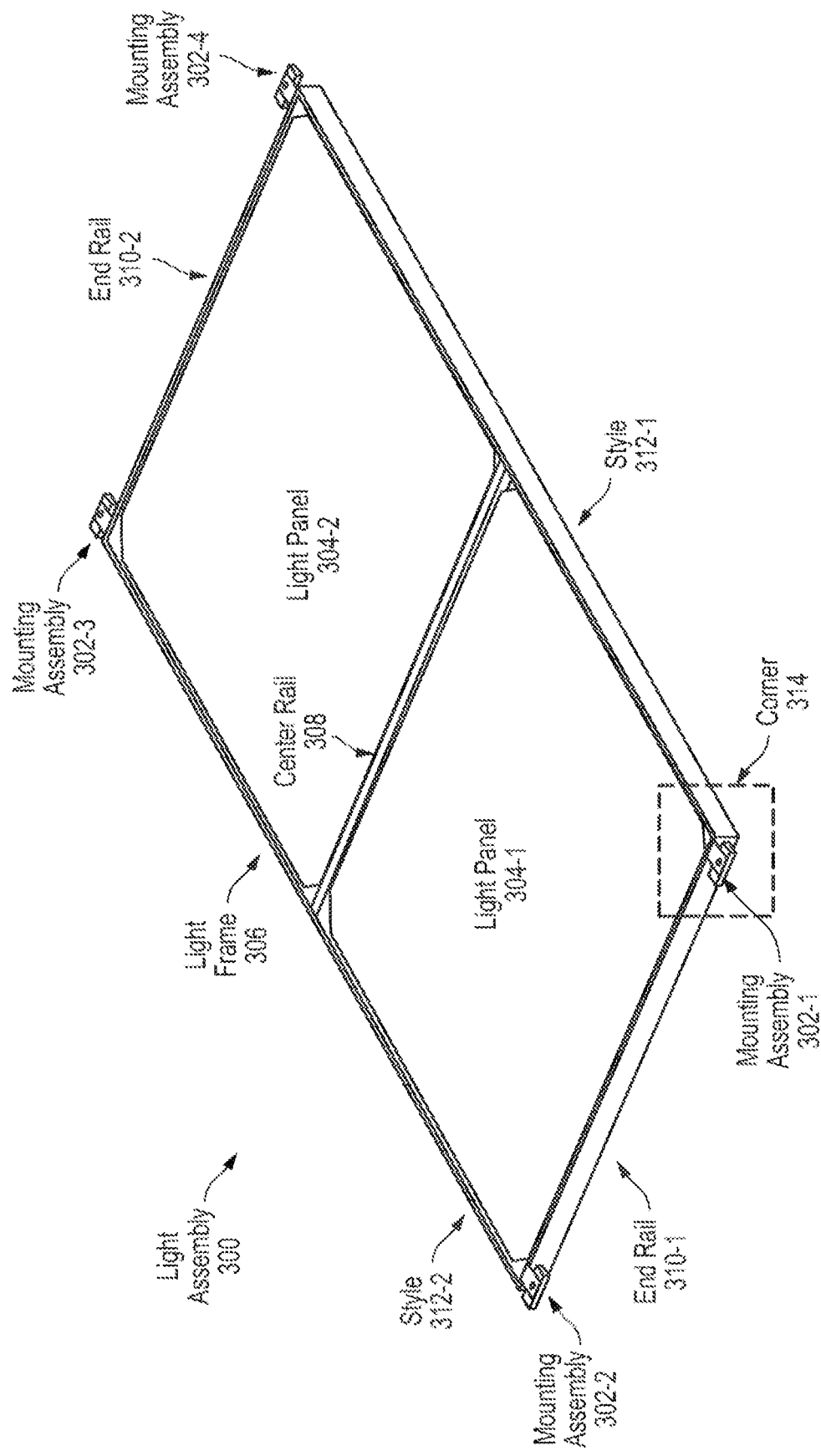
FIGS. 20 through 22 depict an example of a light assembly used with the hydroponics assembly of FIG. 1.
Figure 21:
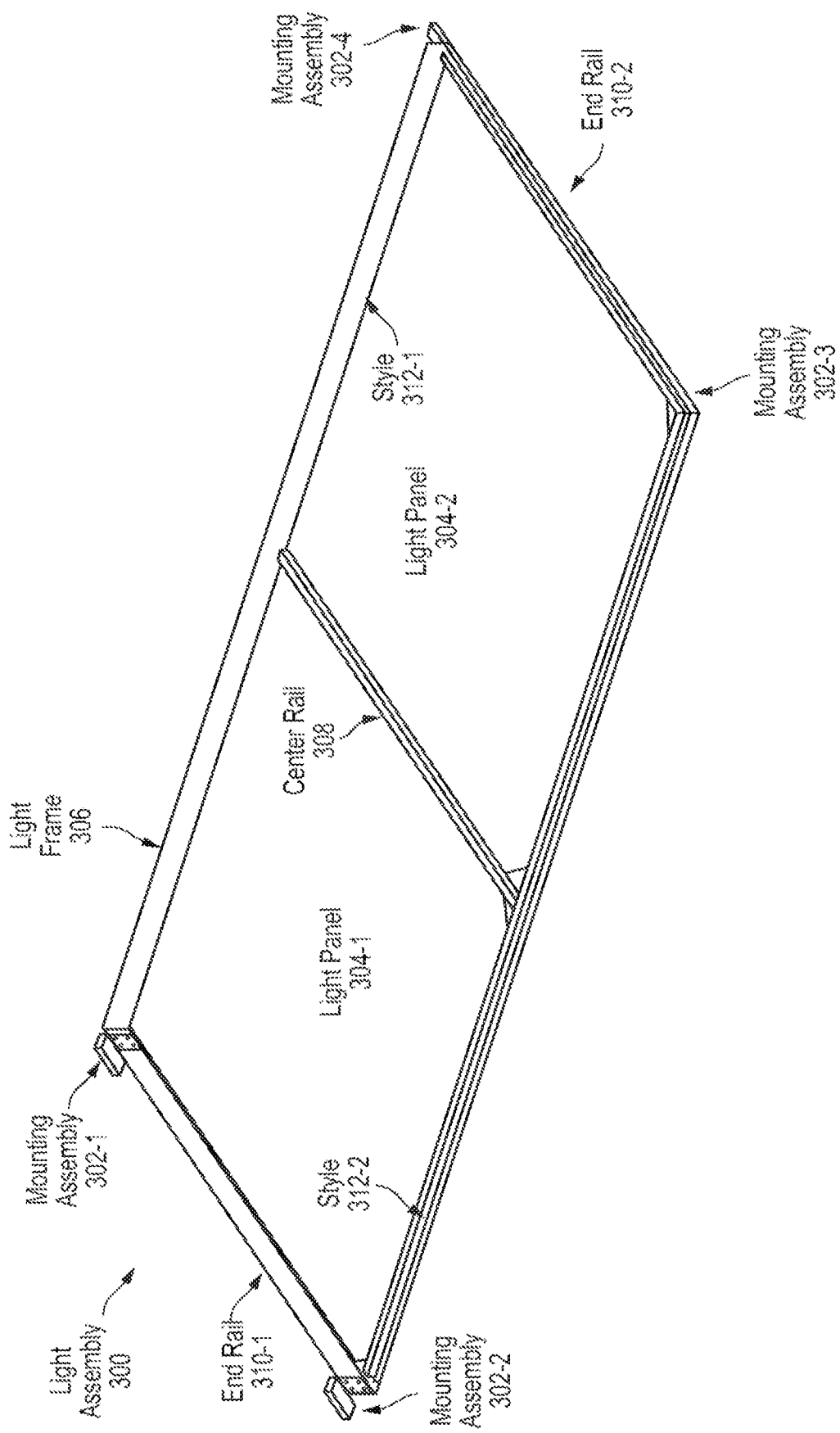
Figure 22:
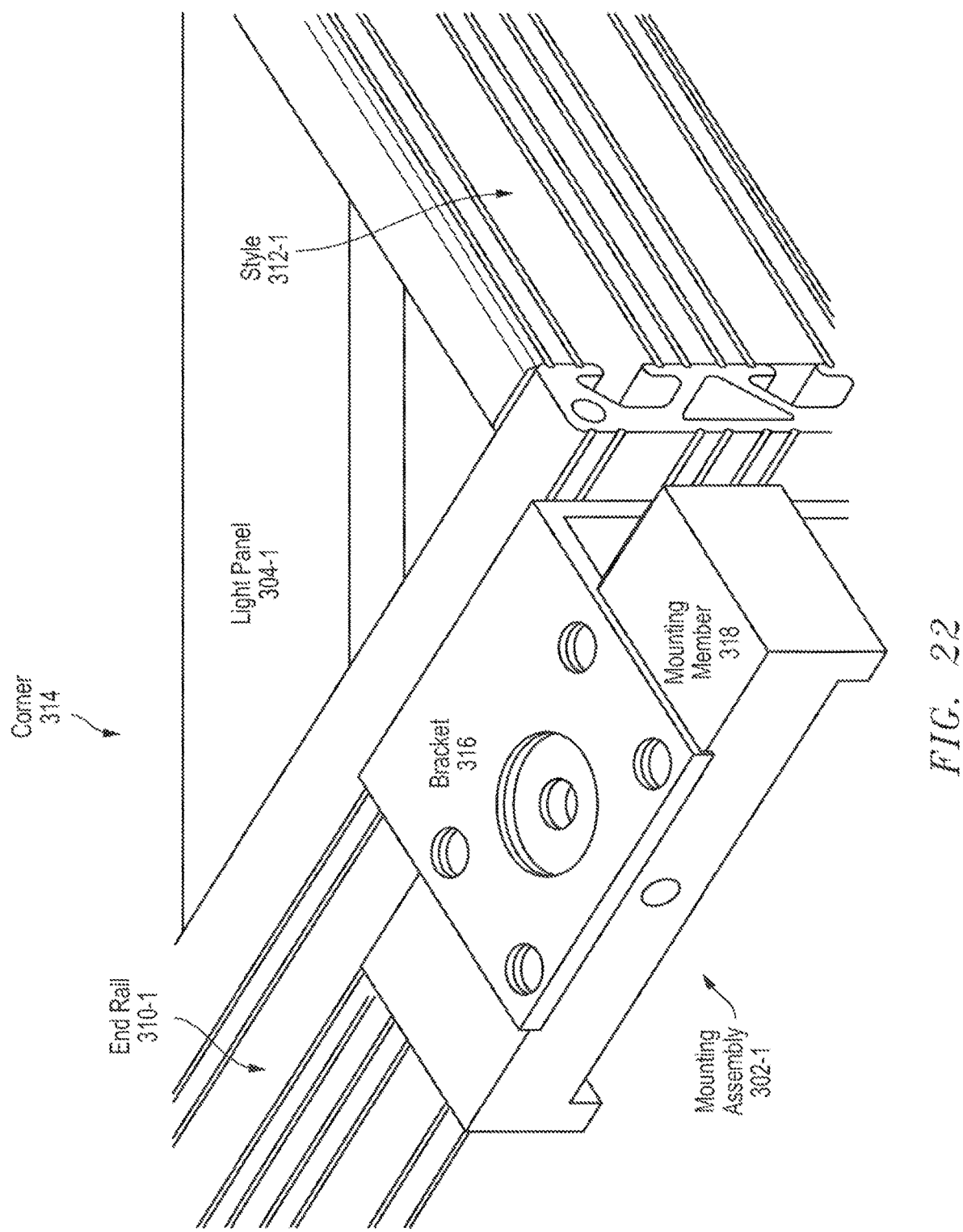
Figure 23:
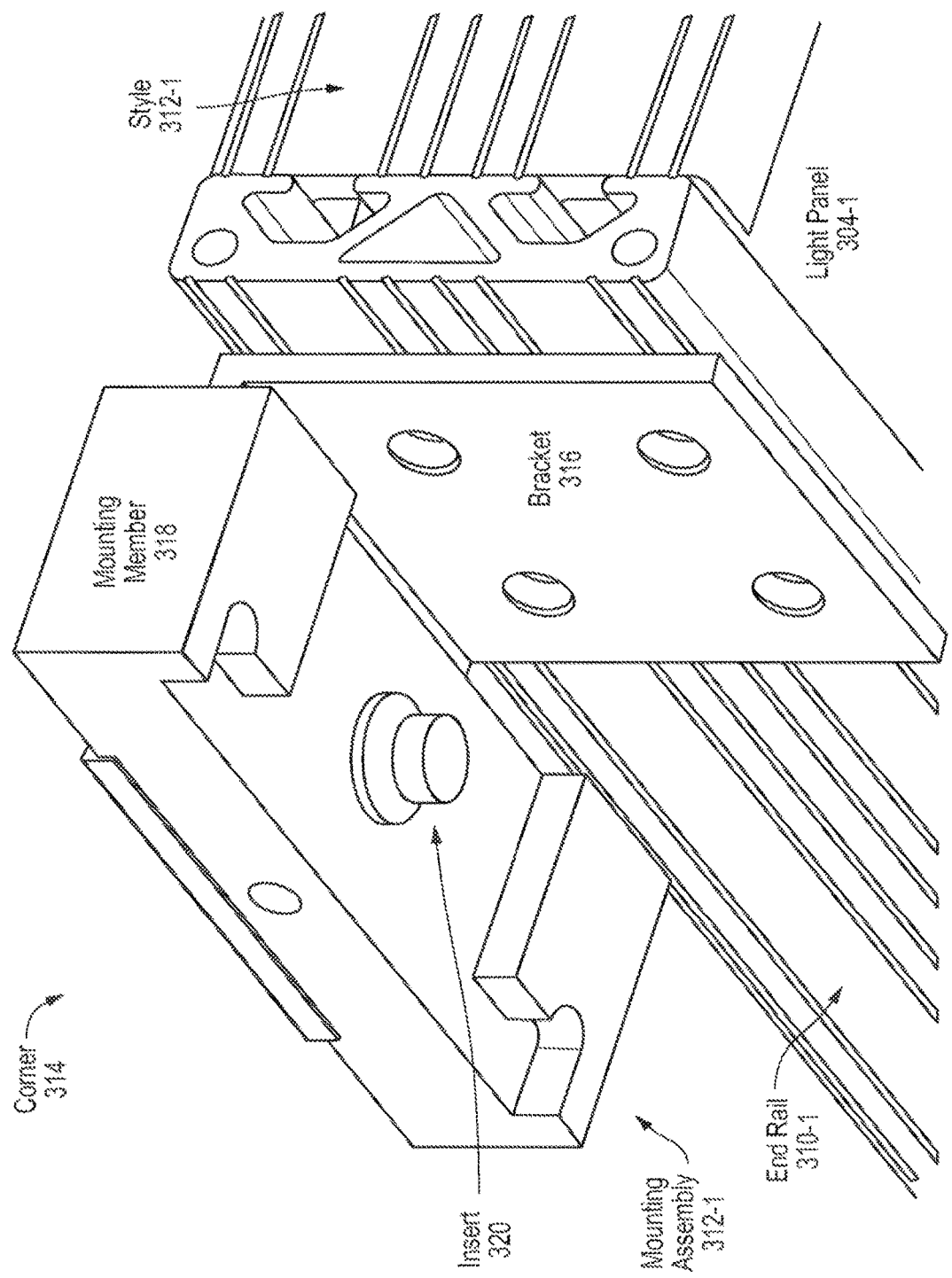
FIG. 23 through 28 depict an example of the mounting assembly for the light assembly of FIGS. 20 through 23.

Beginning with the light assembly 300 shown in FIGS. 20 and 21, it is generally capable of being moved into position and seated within the grow assembly 102 using the light maintenance dolly 400. When seated within the grow assembly 102, the light assembly 300 can be activated to supply light to plants growing within the grow assembly 102. As shown in this example depicted in FIGS. 21 to 23, the light assembly 300 is generally a flat or planar assembly with a generally rectangular cross-section. As shown, it can be comprised of a light frame 306 and light panels 304-1 and 304-2. There may be also be a single light panel 304 or more than two panels. The number of panels 304 can be chosen based on design considerations like the types of plants being grown. For the sake of illustration, two are depicted. These light panels 304-1 and 304-2 depicted in this example are generally comprised of an array of light emitting diodes or LEDs which are configured to emit a desired spectrum of light (e.g., infrared and visible spectrum).

In the example shown in FIGS. 20 and 21, the light frame 306 can be generally comprised of styles 312-1 and 312-2 and end rails 310-1 and 310-2. These styles 312-1 and 312-2 and rails 310-1 and 310-2 shown are secured to one another (e.g., bolted, glued, or brazed) to form the generally rectangular shape. A center rail 308 can also be included and secured to the styles 312-1 and 312-2 (e.g., by bolting, gluing, or brazing). The center rail 308 can be omitted when a single panel 304 is used, or, multiple center rails 308 can be employed when more than two panels 304 are used.

Also, as shown in this example, there is a mounting assembly 302-1 to 302-4 at each corner of the frame 306. These mounting assemblies 302-1 to 302-4 are typically arranged to engage lamp supports 101 in the grow frame 102. A detailed example of assembly 302-1 can be seen in FIGS. 22 and 23 (which depicts corner 314), and this assembly 302-1 typically has the same configuration as assemblies 302-2 to 302-4. As shown in this example, the assembly 302-1 is comprised of a bracket 316, mounting member 318, and an insert 320. The bracket 316 can be secured to the frame 306 (e.g., bolting, gluing, or brazing), while the mounting member 318 can engage or be seated on the lamp support 101.

Figure 24:
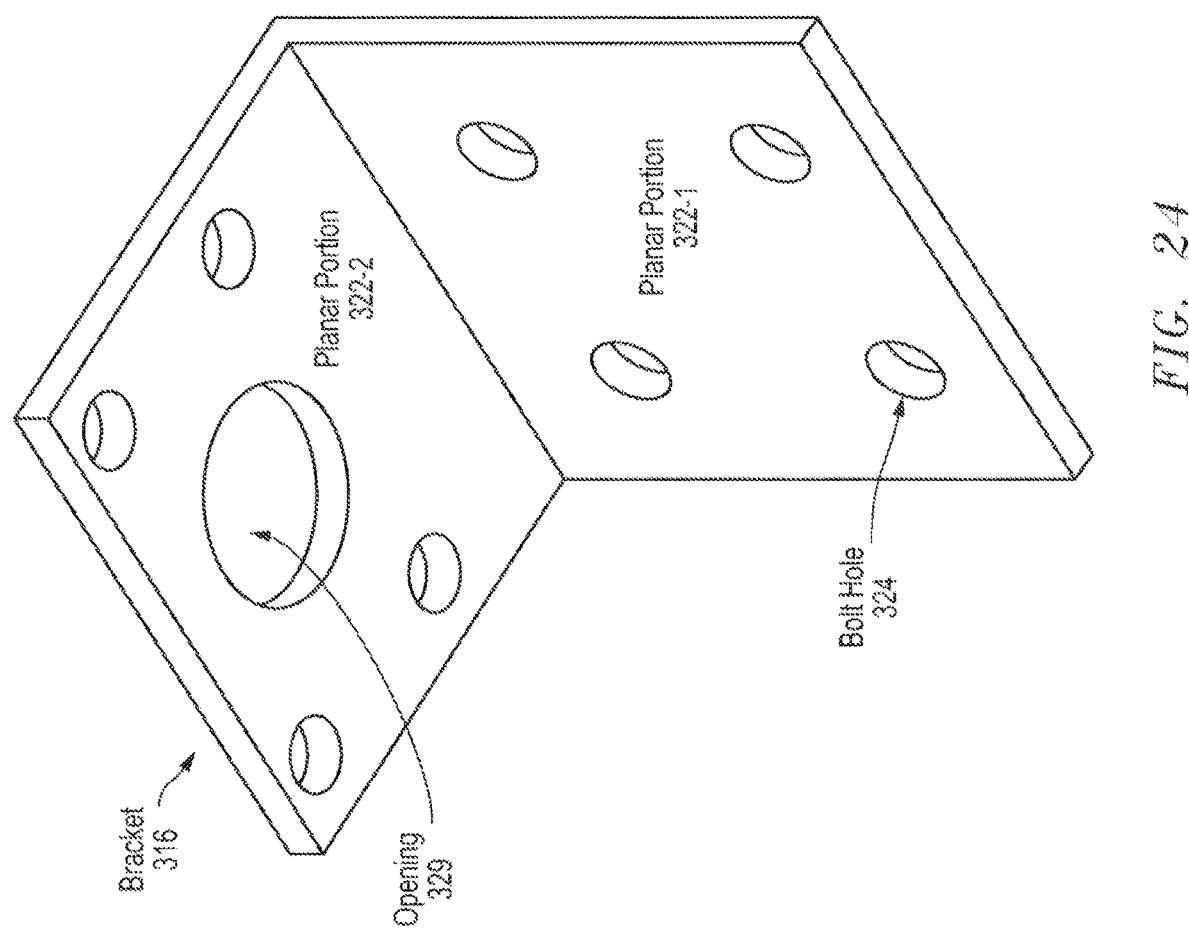

An example of the bracket 316 can be seen in greater detail in FIG. 24. It can be comprised of two planar and generally square-shaped portions or bodies 322-1 and 322-2. The bodies, as shown in this example, are perpendicular to one another and may be formed of a single integral body or two bodies that are secured to one another (e.g., glued or brazed). As shown, the portion 322-1 includes bolt holes 324 (as an example) so that the bracket 316 can be bolted to the frame 306. The body 322-2 similarly includes bolt holes (as an example) so that the mounting member 318 may be bolted to it. Additionally, in this example, the body 322-2 has an opening 329, which is typically included to facilitate an electrical connection (e.g., wire) between the mounting member 318 and panel 304-1.

Figure 25:
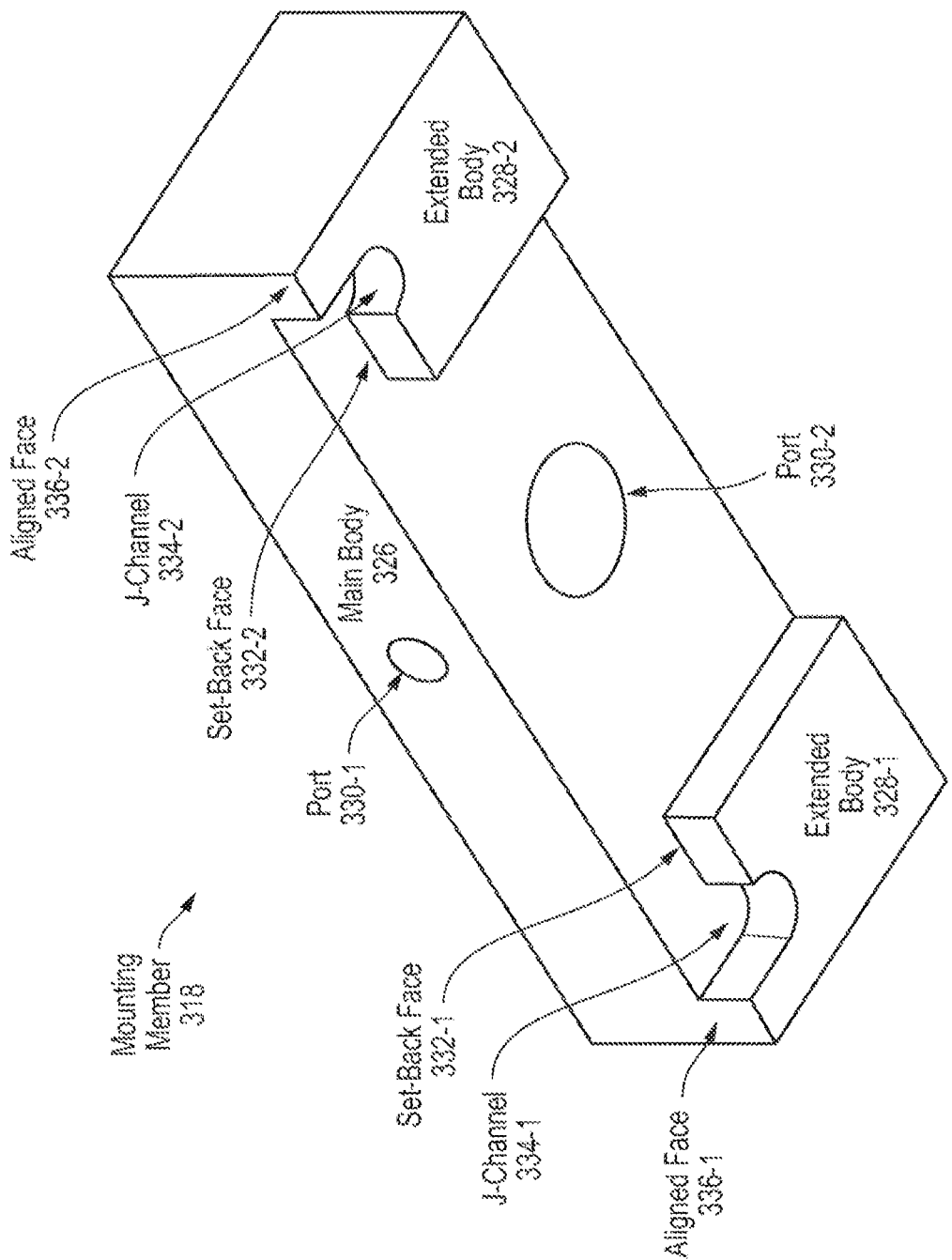
Figure 26:
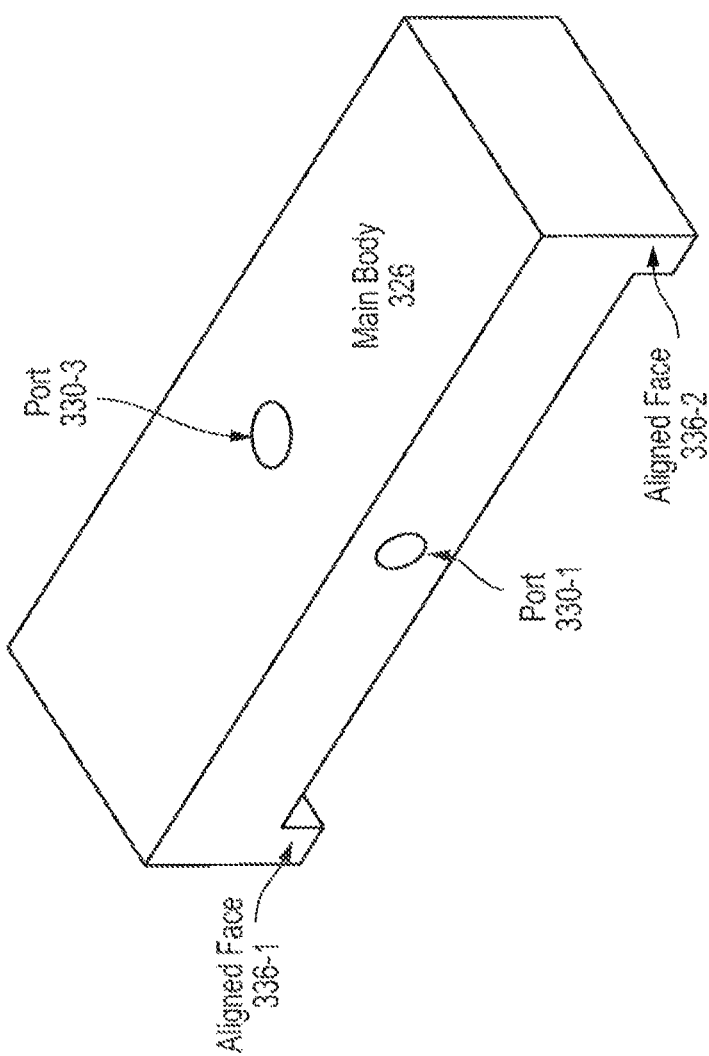

Turning to the mounting member 318 (an example of which is depicted in FIGS. 25 and 26), it can be comprised of an electrically insulating material (e.g., polycarbonate) with a generally parallelepiped-shaped main body 326 and extended bodies 328-1 and 328-2. The main body 326 can include top and opposite bottom faces and front and opposite rear faces. The extended bodies 328-1 and 328-2 typically extend from the bottom face of the main body 326 on each end. These extended bodies 328-1 and 328-2 may be secured to the main body 326 (e.g., by gluing or brazing) or may integrally formed. Each of the extended bodies 328-1 and 328-2—as shown in this example—has a single face aligned or coplanar with the rear face of the main body 326. Along the front, the extended bodies 328-1 and 328-2 can have an aligned face 336-1 and 336-2 (respectively) that are aligned or coplanar with the front face of the main body 326 at the corners. Each can also have a set-back face 332-1 and 332-1 which can be generally parallel to the front face of the main body 326. Then, between the aligned faces 336-1 and 336-2 and set-back faces 332-1 and 332-2 there may be a channel 334-1 and 334-2 (respectively). The channel 334-1 and 334-2 may have a generally J-shaped surface which links the aligned faces 336-1 and 336-2 and set-back faces 332-1 and 332-2.

Additionally, ports may also be formed in the mounting member 318. In the example shown in FIGS. 25 and 26, port 330-1, 330-2, and 330-3 are respectively formed in the top face, bottom face, and front face of the main body 326 and extend into the main body 326 such that the three intersect. Each of the ports 330-1 and 330-2 can be located generally at the center of its respective face and coaxial with one other so that the port 330-2 may be aligned with opening 324 when assembled. Moreover, port 330-2 can have a larger diameter than that of port 330-1, while port 330-1 may be threaded. The main body 326 may also include other ports (not shown) formed in the top face (which may be threaded) to allow the mounting member to be secured to the bracket 316.

Figure 28:
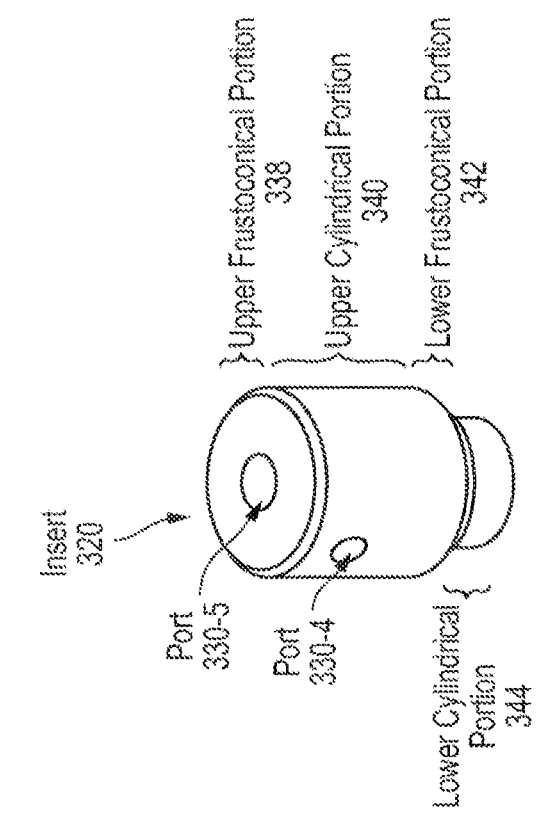
Figure 27:
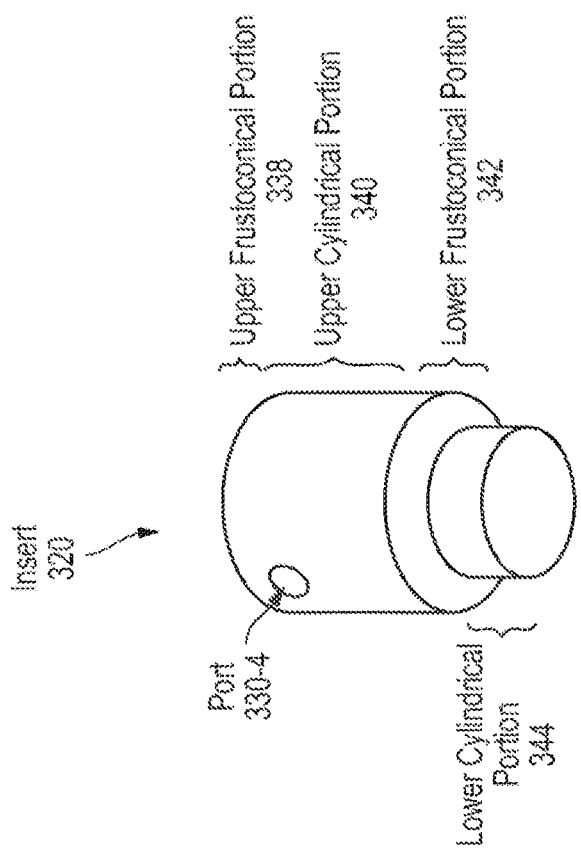

Turning to the insert 320, an example may be seen in FIGS. 27 and 28. The insert 320 can be formed of an electrically conductive material (e.g., copper or aluminum) and can have several portions or bodies. Preferably, the insert 320 can be formed of an upper frustoconical portion 338, upper cylindrical portion 340, lower frustoconical portion 342, and lower cylindrical portion 344. The upper frustoconical portion 338 can be adjacent to the top surface (in which port 330-5 can be formed) and tapers inwardly from the upper cylindrical portion 340 such that the diameter of the upper cylindrical portion 340 is greater than that of the top surface. As an example, the upper cylindrical portion 340 may also be dimensioned to form an interference fit with port 330-2 in the main body of 326 of the mounting member 318. Port 330-4 can be formed in the upper cylindrical portion 340. In the example shown, port 330-4 extends into the upper cylindrical portion 340 perpendicular to the central axis of the upper cylindrical portion 340 and intersects port 330-5. Typically, port 330-4 is treaded such that it can receive a set screw that will hold an electrical contact (e.g., wire) for the panel 304-1 in place. Again, in the example shown, the lower frustoconical portion 342 can be located between the upper and lower cylindrical portions 340 and 344—tapering inward. The lower cylindrical portion 344 typically has a diameter dimensioned to form a clearance or slip fit with port 134-1 of the socket and a length sufficiently long to contact insert 138 when the mounting assembly 302-1 is seated on a lamp support 101. Depending on the configuration of the assembly 300, one or more the inserts 320 may not be used supply electrical power. As one example for the configuration shown in FIGS. 12 and 13, all four are used to supply direct-current (DC) power—two for supply and two for ground. As another example for the configuration shown in FIGS. 12 and 13, two are used to supply direct-current (IX) power—one for supply and one for ground.

Now, turning to the light maintenance dolly 400, this assembly 400 is configured to move to set and move the light assembly 300. It can do this by being moved between levels by the loader 500 so that it can be aligned with pairs of socket assemblies 110. When aligned, the light maintenance dolly 400 is able to roll into position and lift light assemblies 300. For example, when a light assembly 300 is ready to be placed, the assembly 300 is held by the dolly 400 (while it "rides" on the loader 500). When aligned in this example, the dolly 400 (which can be remotely controlled) rolls from the loader 500 along the dolly guide rails 114 of the socket assembly 110 pairs to the position to which the light assembly 300 is to be placed (even being able to move over light assemblies already in place). Then, the dolly 400 lowers the light assembly 300 into place, seating the light assembly 300 in place on its lamp supports 101. In order to accomplish all of these feats, the dolly typically includes a lifting mechanism to vertically move the panel 300 and a rolling or drive mechanism to move the entire dolly and a sensing mechanism to detect where to place the light panels (which is discussed below). An example of such a configuration can be seen in FIGS. 29 and 30.

Figure 29:
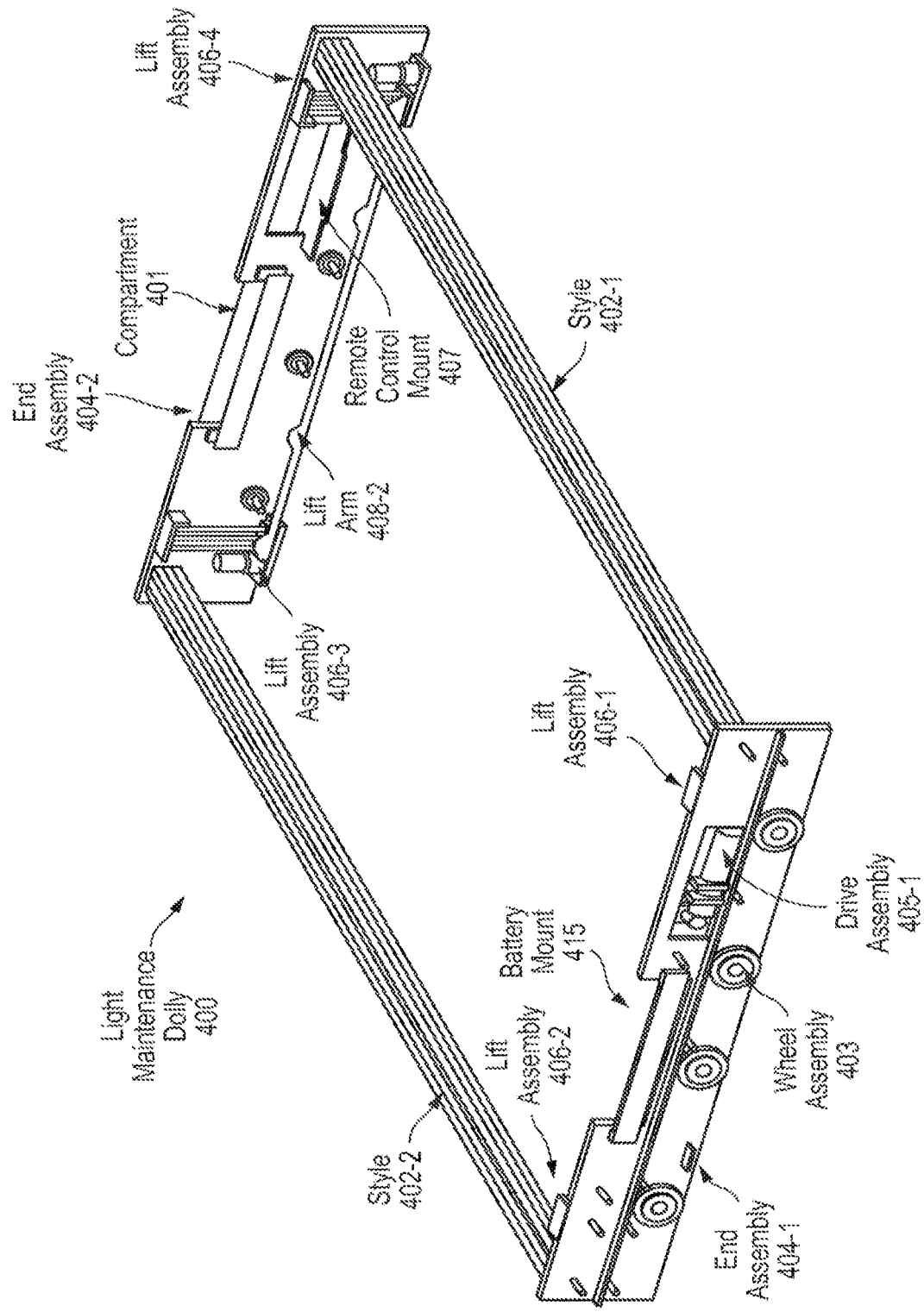
Figure 30:
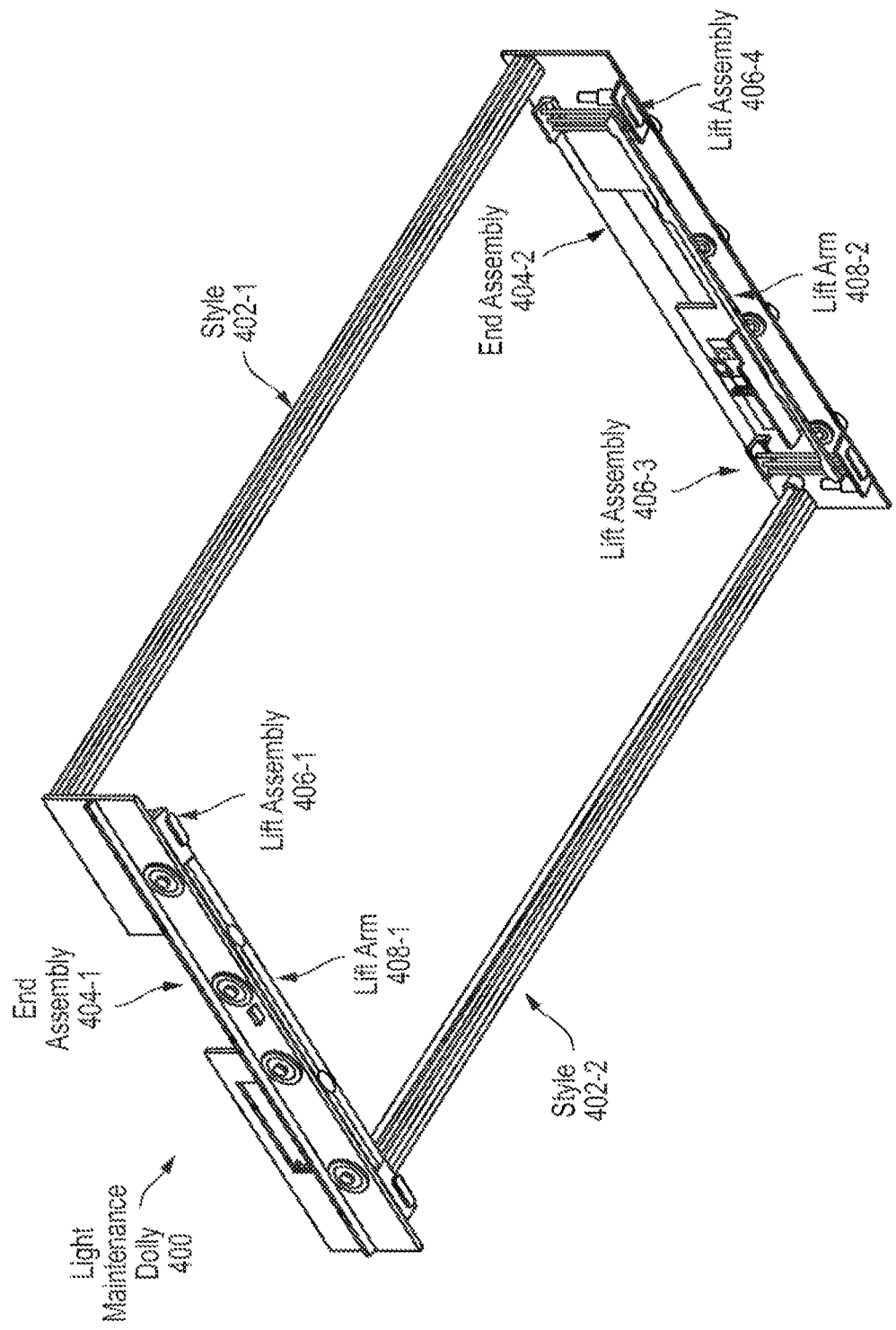
Figure 32:
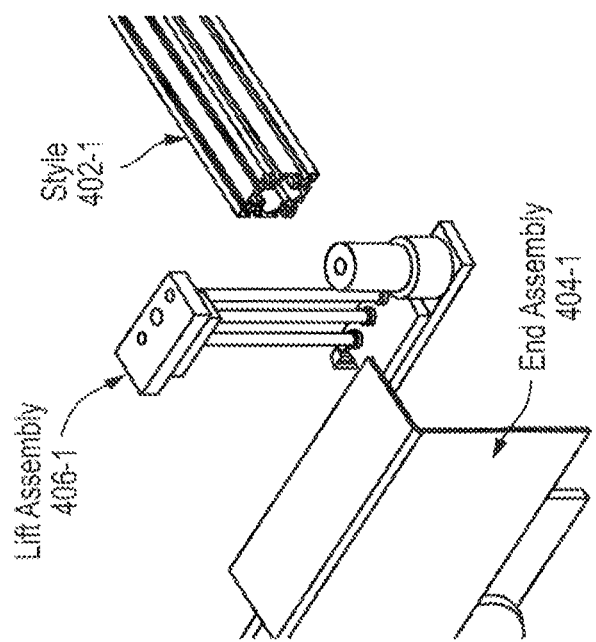
Figure 31:
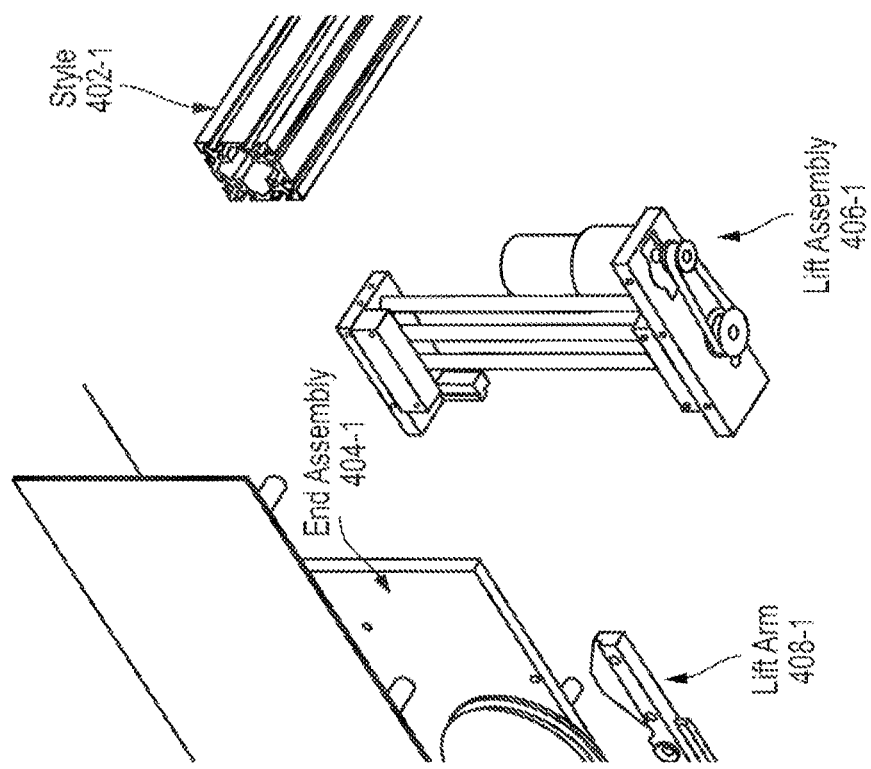
Figure 55:
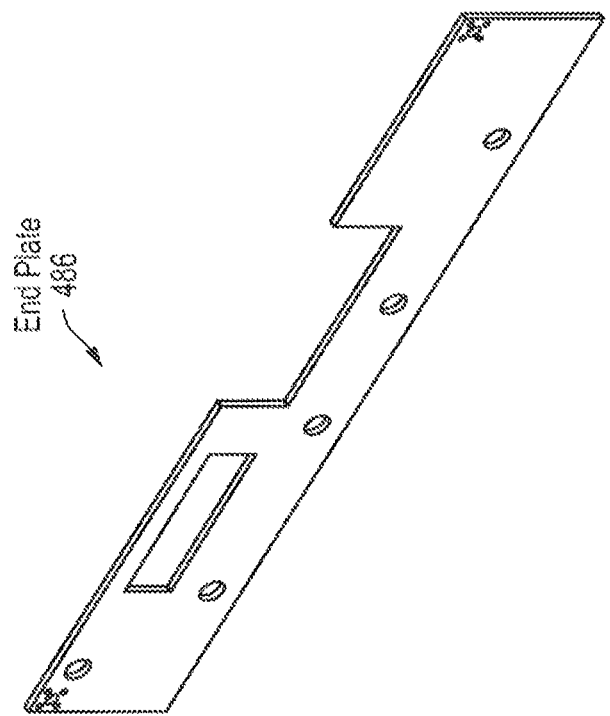

In the example shown in FIGS. 29 and 30, there are two styles 402-1 and 402-2 that extend between and are secured (e.g., bolted, glued, or brazed) to end assemblies 404-1 and 404-2. As shown in this example, the end assemblies 404-1 and 404-2 are outfitted with complementary lift mechanisms comprised of a pair of lift arms 408-1 and 408-2 (which engage a panel 300) and lift assemblies 406-1 to 406-4. An example of the lift assemblies 406-1 to 406-4 and lift arms 408-1 and 408-2 can be seen in FIGS. 31 to 54. An example of the drive mechanism can also be seen in FIGS. 58 to 75. Other portions of the end assemblies 404-1 and 404-2 can be seen in FIGS. 55 and 75. Additionally, as shown, there is a compartment 401 and remote-control mount 407 on end assembly 402-2 that are typically used to house/secure electronics (such as controllers, relays, and switches). Additionally, as shown, there is battery mount 415 for holding a battery and a drive assembly 405-1 for advancing the dolly 400 in end assembly 404-1.

Turning first to the example lift assembly 406-1 (which can be seen in FIGS. 31-49), it can be comprised of an upper mounting bracket 410, lift bracket 420, guides 424-1 and 424-2, leadscrew 426, linear bearings 428-1 an 428-2, linkage 430, lower mounting bracket 432, limit switch assemblies, and drive assembly. In operation, the upper and lower mounting brackets 410 and 432 can be secured (e.g., bolted, brazed, or glued) to the end plate 486 (shown in FIG. 55), while the drive assembly can turn the leadscrew 426 to move the lift bracket 420 up or down. The limit switch assemblies can then terminate travel of the lift bracket 420 at either the upper or lower bound.

Figure 34:
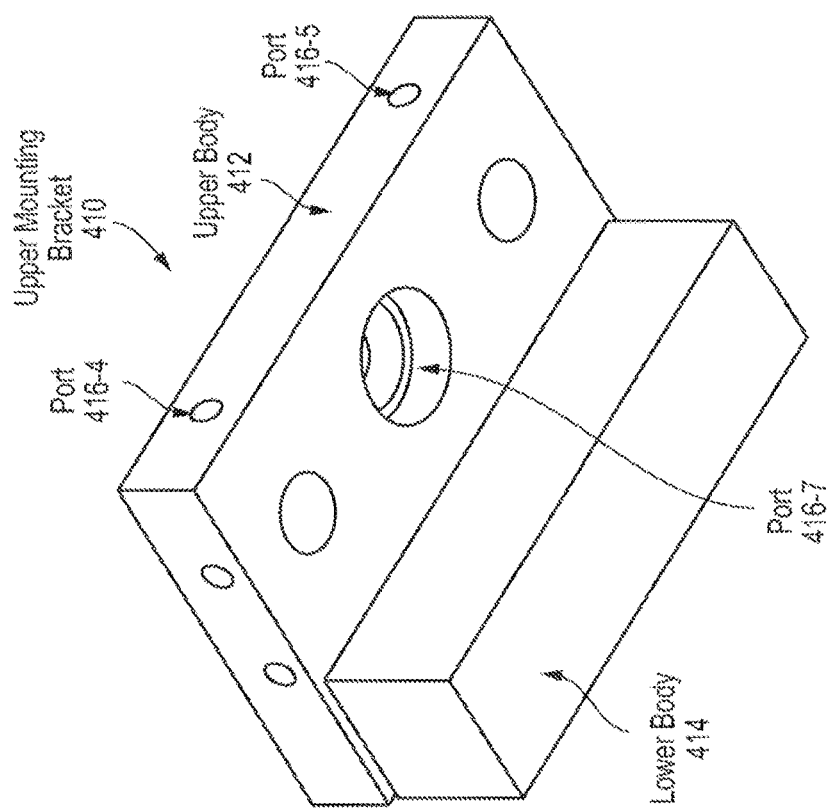
Figure 35:
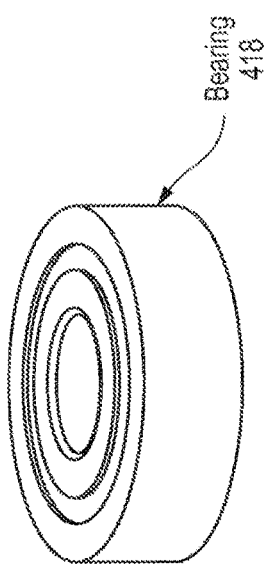
Figure 33:
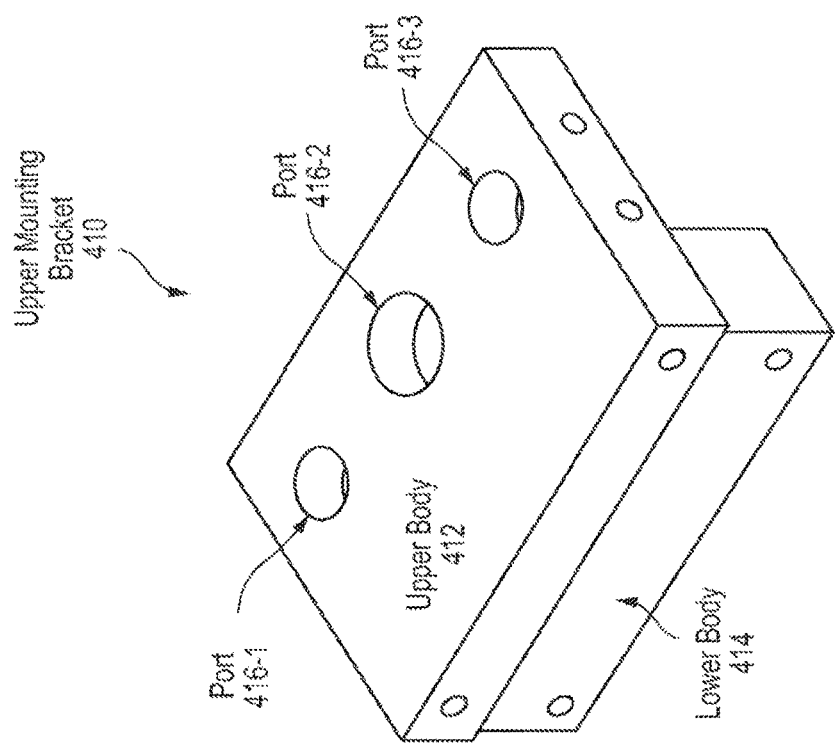
Figure 37:
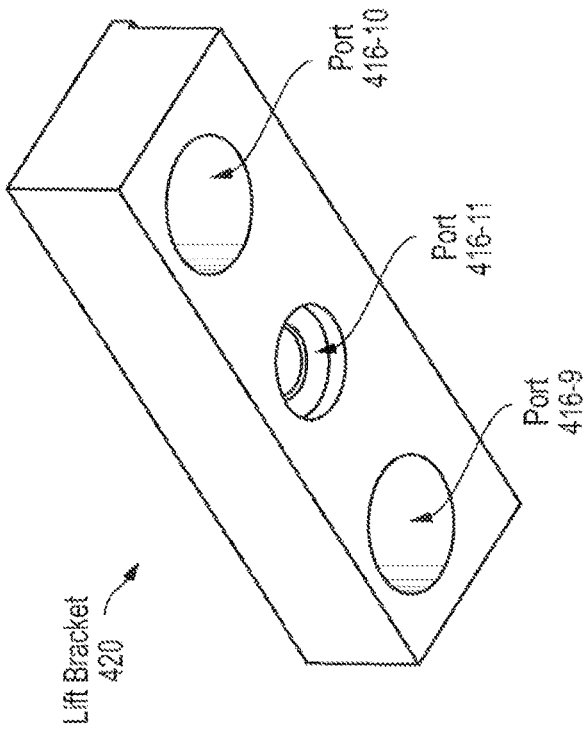
Figure 36:
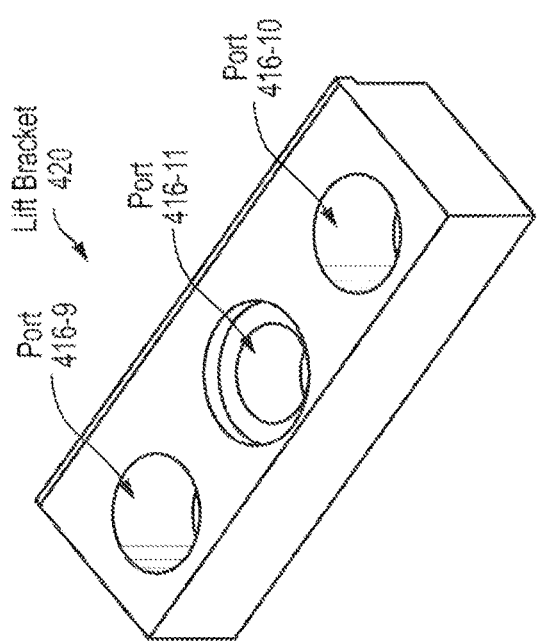
Figure 38:
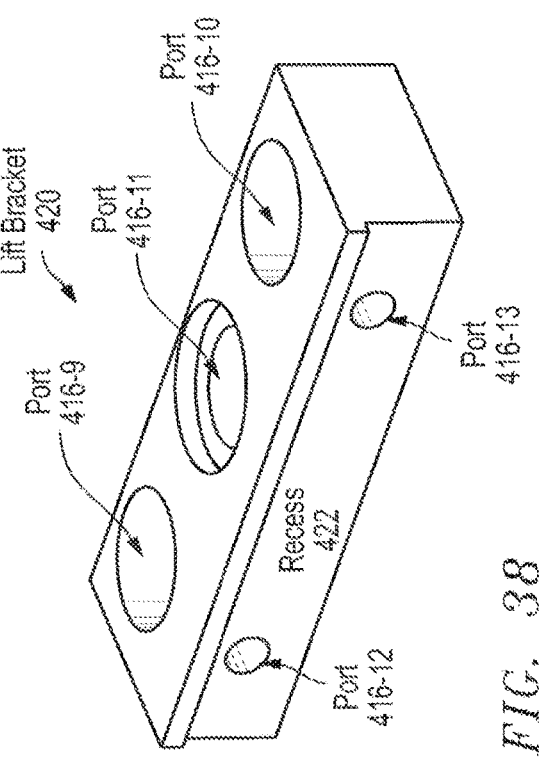
Figure 40:
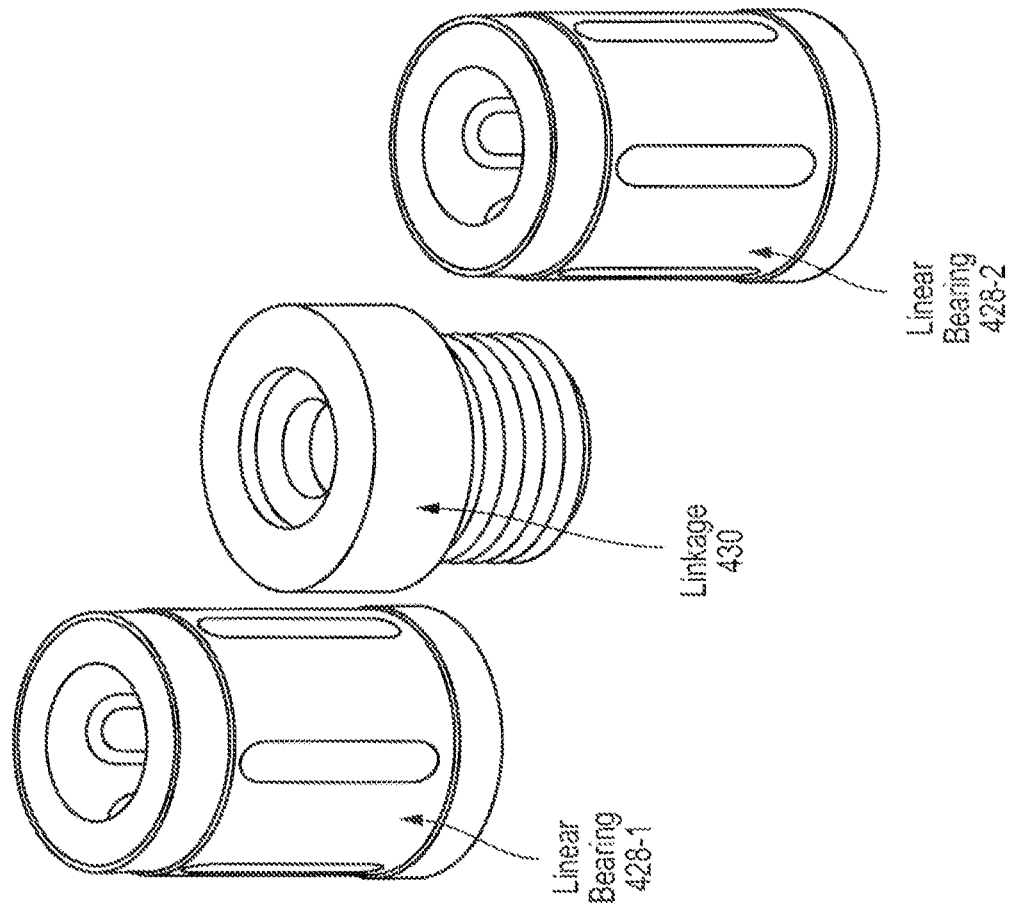
Figure 39:
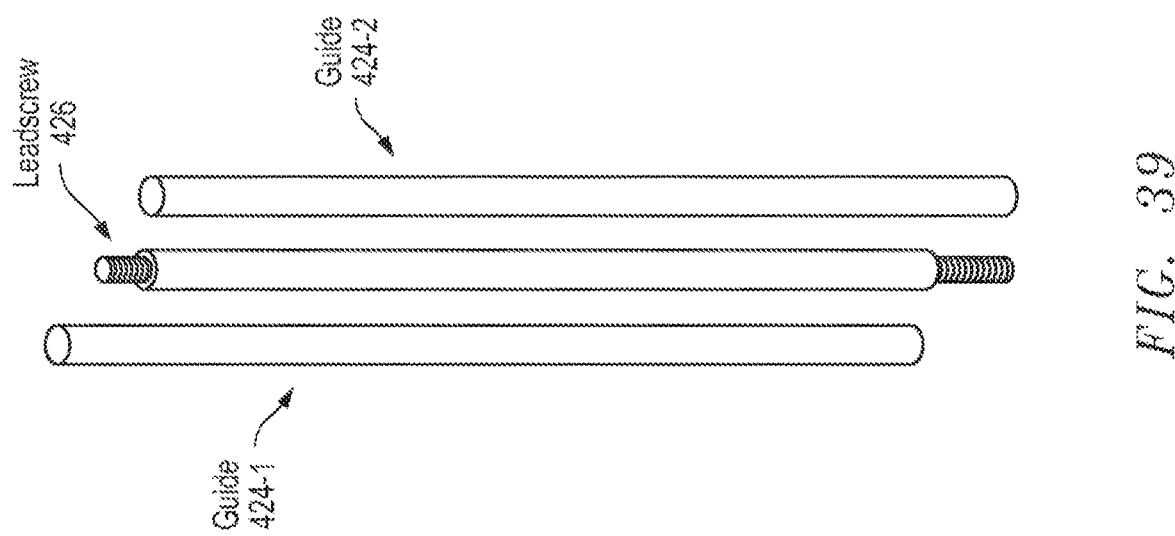

Looking first to an example of the upper mounting bracket 410 (which is shown in FIGS. 33 and 34), it is typically formed of two bodies: an upper body 412 and lower body 414. Each of the upper and lower bodies 412 and 414 can be generally parallelepiped-shaped, formed of a right material (e.g., aluminum, steel, or polycarbonate), and may be secured (e.g., brazed or glued) together or integrally formed. The upper body 412 in this example has a top and opposite bottom face and a front and opposite rear face. The lower body 414 in this example has a front and opposite rear face. A shown in this example, the lower body 414 extends from the bottom face of the upper body 412 with the rear faces of the upper and lower bodies 412 and 414 being aligned or coplanar with the rear face of the upper body 412. Moreover, as shown in this example, the cross-sectional area of lower body 414 is smaller than that of the bottom face of the upper body 412—leaving a open region between the lower body 414 and the front face of the upper body 414. There may also be open regions between each of the side faces of the upper body 412 and lower body 412. Ports (not labeled) may also be formed in the rear faces of the upper and lower bodies 412 and 414 (which may also be threaded so that the upper bracket 410 may be bolted to the end plate 486).

Turning back to the upper body 412, it also typically includes ports for the track system. Specifically, as shown in the examples of FIGS. 33 and 34, there can be a port 416-7 formed substantially at the center of the open region between the lower body 414 and front face of the upper body 412. Then, again in this example, there is a port 416-2 formed in the top face of the upper body 412, which is coaxial with port 416-7 and which intersects port 416-7. Also, again in this example, port 416-7 has a larger diameter than port 416-2 with the diameter being dimensioned to receive bearing 418 shown in FIG. 35 (which may be a roller or ball bearing assembly known in the art). Typically, the fit between the port 416-7 and bearing 418 is an interference fit, but it may also be a slip fit. Additionally, there can be ports 416-1 and 416-3 which extend through the upper body 412 from the upper face to the bottom face. In this example, the central axis of each of the ports 416-1, 416-2, and 416-3 lie in the same plane. Port (not labeled) may also be formed in the side faces of the upper body 412 (which may be threaded) to allow limit switch assemblies (discussed with respect to FIGS. 44 to 48 below) to be secured. Along the front face of the upper body 412 in the example shown in FIG. 34, there are also ports 416-4 and 416-5 that extend into the upper body 412, which are aligned with and intersect ports 416-3 and 416-1, respectively. Typically, these port 416-4 and 416-5 are threaded so as to be able to receive a set screw.

Turning to FIGS. 36 to 40, an example of the lift bracket 420 and track assembly can be seen. As shown in this example, the lift bracket 420 has three ports 416-9 to 416-11 that extend through the lift bracket 420 from its top face to the bottom face. The three ports 416-9 to 416-11 in this example have central axes that lie in the same plane with port 416-11 formed substantially in the center of the bottom face of the lift bracket 420. As shown in this example, port 416-11 is threaded, countersunk, and dimensioned so that external threads of linkage 430 may be threaded into it and that the shoulder rests in the countersink. Each of the ports 416-9 and 416-10 shown in this example may be dimensioned to receive linear bearings 428-1 and 428-2 (which are well-known in art). Typically, ports 416-9 and 416-10 form a slip fit with linear bearings 428-1 and 428-2. The bearings 428-1 and 428-2 can be held in place with set screws (not shown) that can be threaded into ports 416-12 and 416-13 (which can be threaded). These ports 416-12 and 416-13 can be formed in the face of the substantially rectangular recess 422 in the front face of the lift bracket 420. In this example shown in FIGS. 36 to 38, the recess 422 cause the bottom face of the lift bracket 420 to be smaller than top face of the lift bracket 420. Each of the linear bearings 428-1 and 428-2 typically has an inner diameter dimensioned to form a slip fit with guides 424-1 and 424-2 (which themselves may be secured the upper mounting bracket 410 through ports 416-1 and 416-3). The linkage 430 (which is known in the art) typically has in inner thread which is dimensioned to engage leadscrew 426 (which has a short shoulder that is dimensioned to form a slip fit with port 416-2 and dimensioned to form an interference with the inner diameter of the bearing 418). Collectively, the bearings 428-1 and 428-2, linkage 430, guides 424-1 and 424-2, and leadscrew 426 may be referred to as the track assembly.

Figures 41, 42:
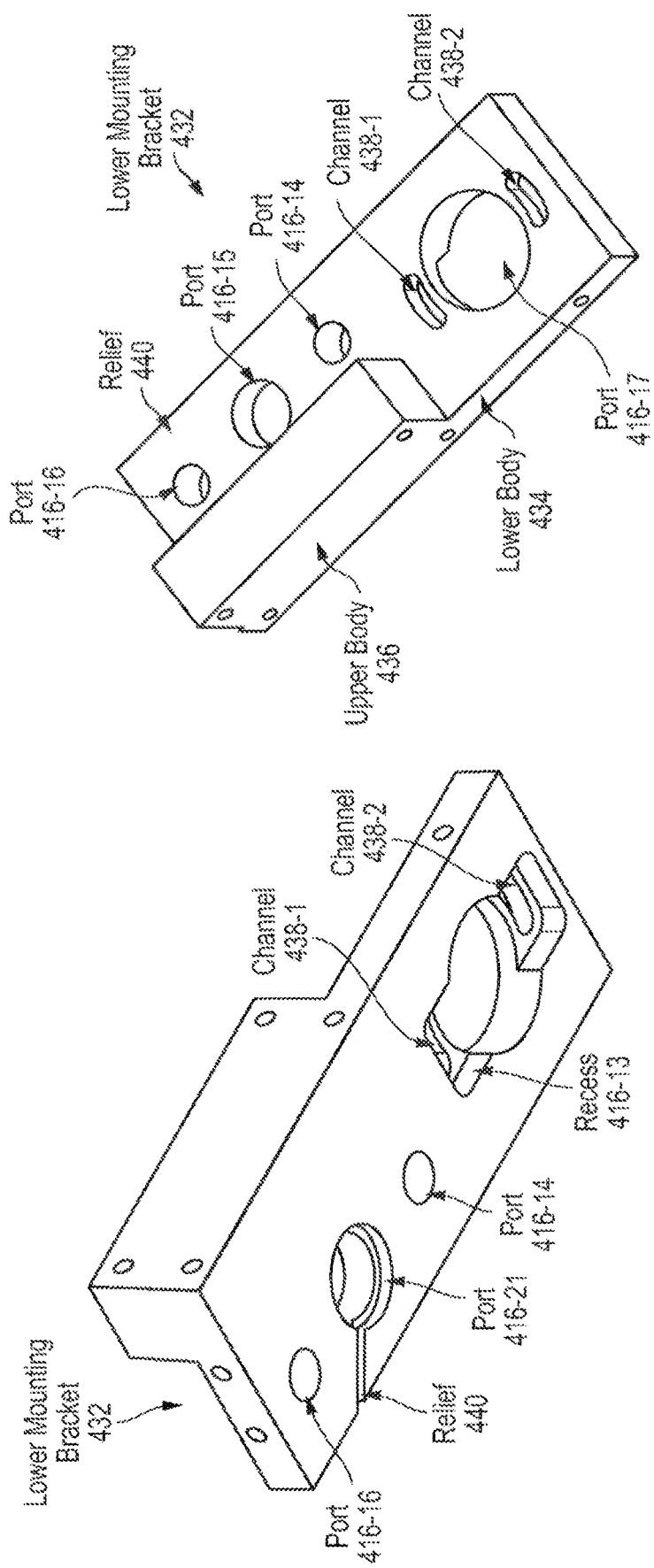
Figure 43:
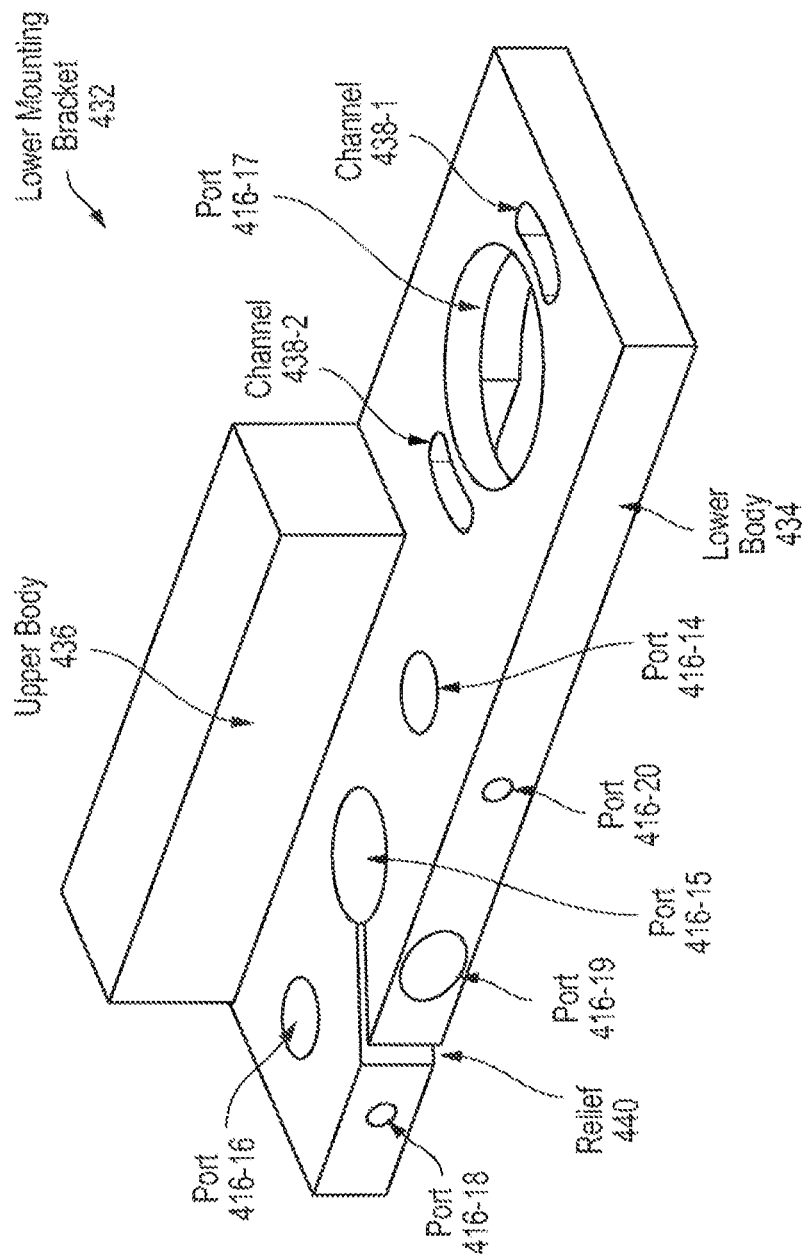
Figure 46:
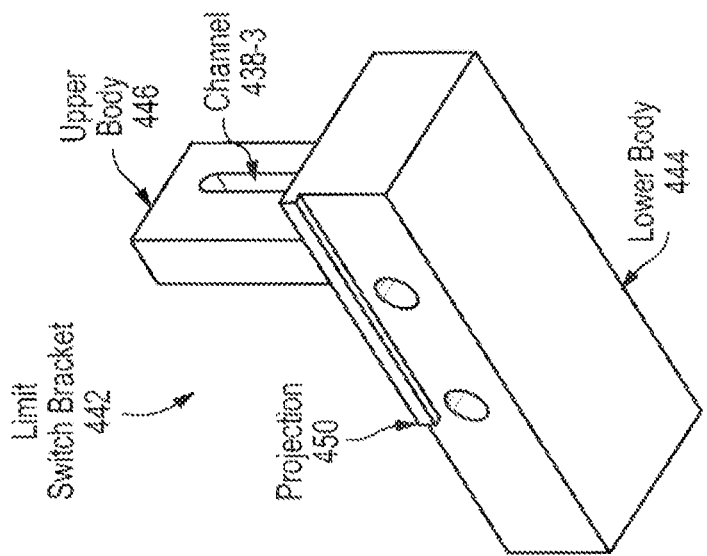
Figure 45:
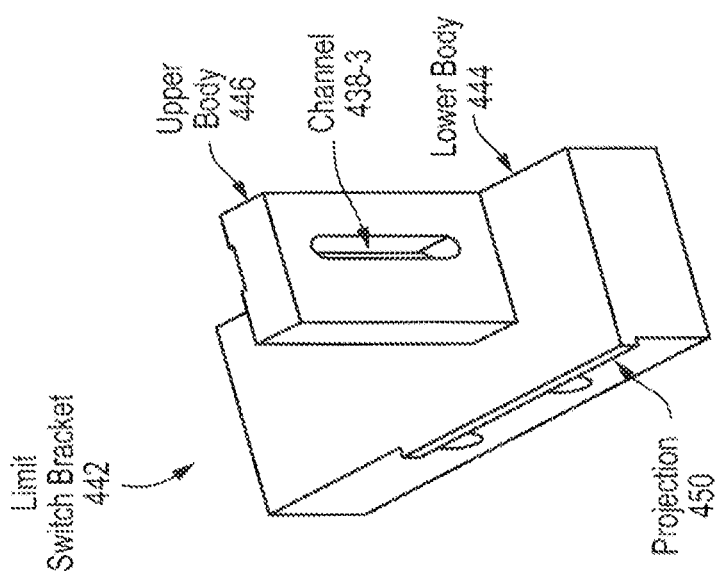
Figure 44:
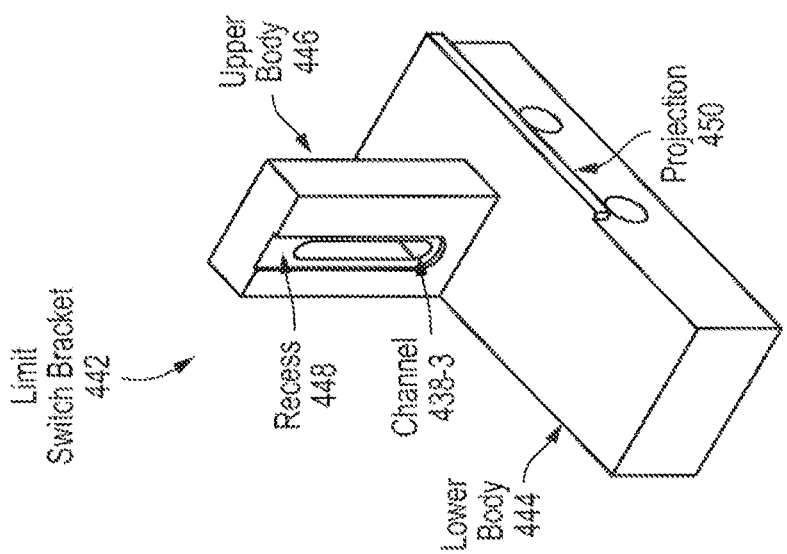
Figure 48:
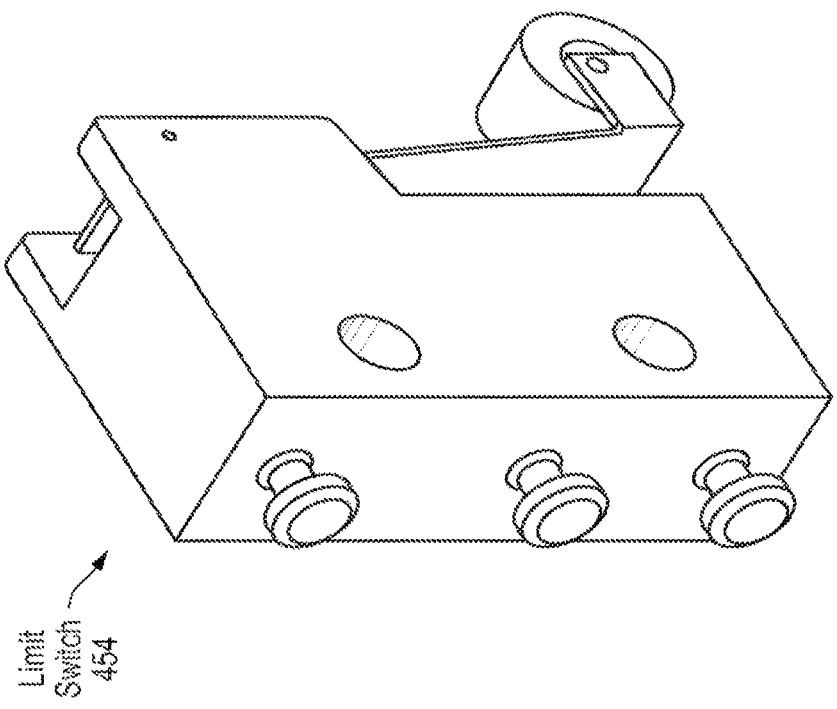
Figure 47:
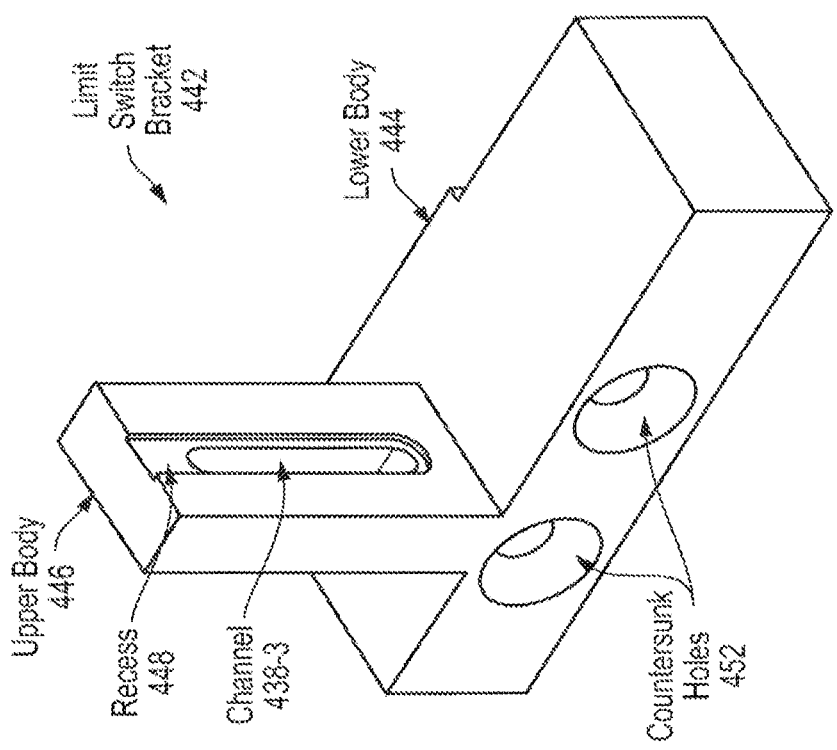

Now, turning to FIGS. 41 to 43, an example of the lower mounting bracket 432 can be seen. The lower mounting bracket 432 may be comprised of a lower body 434 and an upper body 436 (which may both be generally parallelepiped in shape). The upper body 436 in this example extends from the top face lower body 434 (with the front and a side face of each being aligned at a corner). The upper and lower bodies 434 and 436 are typically formed of a rigid material (e.g., aluminum, steel, or polycarbonate) and may be secured to one another (e.g., glued or brazed) or be integrally formed. As shown in the examples of FIGS. 41 to 43, the upper body 436 is narrower in width and shorter in length than the lower body 434 so as to form open regions on the top face of the lower body 434 between the rear face of the lower body 434 and the upper body 436 (which is referred to as the guide region) and between the end of the lower body 436 and one side face of the lower body 434 (which is referred to as the motor region). Within the guide region of the top face of the lower body 434, ports 416-14 to 416-16 may be formed and extend into the lower body 434. Port 416-15 may be located generally in the center of the guide region, while ports 416-14 and 416-16 may be spaced apart from port 416-15 with all three having their central axes lying in the same plane. Ports 416-14 and 416-16 can extend from the top face to the bottom face of the lower body 434, while port 416-15 may be coaxial with port 416-21 (which may be formed in the bottom face of the lower body 434 and intersect port 416-15). Port 416-21 may also have a larger diameter than that of the port 416-15 (which may be dimensioned to form a slip fit with the outer diameter of bearing 464). A relief 440 may also be formed in the lower body 434, which extends at an angle (e.g., 45 degrees) from the rear face of the lower body 434 to ports 416-15 and 416-21. Port 416-19 may also be formed in the rear face of the lower body at a right angle to the relief 440. Typically, port 416-19 is a countersunk, threaded hole where the threads extend across the relief 440. Collectively, relief 440 and port 416-19 can allow bearing 464 to be seated in port 416-21 and held in place by pressure of a bolt (not shown) threaded into port 416-21. Similarly, ports 416-18 and 416-20 may be formed in the rear face of the lower body 434 and intersect ports 416-16 and 416-14, respectively. Ports 416-18 and 416-20 may be threaded so to receive set screws (not shown) which may engage guide 424-1 and 424-2 that can form a slip fit with ports 416-18 and 416-20. It may be noted that the leadscrew 426 in this example has a long shoulder that is dimensioned to form an interference with the inner diameter of the bearing 464 (as depicted in the example of FIGS. 49 and 50 and which can be a roller or ball bearing).

Turning to the motor region of the top face of the lower body 434, it may be configured to hold a motor in place. As show in the example of FIGS. 41 to 43, there is a port 416-17 and channels 438-1 and 438-2 which extend into the lower body 434. The channels 438-1 and 438-2 in this example are curved slots with a radius of curvature centered on central axis of the port 416-17, are spaced apart from the port 416-17, and are symmetric with respect to the central axis of port 416-17. On the bottom side of the lower body 433, port 416-13 may be formed that extend into the lower body. The port 416-13 depicted in this example has a quad-slot shape—a slot with curved, symmetric doglegs along the long side of the slot. Port 416-13 in this example, intersects channels 438-1 and 438-2 and port 416-17. Additionally, ports (which are not labeled, and which may be threaded) may be formed in the side face of the lower body 434 to allow a limit switch assembly (discussed with respect to FIGS. 44 to 48 below) to be attached. Ports (which are not labeled, and which may be threaded) may be formed in the front faces of the upper body 436 and lower body 434 to allow it to be secured to the end plate 486.

Now turning to FIGS. 44 to 47, an example of a limit switch assembly may be seen. In this example, the limit switch assembly may be comprised of a limit switch 454 (which is known in the art) and a limit switch bracket 442. The limit switch bracket 442 in this example is generally comprised of an upper body 446 and a lower body 444, which are typically formed of a rigid material (like aluminum, steel, or polycarbonate) and which may be secured together (e.g., by gluing, or brazing) or may be integrally formed. The lower body 444, as shown in this example, is generally parallelepiped in shape with a projection 450 extending from a portion its rear face. The projection 450 can be aligned with the top face and one side face of the lower body 444 at a corner. Countersunk holes 452 as shown in this example are formed in the front face of the lower body 444 and dimensioned to form a slip or clearance fitting with bolts. The upper body 446 can extend from the top surface of the lower body 444 with its rear face being aligned with rear face of the lower body 444. Also, as shown in the example of FIGS. 44 to 47, a recess 448 is formed in one side face of the upper body 446, and a channel 438-3 (which, as shown is a slot) extends from the opposite side face of the upper body 446 to the recess 448. The recess 448 can seat a bolt head, while a bolt shaft can extend to through the channel 438-3 to allow the limit switch bracket 442 can be secured (e.g., bolted) to the limit switch 454 (shown in the example of FIG. 48).

Figure 50:
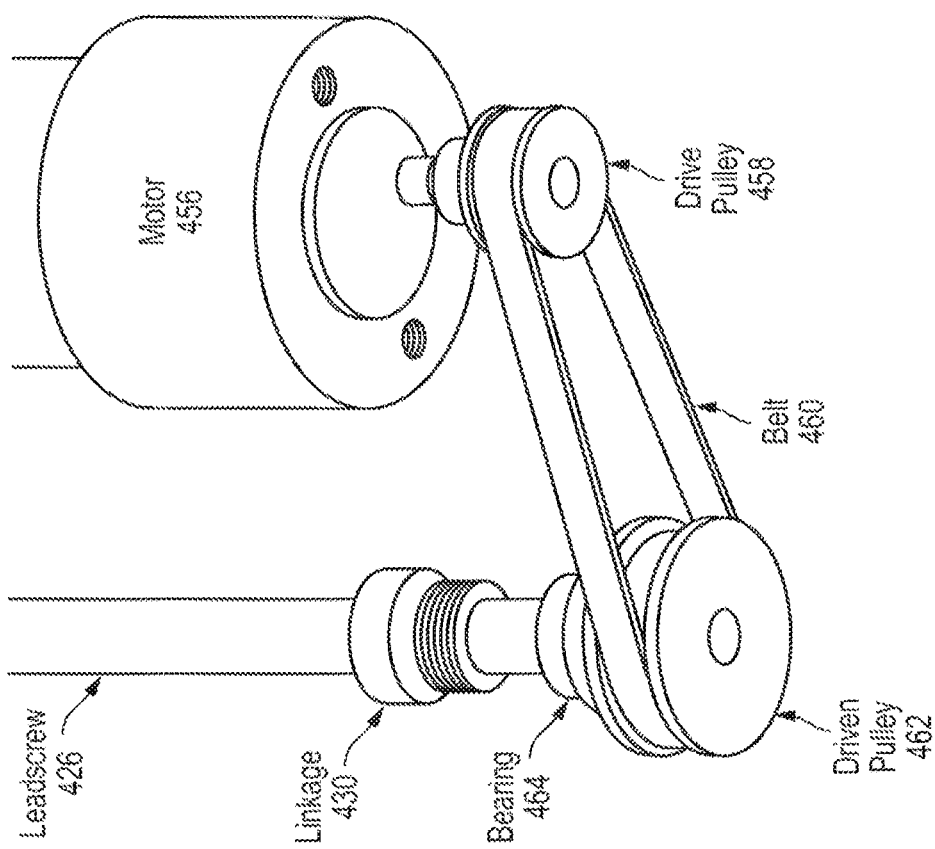
Figure 49:
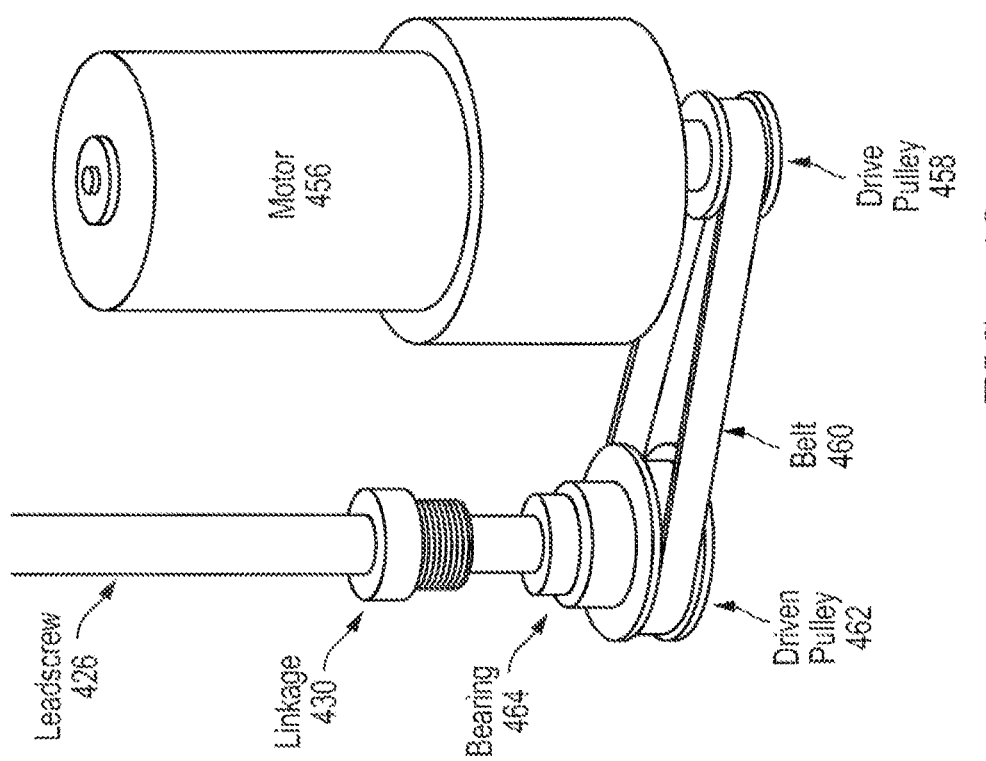
Figure 51:
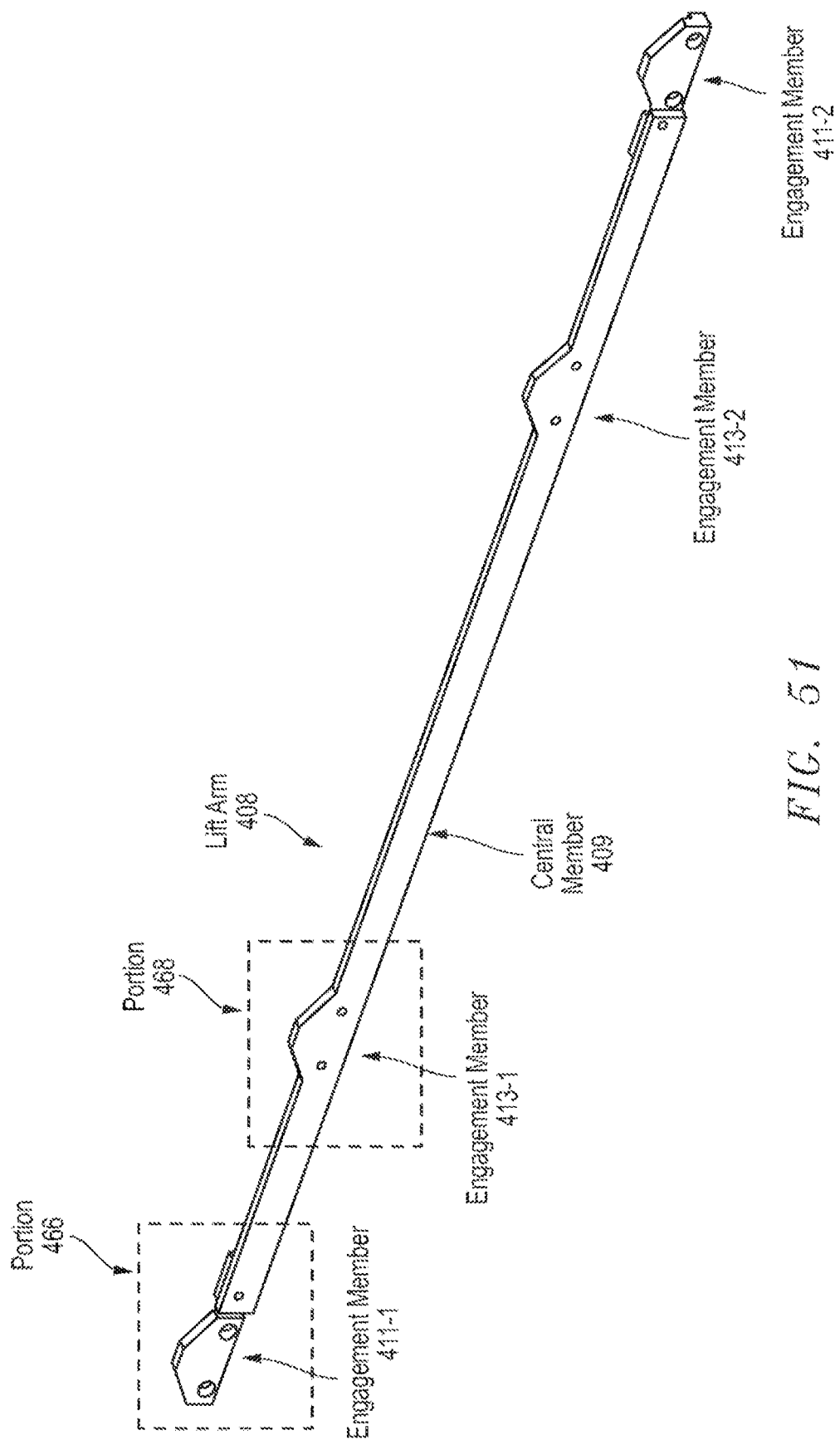

In FIGS. 49 and 50, an example of the lift drive can be seen. As shown, a motor 456 can be seated in port 416-17 such that its drive shaft extends through port 416-7. The motor 456 shown can also have a pair of threaded holes that can be aligned with channels 438-1 and 438-2 such that motor 456 may be secured to the lower mounting bracket 432. A drive pulley 458 can be secured to the drive shaft of motor 456, and a driven pulley 462 can be secured to the long shoulder of leadscrew 426. The drive pulley 458 can drive the driven pulley 462 through belt 460, and the ratio of the drive pulley 458 to the driven pulley 462 is greater than one to create sufficient torque to lift the lift bracket 420.

Turning to FIGS. 51 to 54, an example of the lift arm 408 can be seen. As shown in this example, there are engagement members 411-1 and 411-2 located at the ends of the arm 408, while members 413-1 and 413-2 are part of the central member 409 that extends between engagement member 411-1 and 411-2. The engagement members 411-1 and 411-2 may be secured (e.g., bolted, brazed, or glued) to central member 409 or may be integrally formed. These engagement members 413-1 and 413-2 can be positioned to engage difference sizes of light assemblies (e.g., 300).

Figure 53:
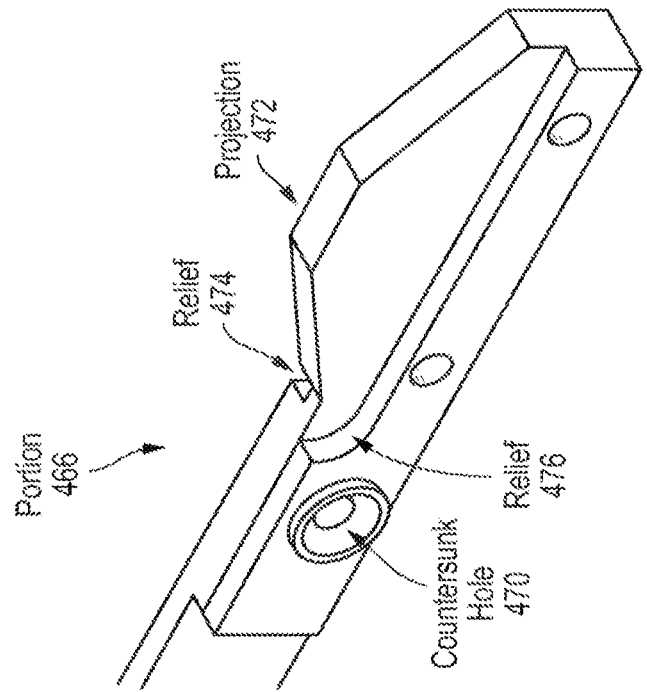
Figure 52:
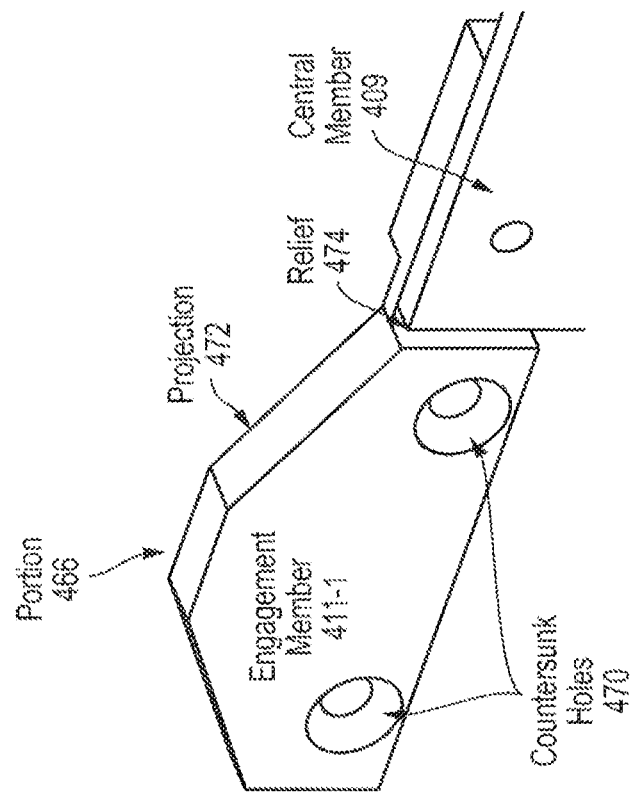
Figure 54:
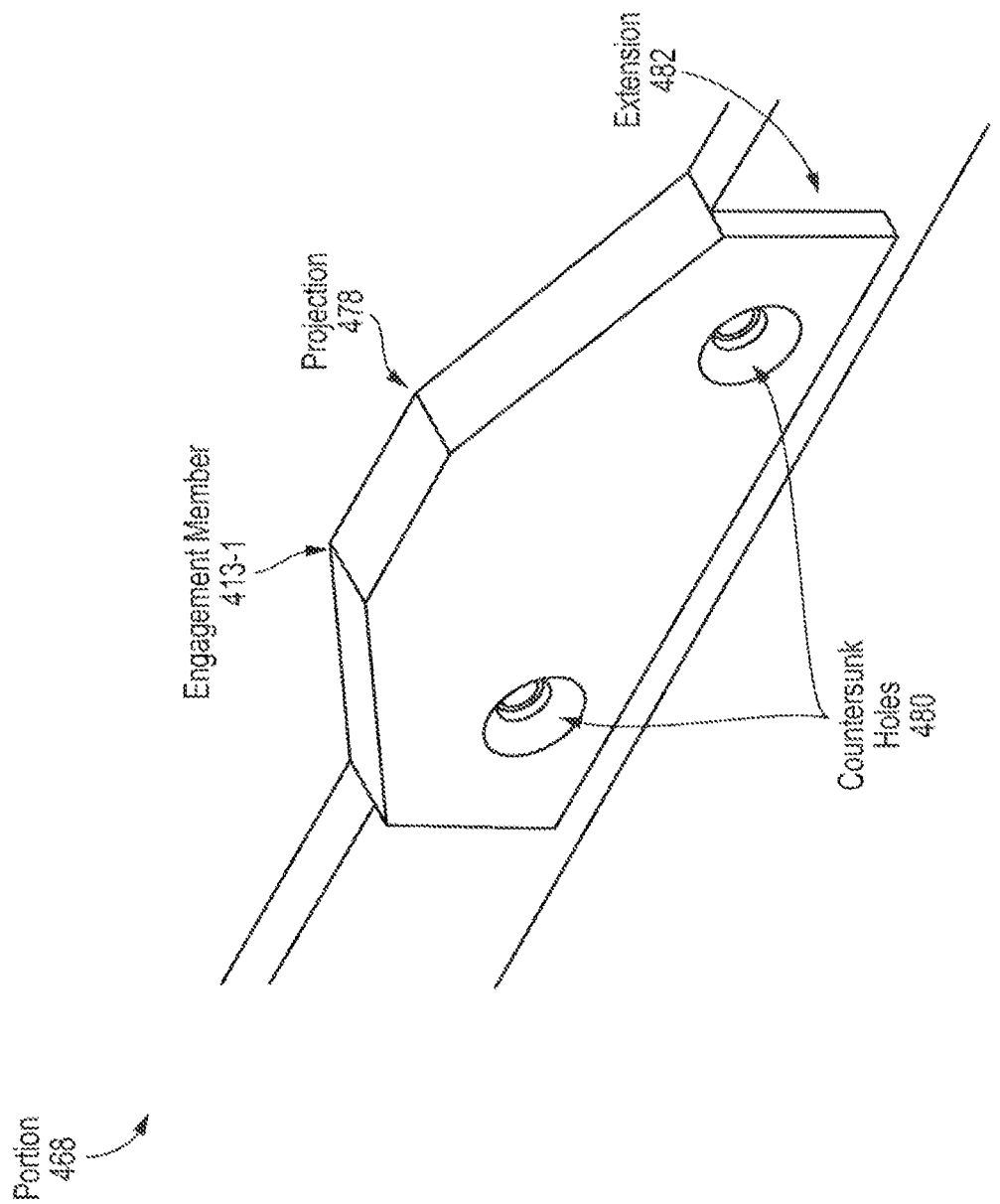

Focusing on portion 466, an example of engagement member 411-1 (which is the same as member 411-2 in this example) is shown in FIGS. 52 and 53. As shown in this example, member 411-1 includes a portion that extends over the central member 409 and includes a countersunk hole 470. Also, as shown, there is a relief 476 and a generally-trapezoidal projection 472. The relief 474 can be dimensioned to so as to seat the projection in the space created by the recess 422 in the lift bracket 420. Countersunk holes 470 (which can be dimensioned to form a slip fit with machine screws or bolts) can be aligned with ports 416-12 and 416-13 of the lift bracket 420 such that the arm 408 can be secured (e.g., bolted) to a pair of lift assemblies (e.g., 406-1 and 406-2). Additionally, the upper edge of the projection 472 can be dimensioned to fit between the extended bodies 328-1 and 328-2 of the mounting member 318 (where it may abut setback faces 332-1 and 332-2) to engage and lift a light assembly 300. Similarly, engagement member 413-1 (an example of which is shown with portion 468 in FIG. 54) can include countersunk holes 480 so that it can be secured (e.g., bolted) to an additional lift assembly (not shown). An extension 482 is also shown in this example. The example depicted in FIG. 51 includes a pair of engagement members (i.e., 413-1 and 413-2) to allow additional contact points for a light assembly (e.g., 300). For examples, in which there are additional contact points, the light assembly can include a mounting assembly 302 for each projection (e.g. 472 and 478).

Figure 56:
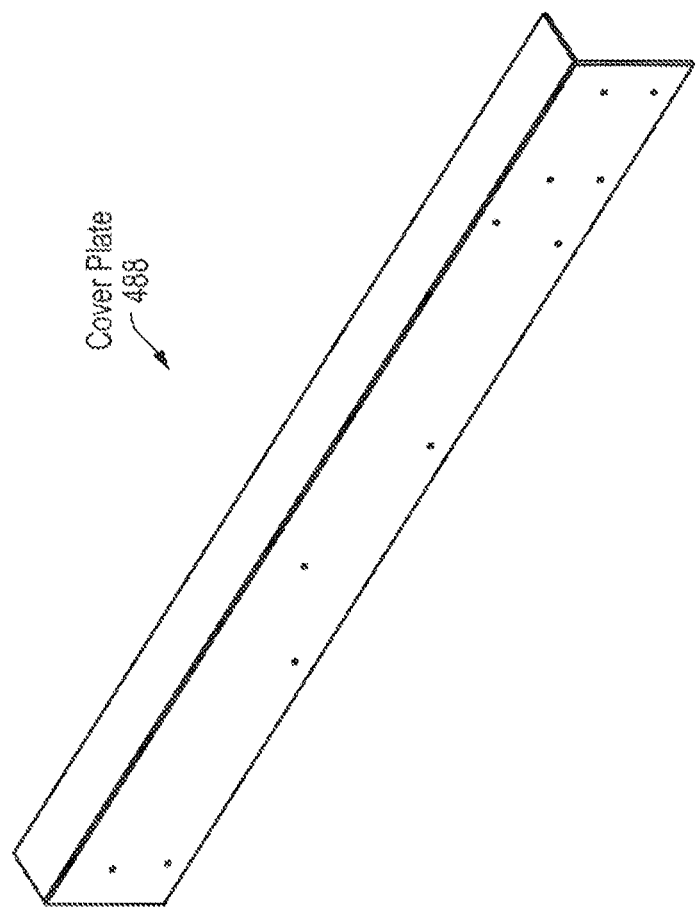
Figure 57:
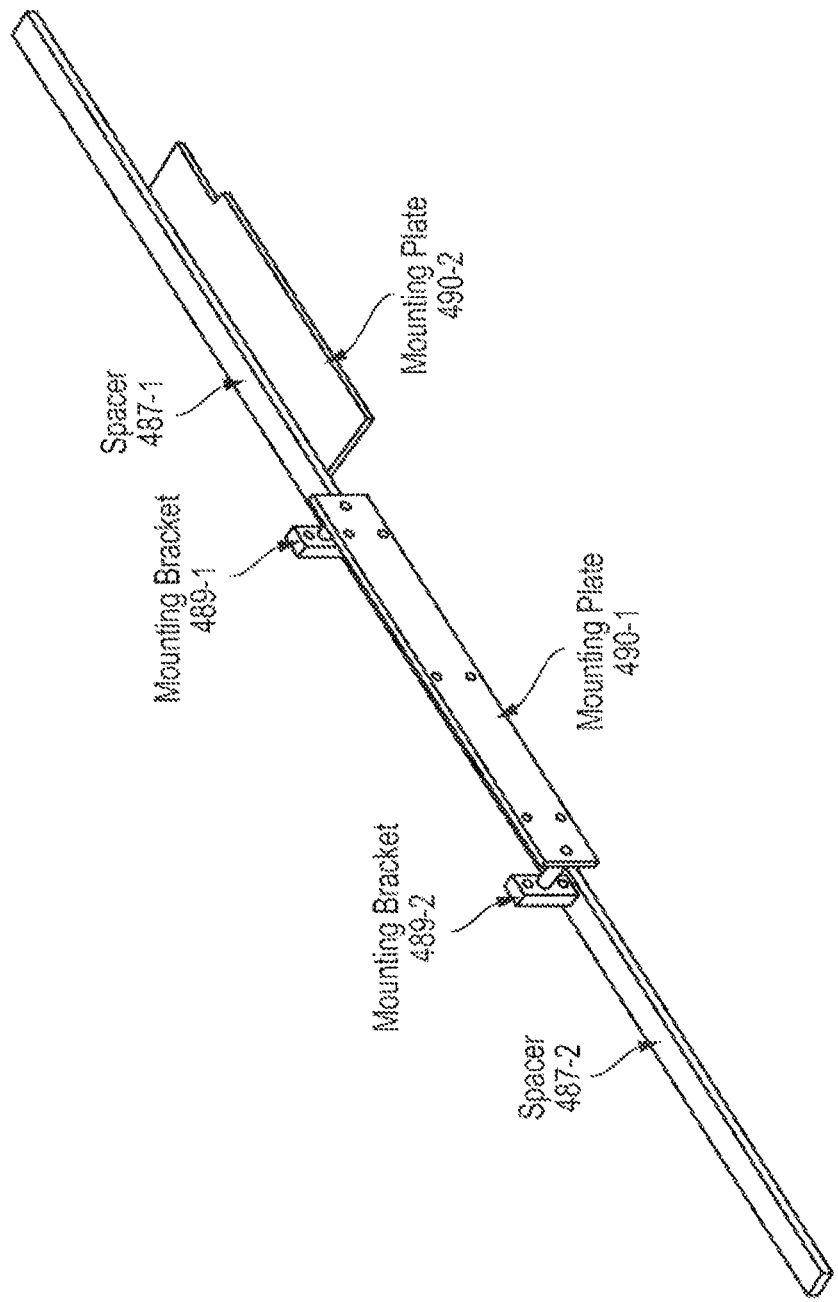
Figure 62:
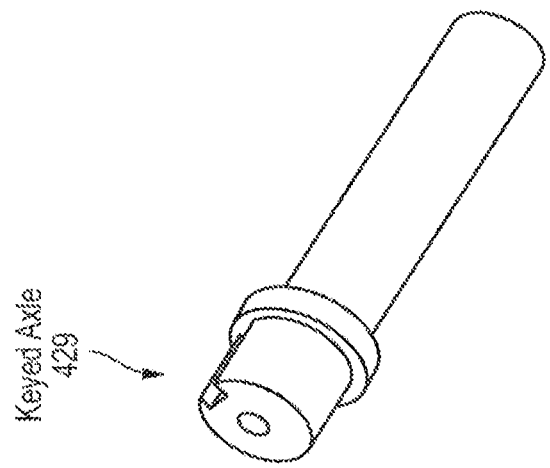
Figure 61:
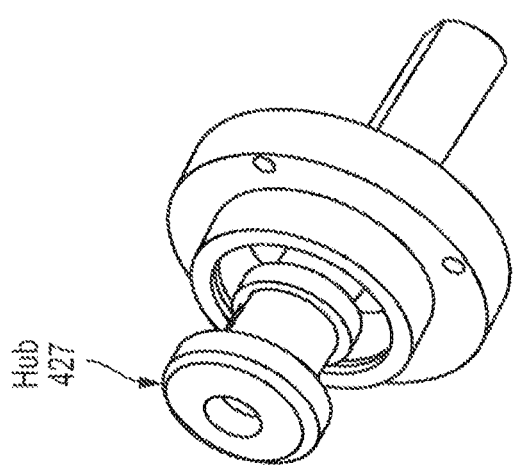
Figure 63:
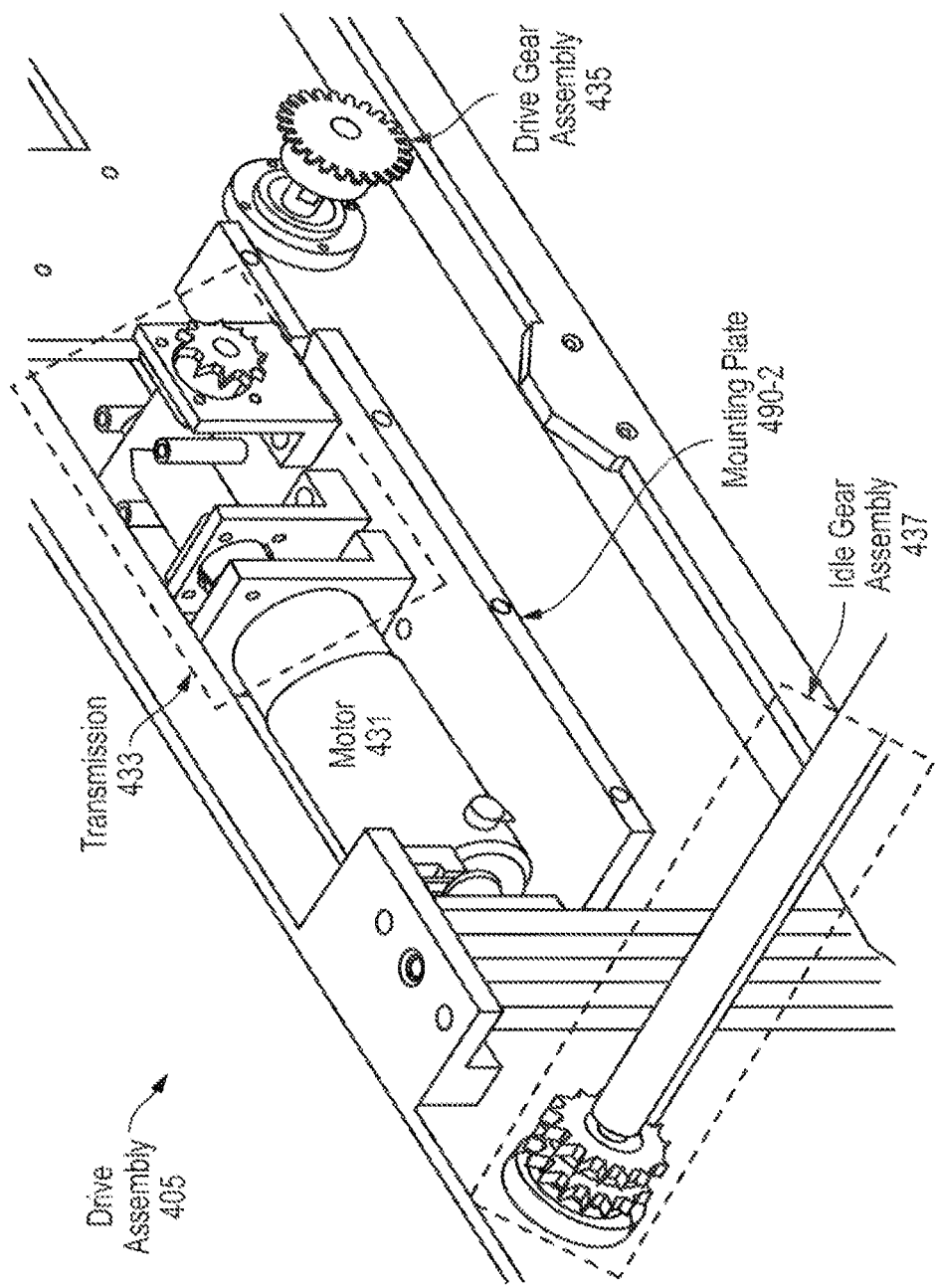
Figure 69:
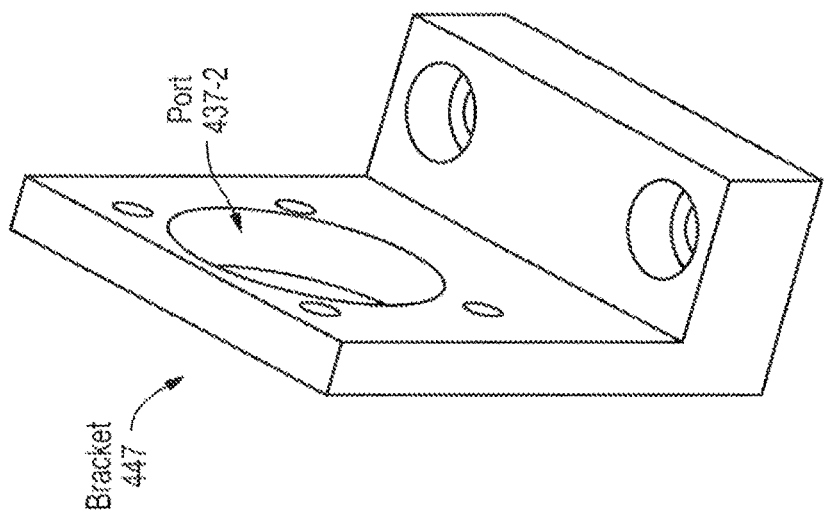
Figure 67:
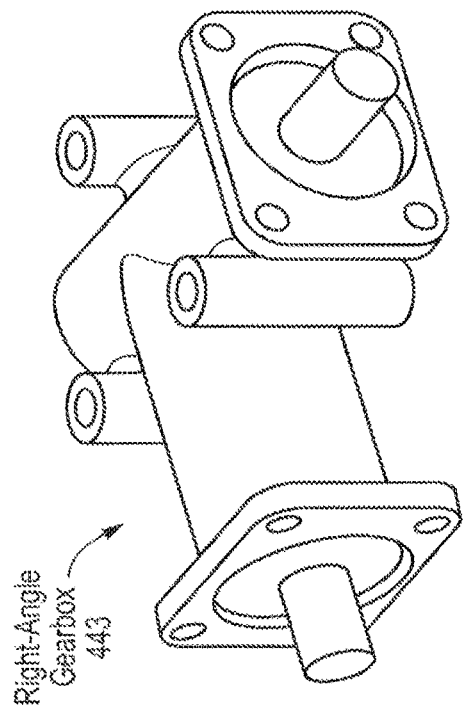
Figure 68:
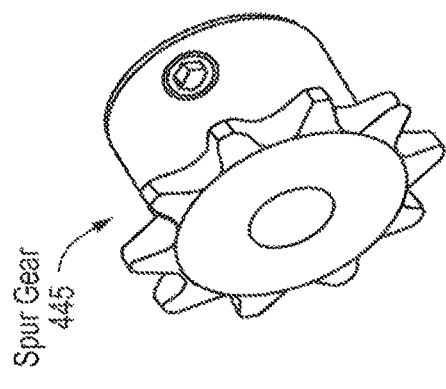
Figures 70, 71:
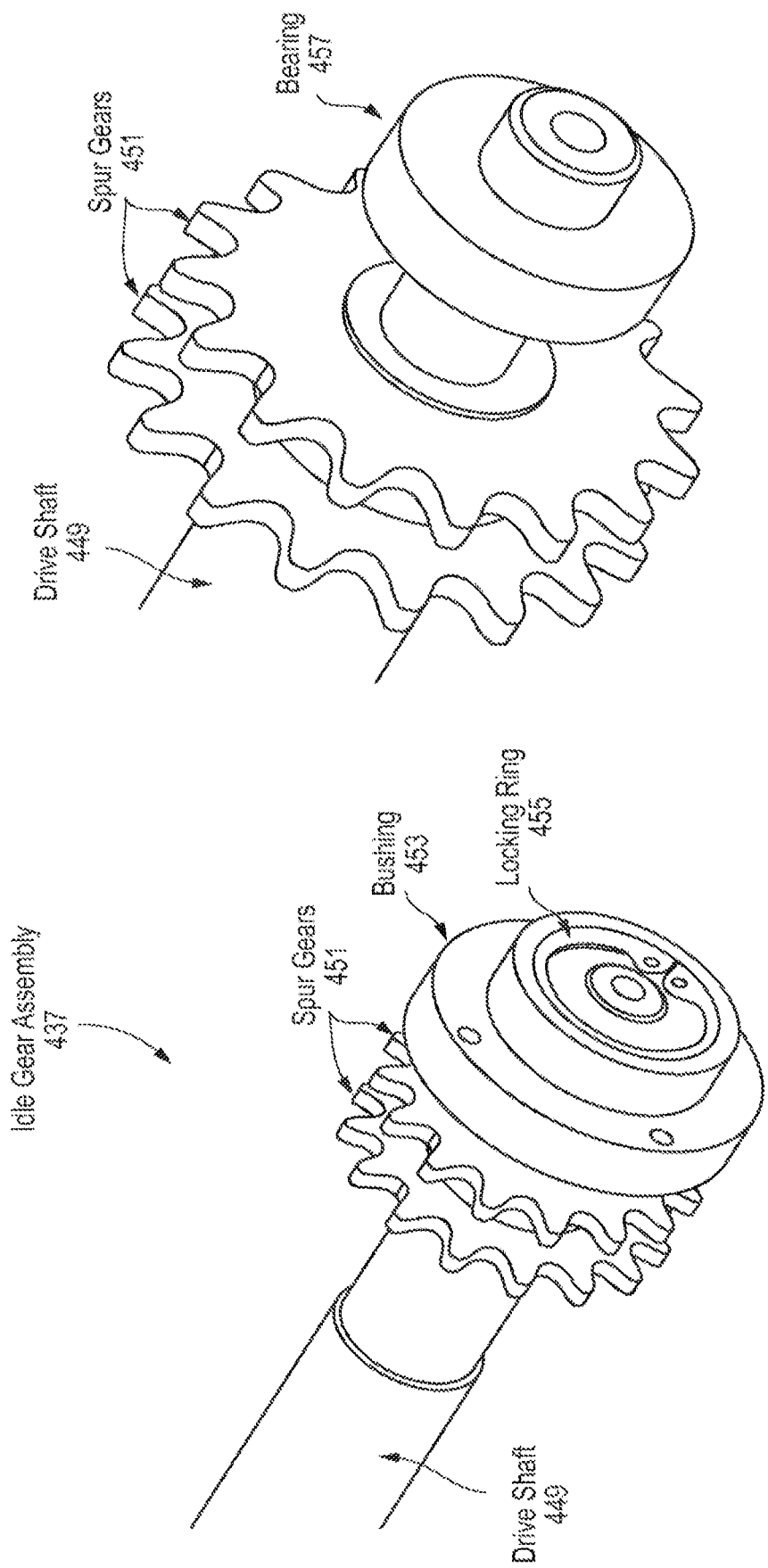
Figure 73:
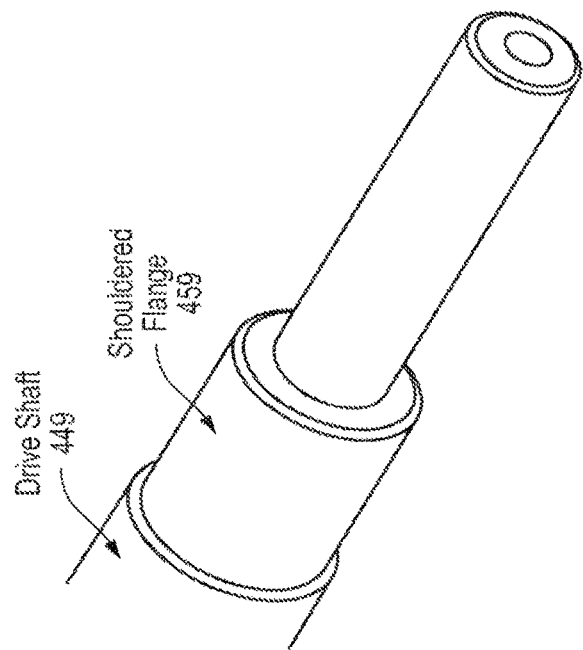
Figure 74:
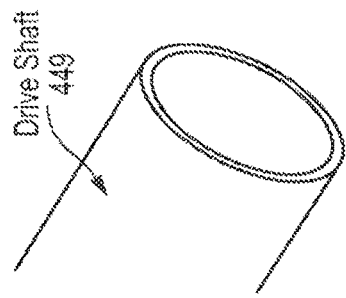
Figure 72:
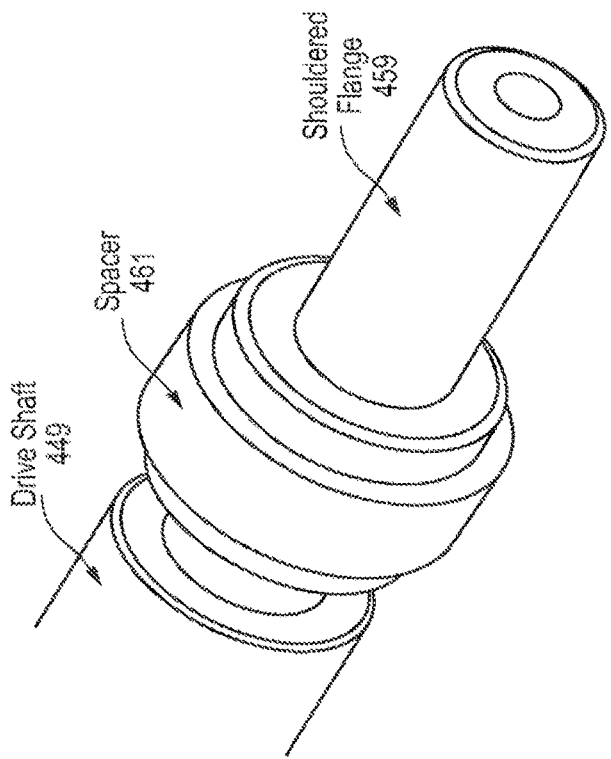

As described above, the end plate 486 can form the central member for an end assembly (e.g., 404-1). An example of this can be seen in FIGS. 55 to 57. Spacers 487-1 and 487-2, mounting brackets 489-1 and 489-2, mounting plates 490-1 and 490-2, and cover plate 488 can all be secured (e.g., bolted) to the end plate 486; all of which can be formed out of rigid materials (like aluminum, steel, or polycarbonate). Spacer 487-1 may also be used as a shelf that secures or houses electronics. The lift assemblies (e.g., 406-1 and 406-2)—as described above—and drive assemblies can also be secured to the end plate 486. An example of the drive assembly can be seen in greater detail in FIGS. 58A to 74.

Beginning with the drive wheel assemblies 403 (of which an example can be seen in FIGS. 58A to 62 and which may be part of wheel assembly 403), these wheels can be secured (e.g., bolted, glued, or brazed) to an end plate 486. Ports (not labeled) can be formed within end plate 486 in which the shoulder of the bushing 423 can be seated and bolted. A bearing 425 (which can be a roller or ball bearing) can be seated within the bushing 423 (as shown in the example). There can be a keyed axel 429 which can have a long shaft (which can be dimensioned to form an interference fit with the inner diameter of the bearing 425), shoulder, and short, keyed shaft (which can be dimensioned to form a slip fit with the inner diameter of wheel 421. As shown in this example, the long shaft can extend through the bearing 425 and bushing 423 so as to be exposed within the interior of the light maintenance dolly 400; this shaft can be freely rotating or may be driven (e.g., by the drive gear assembly 435 depicted in the example shown in FIG. 63). The wheel 421 can be fitted over the short shaft of axel 429 and can be held in rotational lock with the axle 429 by way of a key (not shown). A hub 427 can then be secured to the end of the axle (e.g., glued, bolted, or brazed).

To drive the light maintenance dolly 400, drive wheel assemblies on opposite end assemblies (e.g., 404-1 and 404-2) can be driven by a drive assembly 405, an example of which is depicted in FIGS. 63 to 74. The drive assembly can include drive gear assemblies 435 secured (e.g., bolted) to drive wheel assemblies, a motor 431 secured (e.g., bolted) to mounting plate 490-2, transmission 433 secured to (e.g., bolted) to mounting plate 490-2, and idle gear assembly 437. As shown in this example, the motor 431 can be coupled to the transmission 433 through a coupling assembly. The coupling assembly can include a generally shaped bracket 441 with port 437-1 that can have a shape formed by two overlapping circles of different diameters and a clamping flexible shaft coupling 439 (which is known in the art). Typically, the drive shaft of motor 431 extends through port 437-1 and is secured to the coupling 439. The right-angle gearbox 443 (which is known in the art) typically has an input shaft that extend through port 437-2 of bracket 447 and that can be secured to coupling 439. The right-angle gearbox 443 can also be secured (e.g., bolted) to the plate 490-2. Spur gear 445 (which is known in the art) can then be secured to the output shaft of the right-angle gearbox 443. The spur gear 445 can then turn the drive gear assembly 435 and idle gear assembly 437 by way of a chain (not shown).

Now, turning to the idle gear assembly 437 (of which an example can be seen in FIGS. 70 to 72), it can transfer power to the end assembly (e.g., 404-2) opposite the motor 431 and transmission 433. Generally speaking, the majority of the distance spanned by the idle gear assembly is taken up by hollow drive shaft 449. Secured to each end of drive shaft 449, there should be a shouldered flange 459 (which can be comprised of two coaxial cylinders); the larger of the two coaxial cylinders shown in the shouldered flange 459 in this example is dimensioned to form an interference fit with the inner diameter of the shaft 449. On the smaller of the two coaxial cylinders depicted in the shouldered flange 459 in this example, there can be a spacer 461 that is typically dimensioned to form an interference fit with the cylinder. Spur gears 451 (which can engage gears that engage a drive gear assembly 435 on its respective end) can then be interference fit to the shoulder on the spacer 461. The smaller of the two coaxial cylinders depicted in the shouldered flange 459 in this example can then extend through a bushing 453 (which can be seated and bolted to an end plate 486). This smaller of the two coaxial cylinders depicted in the shouldered flange 459 in this example can ride on a bearing 457 (which may be a roller or ball bearing) seated within the flange 459 and held in place by a locking ring 455 in this example.

Figure 75:
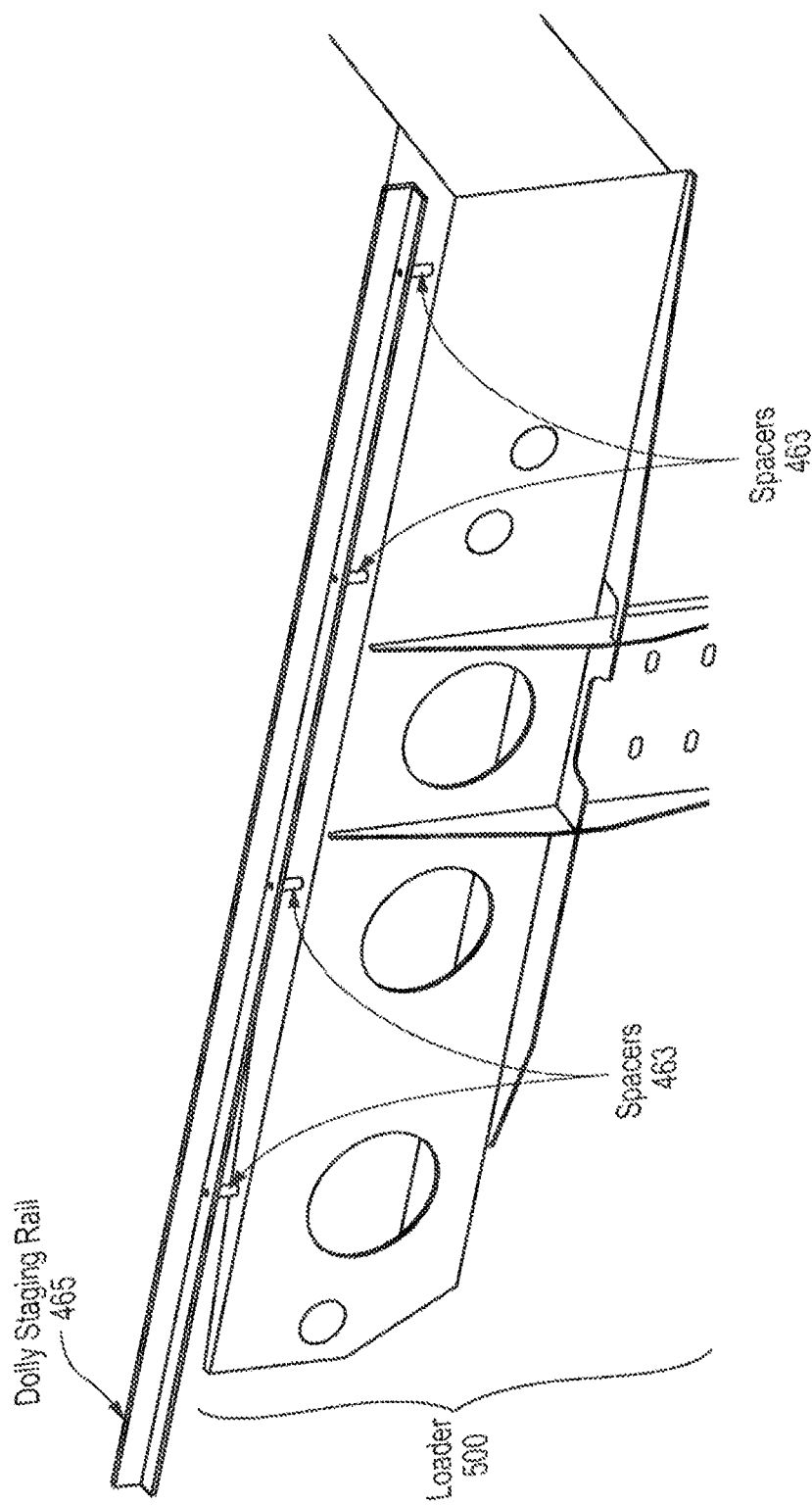

The light maintenance dolly 400 can then be staged or positioned at a level of the grow frame 108 using loader 500. As shown in the example of FIG. 75, there are a pair of dolly staging rails 465 secured (e.g., bolted) to the loader 500 and spaced apart with spacers 463. The staging rails 465 can be positioned to be aligned with pairs of socket assemblies 100 on each level. Moreover, the dolly 400 can be remotely controlled (e.g., via radio frequency or RF) and can be powered by a battery.

Figure 76:
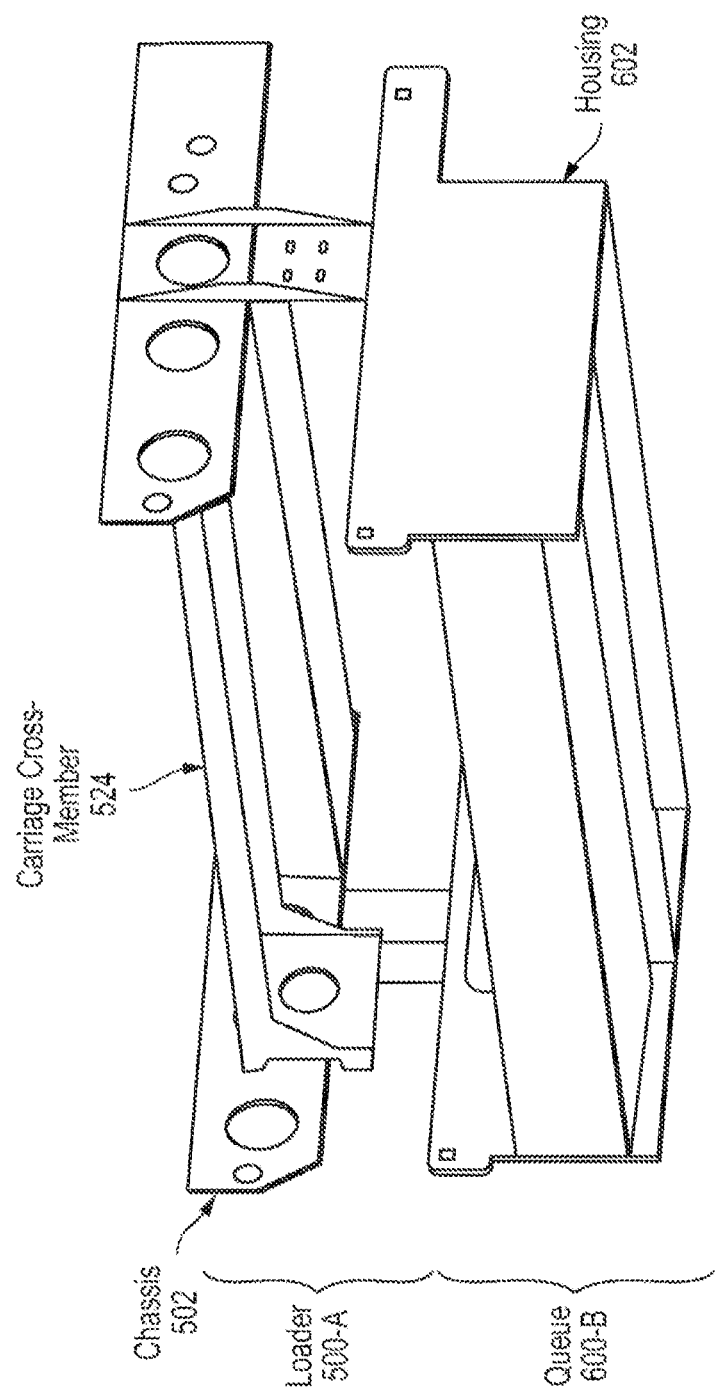
Figure 77:
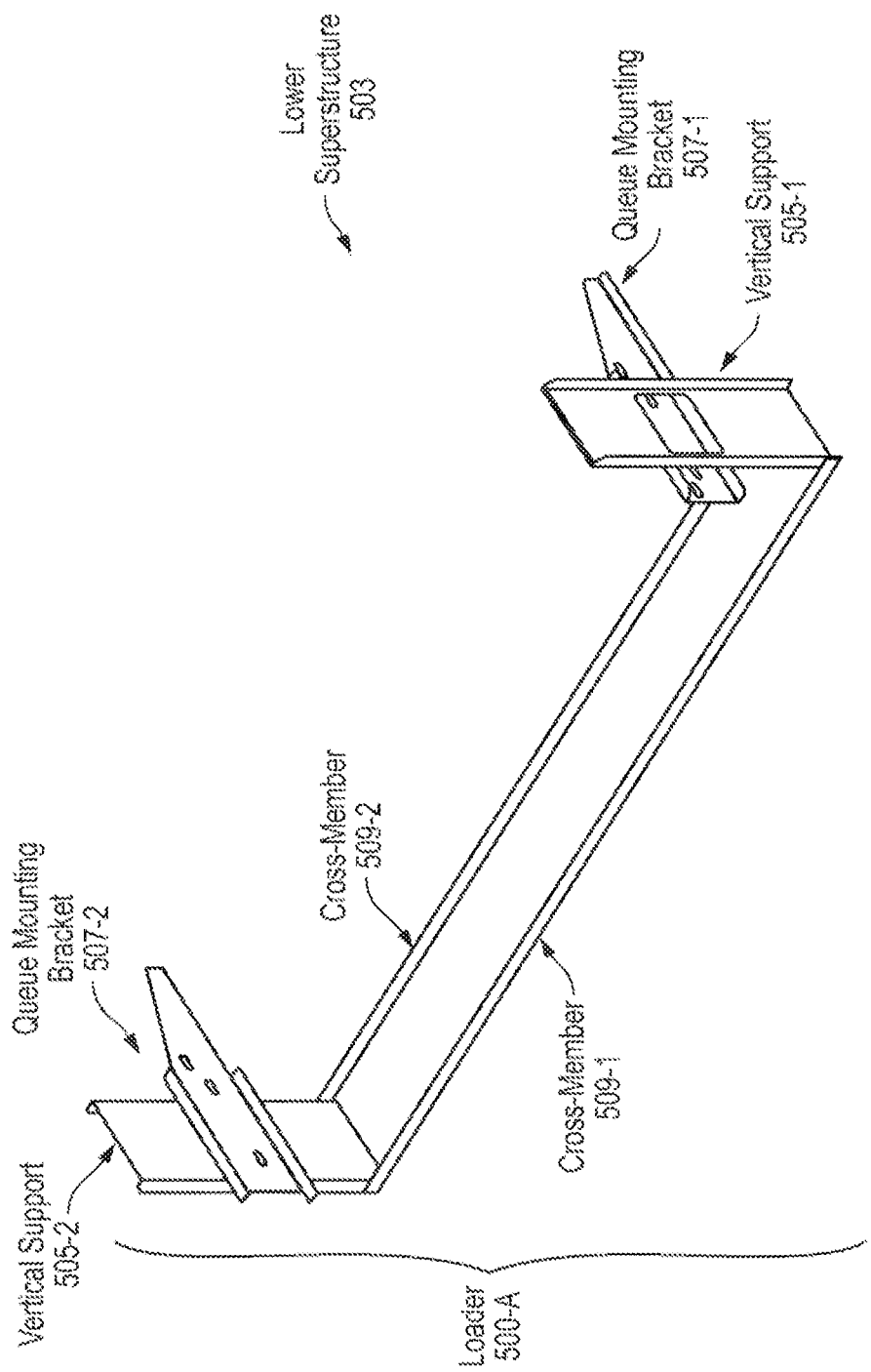

In addition to staging the light maintenance dolly 400, the loader 500 can carry the queue 600. An example of the superstructure for an example loader 500-A and example queue 600-B can be seen in FIGS. 76 and 77. As shown in this example, the loader 500-A can have a superstructure be comprised of a chassis 502 and lower superstructure 503. The chassis 502 (which is described below) that provides support for the carriage 501 (which is described below and which can include carriage cross-member 524) that moves an positions tray 104. The lower superstructure 503 can be secured (e.g., bolted) to the chassis 502 and can provide support for the queue 600-B (which, itself, can include a chassis or housing 602). Typically, the lower superstructure 503 can be comprised of vertical supports 505-1 and 505-2 positioned opposite one another and secured (e.g., bolted) to the chassis 502. The supports 505-1 and 505-2 can be tied together with cross-members 509-1 and 509-2, which can each secured (e.g., bolted) to supports 505-1 and 505-2. Queue mounting brackets 507-1 and 507-2 can also secured (e.g., bolted) to their respective supports 505-1 and 505-2 to engage queue 500-B. It should also be noted that there is typically a limit switch (e.g., used for determining limit positions) used with carriage cross-member 524 (which is omitted from the drawings for the sake of simplicity).

Figure 78:
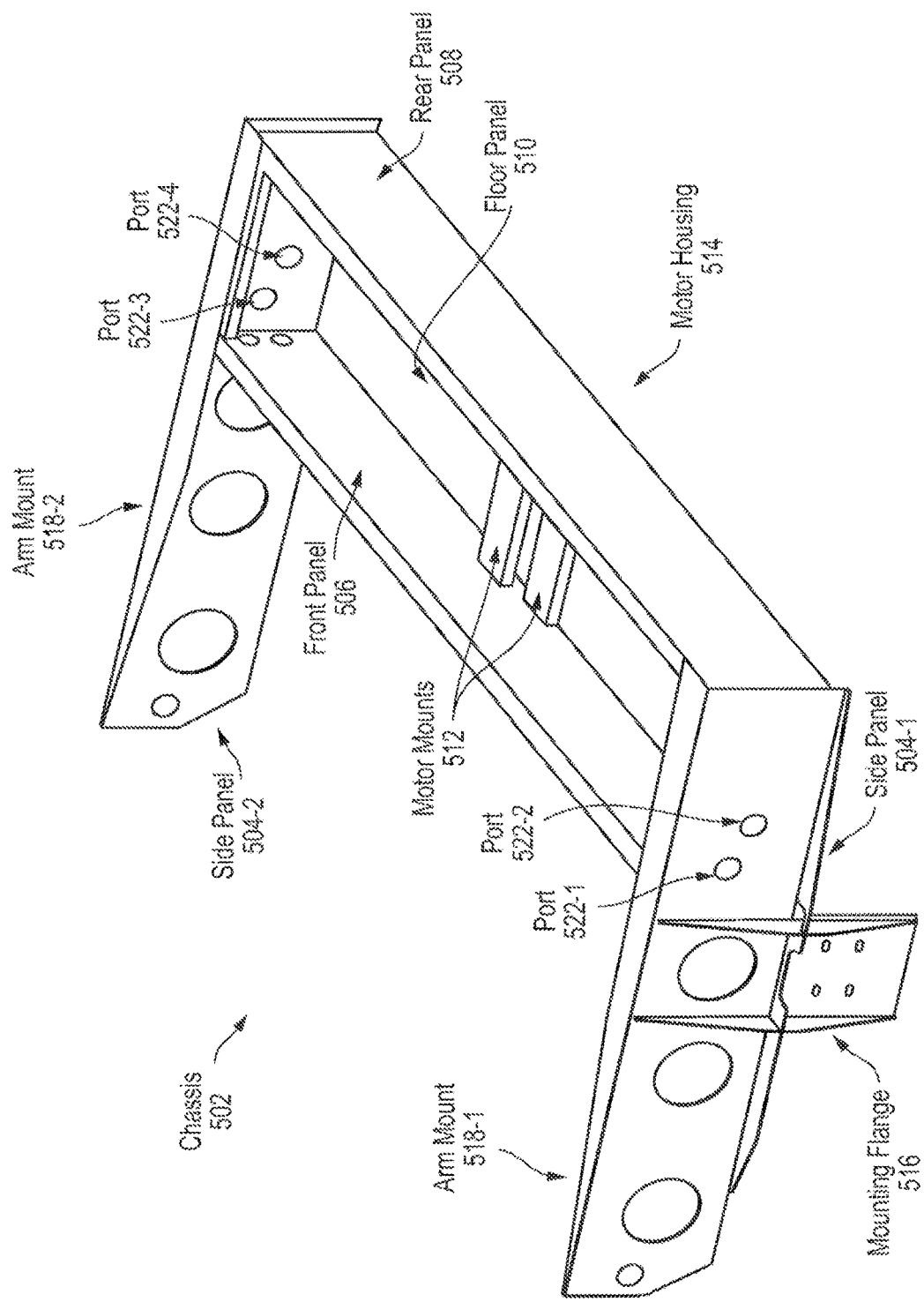

Now, turning to chassis 502, a more detailed example can be seen in FIG. 78. In this example depicted, the chassis 502 can be generally comprised of a motor housing 514, arm mounts 518-1 and 518-2, and mounting flanges 516-1 and 516-2. The motor housing 514 can be generally parallelepiped shape (e.g., 5-sided box) with a hollow interior having front panel 506, rear panel 508, and floor panel 510. Motor mounts 512 can be secured between the long ends of the housing 514, and each can be aligned with pairs of ports 522-1/522-3 and 522-2/522-4 so that the motors assemblies (described in example depicted in FIG. 91 below) can lift the entire assembly and can move the carriage 501. As shown in this example, alignment with aligned with pairs of ports 522-1/522-3 and 522-2/522 and motor mounts 512 can be accomplished with positioning the motor mounts 512 and the corresponding pair of ports 522-1/522-3 and 522-2/522 at different heights and lateral positions. Extending from the short ends of the motor housing 514 in the example depicted are opposing arm mounts 518-1 and 518-2 that can be secured to the loading arm assembly (described in the examples shown in FIGS. 82-88 and 115-127 below). Each of these arms 518-1 and 518-2 can be comprised of a central, vertical panel which can include ports for mechanical access or for weight reduction with panels flared at the top and bottom (e.g., 90-degree bent sheet metal). Additionally, extending from the arms 518-1 and 518-2, there (as shown in this example) can be mounting flanges 516 (which, as shown, can be adjacent to the motor housing and which are opposite one another) in side panels 504-1 and 504-2 in side panels 504-1 and 504-2. The mounting flanges 516 can include a center panel (which can include channels or ports for bolts) and a pair of opposing support panels that extend perpendicular to the center panel in this example. To provide additional rigidity in this example depicted, there are also a pair of support ribs secured (e.g., welded, brazed, or glued) to the arm mounts 518l and 518-2 that are shown to be aligned with the opposing support panels in the mounting flanges 516. Additionally, the chassis 502 can be integrally formed or be comprised of subcomponents secured together (e.g., welded, brazed, glued, or bolted) and may be formed of a rigid material (e.g., aluminum, steel, or polycarbonate). It should also be noted that limit switched (not shown) may be used with motor housing 514.

Figure 81:
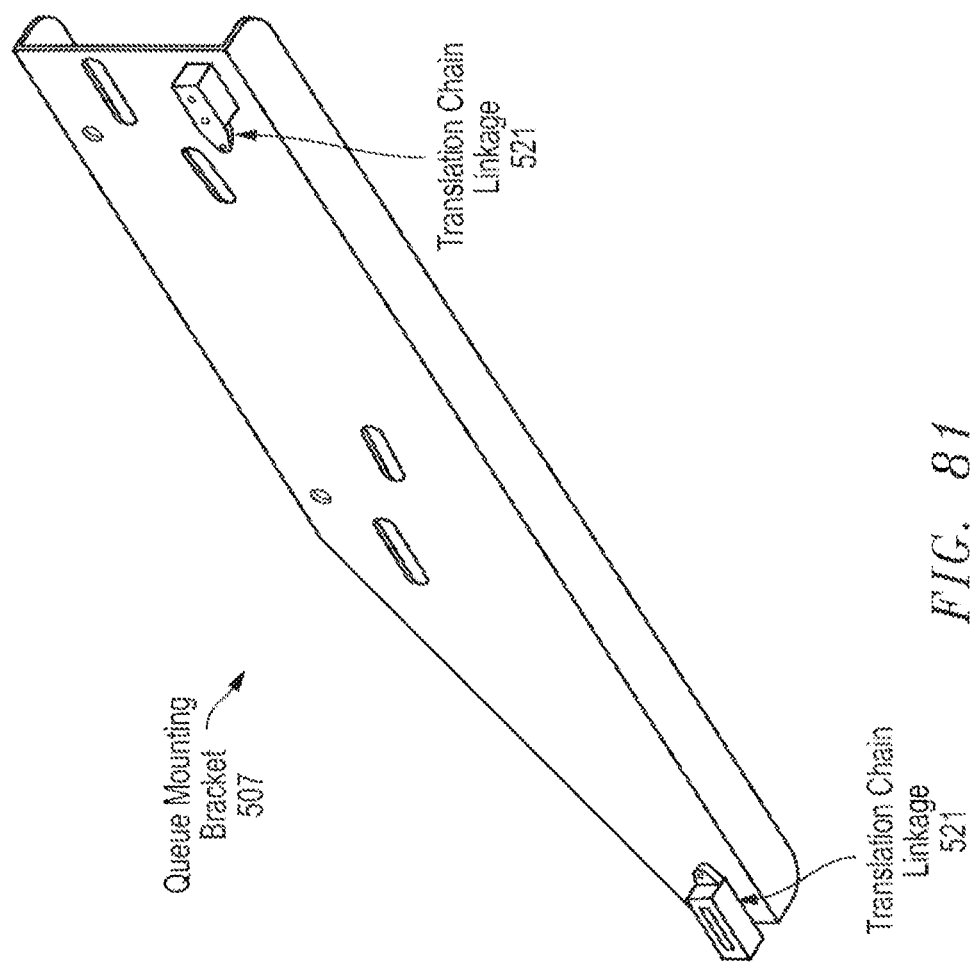

Now turning to the lower superstructure 503, examples of its subcomponents can be seen in FIGS. 79-81. As shown, each of the vertical supports (which are labeled 505 here) can have a center panel with a port 522-5 formed therein and a pair of opposing support panels. The opposing support panels in this example extend perpendicular from the center panel. Additionally, within the center pane of support 505 ports can be formed so at to allow it to be secured (e.g., bolted) to chassis 502, while ports may also be formed in the support panels so that support 505 may be secured (e.g., bolted) to a cross member 509-1 and 509-2.

As shown, the queue mounting brackets (which are labeled 507 here) can be formed of a center panel, and upper support, and a lower support. The center panel 507 of the bracket has a generally partial-trapezoidal shape having a front face, a rear face, and leading edge, and a trailing edge. In the example depicted, the leading and trailing edges of the bracket 507 are generally parallel to one another with the leading edge being longer than the trailing edge. Secured to the rear face of the center panel of the bracket 507 are translation chain linkages 521. These linkages 521 allow a length of chain to be secured that may allow the queue 600-B to be translated laterally (discussed below). Various ports and channels may also be formed in the center panel of the bracket 507 to allow drive assemblies to be secured (discussed below) and for weight reduction. As shown in this example, the upper and lower supports can extend generally perpendicular from the front face of the center panel of the bracket. As an example, the bracket may be formed of a single piece of sheet steel where the upper and lower supports are bent into position. These upper and lower supports can provide structural stability to the bracket 507 so as to reduce deformation of the center panel under load and may also provide additional surface area for securing (e.g., bolting) the bracket 507.

Now turning to FIGS. 82-88, an example of a carriage 501 can be seen. The carriage is a part of the loader 500-A, which is generally responsible for ferrying or moving trays 104. This means that the carriage 501 can be generally dimensioned to engage and lift trays 104 between levels of the grow assembly 102, to offload trays 104 from the grow assembly 102, and the load trays onto the grow assembly 102. In general, the carriage 501 can be comprised of cross-member 524 and a pair of opposing loading arm assemblies 530-A. One example of the loading arm assembly 530-A is depicted with respect to FIGS. 82-88, while an alternative example of the loading arm assembly 530-B may be seen with respect to FIGS. 114-127 below.

As mentioned above, within the carriage 501, there can be a cross-member 524 that spans the distance between the opposing loading arm assemblies 530-A. This cross-member 524 is dimensioned such that the loading arm assemblies 530-A can engage a tray 104 and span the troughs 106. This cross-member 524 can be generally comprised of a top panel 528 and a pair of opposing side panels 526-1 and 526-2. The top panel 528—as shown in this example—had a generally rectangular shape with a top and bottom face. Supports may be present (which as shown in this example extend generally perpendicular from the bottom face) so as to provide rigidity, which can reduce deformation under load. As an example, the top panel 528 may be formed of a sheet steel where the supports are bent into position. Additionally, a number of ports may be formed in top panel 528 (e.g., 26 in this example), which may be positioned to reduced weight while not sacrificing structural stability. The side panels 526-1 and 526-2, similar to the top panel 528, can be formed of a center panel and supports. The supports for the side panels 526-1 and 526-2 may differ from the top panel 528 in that there are opposing side supports (which may be notched as shown and which may extend generally perpendicular from the front face of its center panel), a bottom support that may extend between the side supports generally perpendicular to the front face of its center panel, a pair of cross-supports that may extend from the rear face of its center panel. Typically, and as shown, the cross-supports of the side panels 526-1 and 526-2 may be secured (e.g., welded) to the side panels 526-1 and 526-2 and top panel 528 to prevent side panels 526-1 and 526-2 from bending in inwardly when the cross-member 524 is under load. Additionally, bottom support, opposing side supports, and center panel may be formed from sheet steel, where the bottom and opposing side supports are bent into place and where the bottom support may be secured (e.g., welded, brazed or glued) to the opposing supports along the adjoining edges. The notches present in side panels 526-1 and 526-2 can be included to allow for portions of drive assemblies of the loader 500-A (discussed below) to operate largely uninhibited by the carriage 501. The side panels 526-1 and 526-2 may also include ports in respective center panels for weight reduction and/or for securing (e.g., bolting) the loading arm assemblies 530-A. Moreover, the bottom support of the side panels 526-1 and 526-2 may include ports which can be used to secure (e.g., bolt) the loading arm assemblies 530-A to the cross-member 524.

As shown in the example depicted in FIGS. 84 to 88, the loading arm assembly 530-A can be formed of arm 542-A, end effector 532-A, and plate 538. Beginning with the arm 542-A, it can be formed of mounting portion 544 and a positioning portion 546, with each having a center panel. As shown in the example depicted in FIGS. 82, 87, and 88, the collective center panel of the mounting portion 544 and positioning portion 546 has an L-shape (with a wide leg forming at least a portion of the mounting portion 544). This collective center panel depicted has a front and rear side. On the front side of the collective center panel depicted in this example, there are a number of supports that extend generally perpendicular to the center panel. As shown, two supports run the length of the positioning portion 546 with one generally delineating the boundary between the mounting portion 544 and the positioning portion 546; these supports also tapered at a position away from the mounting portion 546. Then, also as depicted, there may also be supports along the boundary of the mounting portion 546. Extending generally perpendicular from the opposite rear side of the center panel of the mounting portion 546, there is a support along the top edge and to cross-supports. The arm 542-A may be formed from multiple sheets of steel, which are bent and welded into place.

Figure 88:
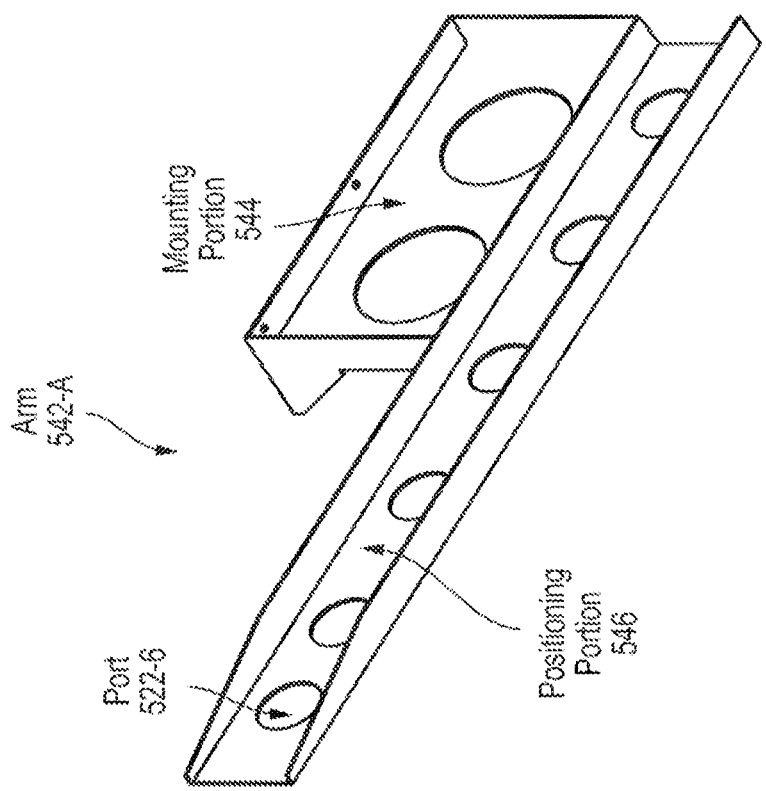
Figure 87:
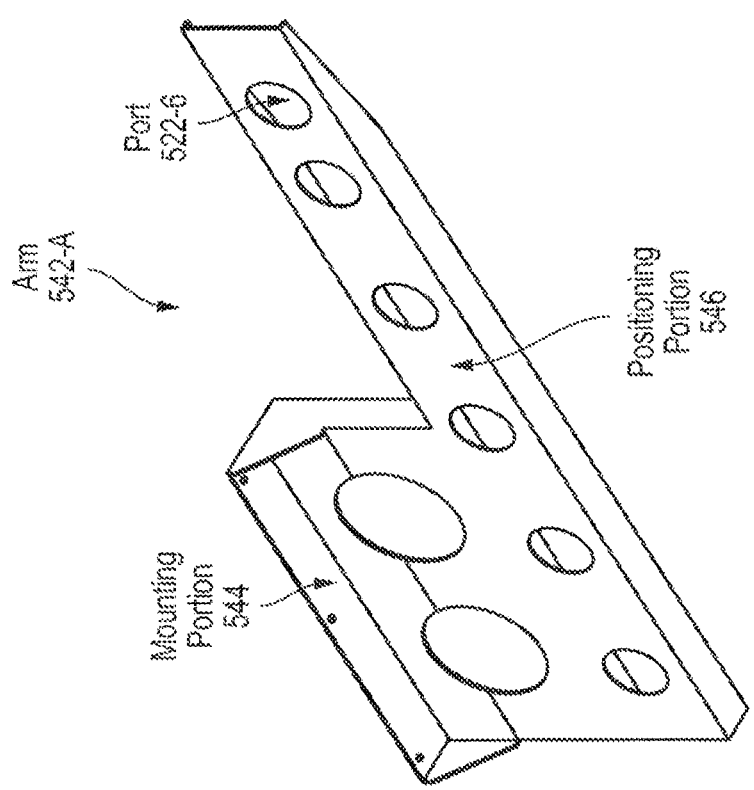

Several ports may also be formed in arm 542-A for weight reduction, for access, and/or for securing (e.g., bolting). In particular, and as shown in the example depicted in FIGS. 82, 87, and 88, there can be a port 522-6 formed in the center panel of the position portion 546 near one end where the supports taper. This port 522-6 can be used for access (e.g., electrical wiring for motion control and/or sensors) in which its exemplary use is described with respect to the plate 528 and end effector 532-A below. Around this example port 522-6 depicted, there may also be ports (not labeled) positioned around it to which the end effector 532-A may be secured (e.g., bolted). Additionally, and as depicted in the example of FIGS. 82, 87, and 88, the supports along the upper edge of the mounting portion 544 may include ports (not labeled) which can allow the arm 542-A to be secured (e.g., bolted) to the bottom supports of the side panels 526-1 and 562-2.

Figure 82:
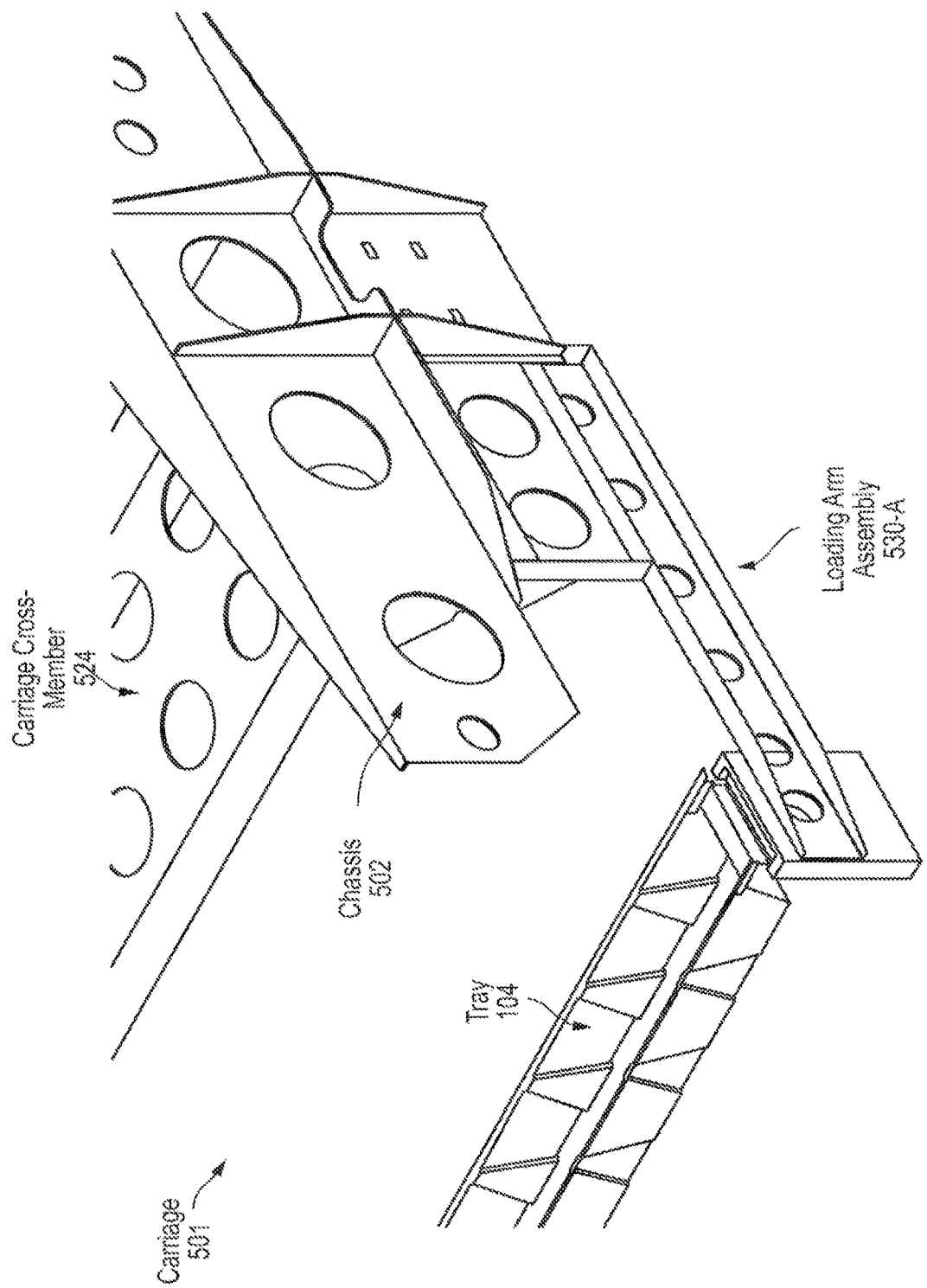
FIGS. 82 through 95 depict an example of the loading assembly of FIGS. 18 and 19.
Figure 83:
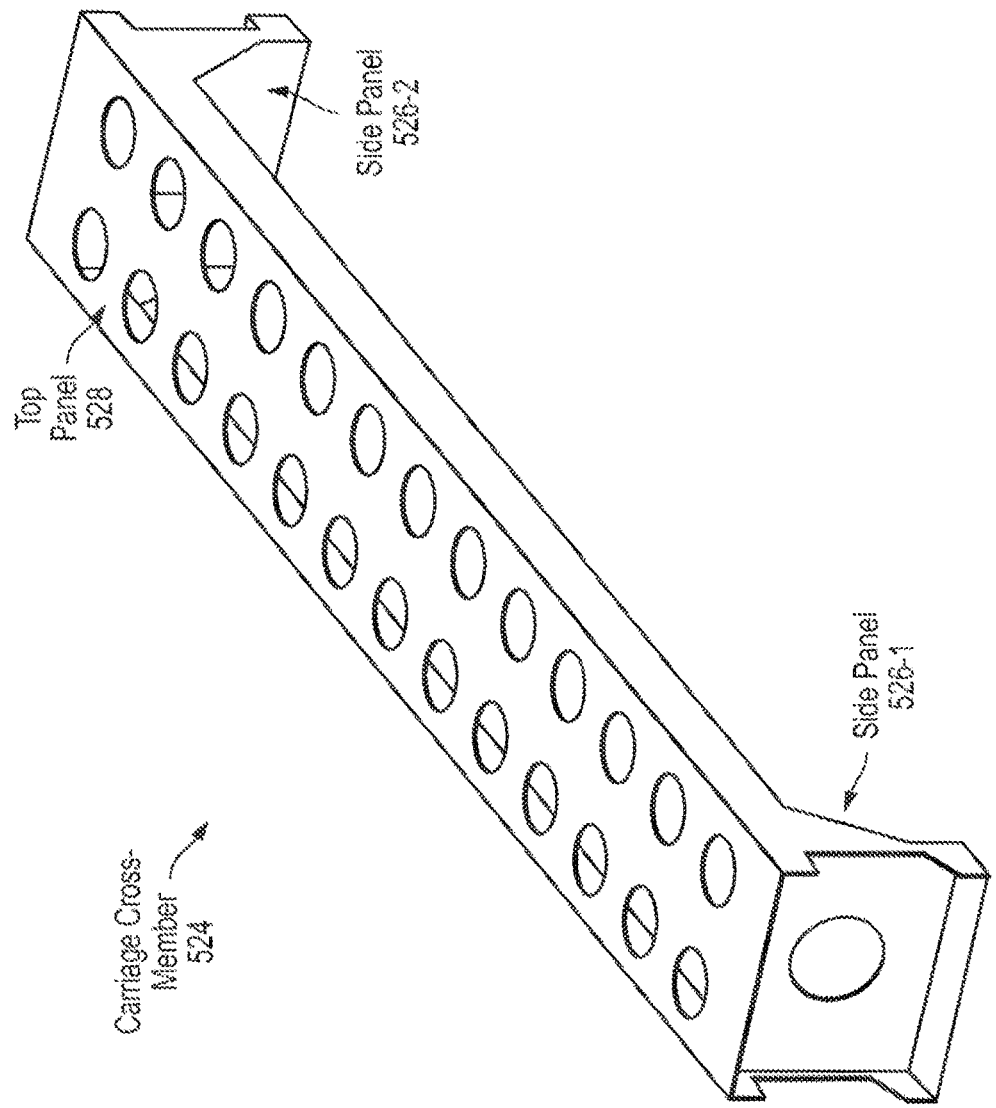
Figure 85:
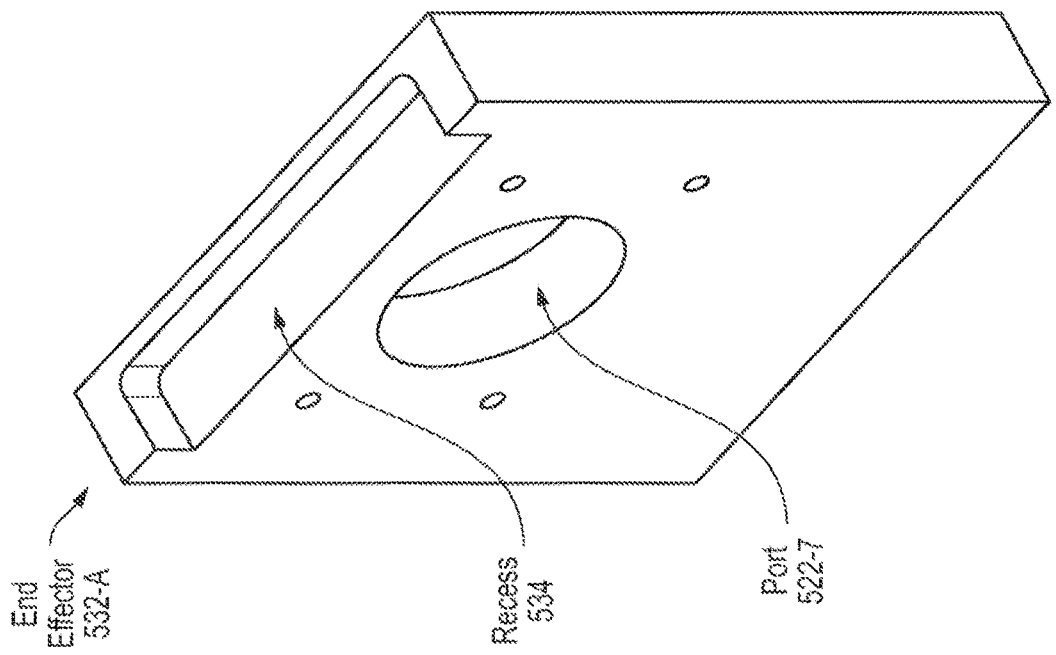
Figure 84:
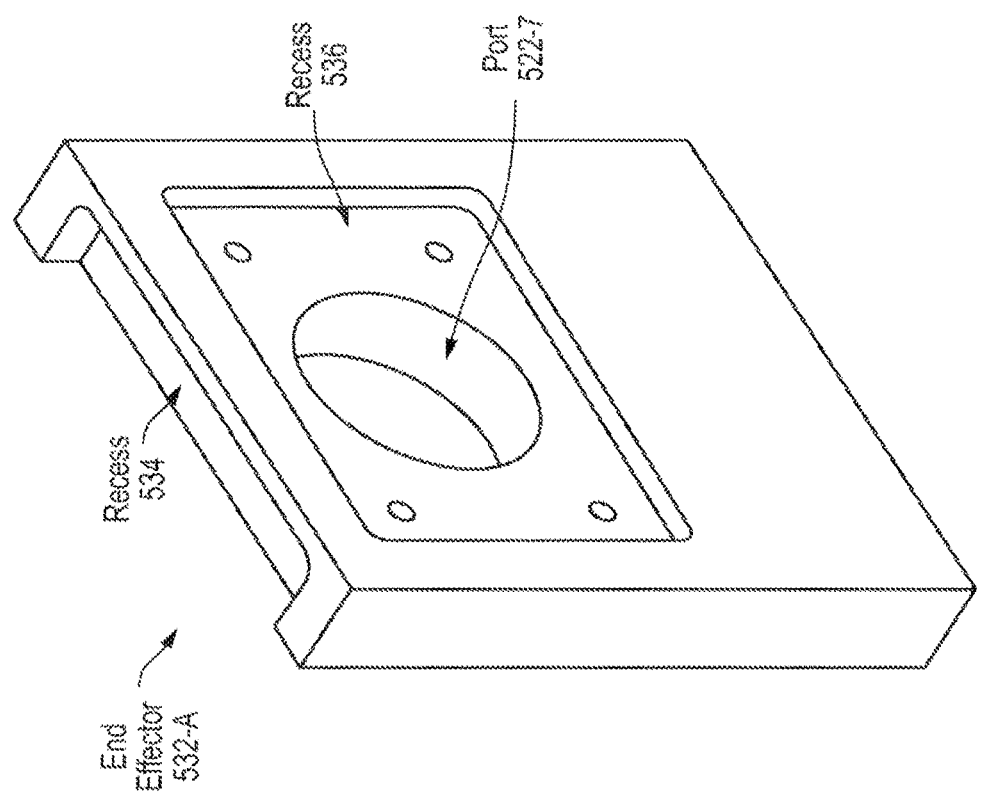

Now, turning to the example end effector 532-A depicted in the example of FIGS. 82, 84, and 85, this device is configured to engage (and lift) trays 104—as well as push them when in place in the grow assembly 104. End effector 532-A—as shown in this example—is a solid, generally parallelepiped body with a top face, front face, and rear face. The end effector 532-A can be comprised of a rigid material—like steel, aluminum, or polycarbonate. As shown, there can be a generally rectangular (with fillets at the corners) recess 536 formed in the front face and extending into the end effector 532-A. As shown, this recess 536 can be symmetric about the vertical center line of the end effector 532-A and asymmetric about the horizontal centerline of the end effector 532-A. The asymmetry about the horizontal centerline line of the end effector 532-A would mean that the bottom portion would be thicker and more rigid so that it is able to push or displace trays 104 which are present in a trough 106; an example of this can be seen in FIG. 2. At generally the center of the recess 536, a port 522-7 may be formed which can extend to the rear face of the end effector 532-A along with four other ports (not labeled) position symmetrically about the center of port 522-7 (which may use for bolts). Along the top face of end effector 532-A, a recess 534 may be formed. This recess 534, as shown in this example, extends over the edge between the read and top faces of the end effector 532-A. Viewing this example downward, the recess 534 can have a generally rectangular shape (with fillets for the corners within the end effector 532-A). The shape and position of this recess 534 can allow the end effector 532-A to engage a tab located on the end of the tray 104 so that it can be lifted; and example of this can be seen in FIG. 2.

Figure 86:
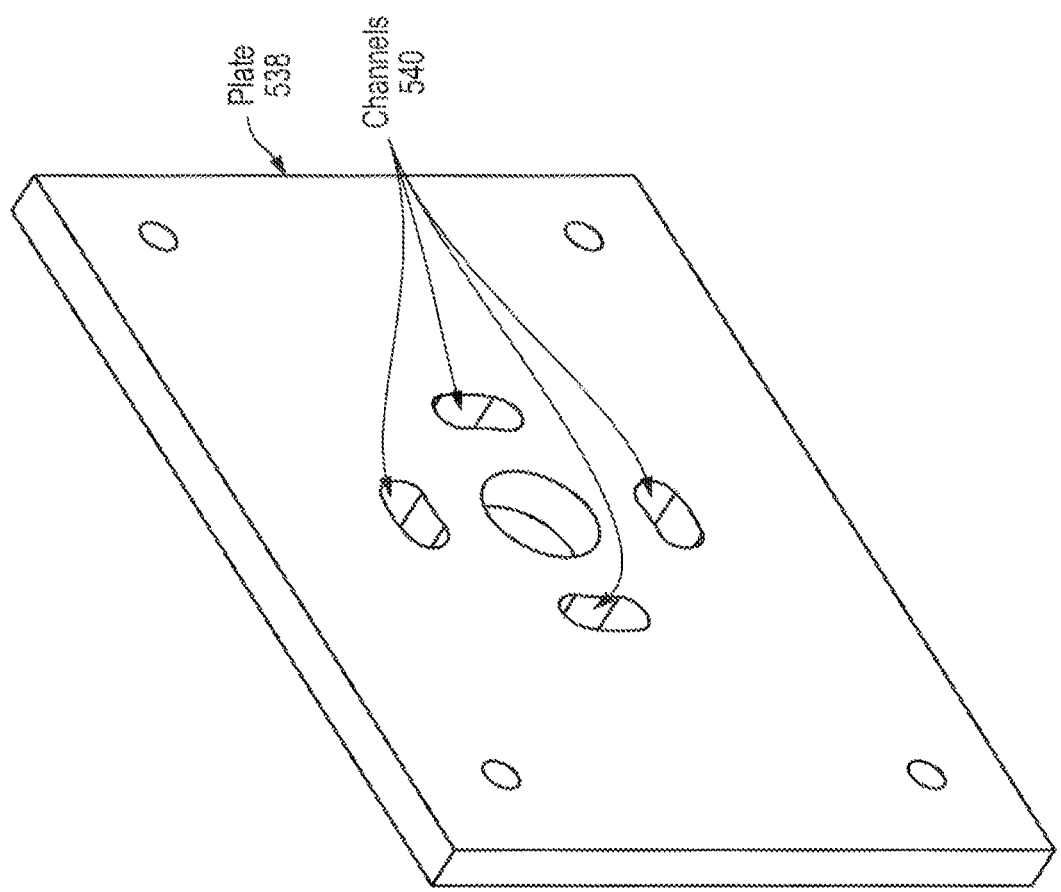

For this example configuration, plate 538 may also be employed. As shown in the example of FIG. 86, this plate is generally rectangular in shape and is dimensioned to form a slip fit within recess 536. Moreover, the plate 536 may be dimensioned to be flush with the front face of the end effector 532-A when inserted into recess 536. Also, as shown in this example, there are several symmetrically arranged ports that may be generally aligned with the symmetrically formed ports in recess 536 to allow the plate to uniformly provide clamping pressure to the end effector 532-A when bolted to arm 542-A. When bolted into place in this example, port 522-6 may be aligned with port 522-7 and channels 540. Channels 540, as shown in this example, are curved slots—inscribed within a circle and surrounding a port (not labeled) in the center symmetrically about four sides. The circle in which the channels 540 are inscribed in this example is dimensioned to be smaller than port 522-6 when the plate 538 is mounted to arm 542-A.

Figure 89:
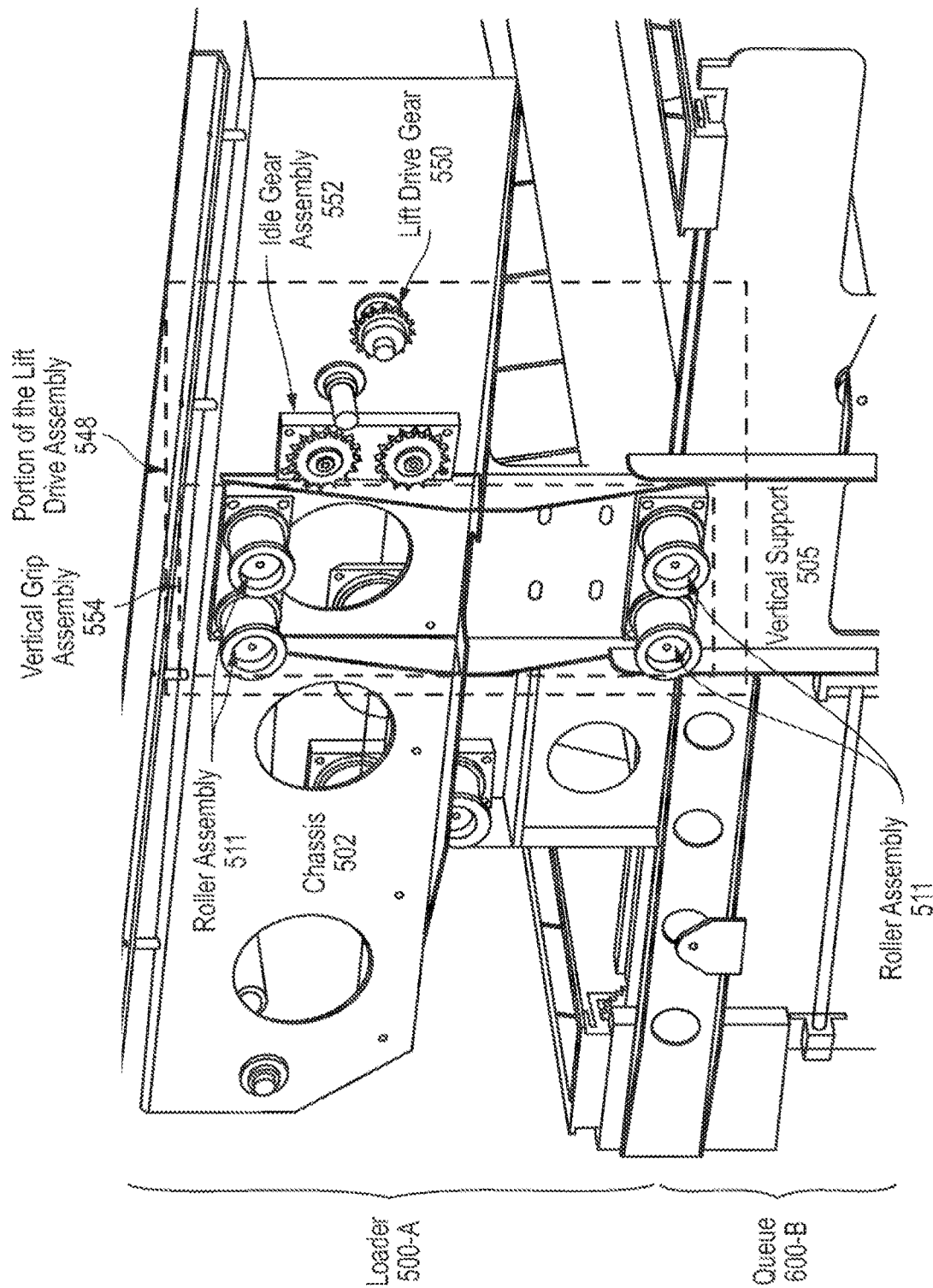
Figure 90:
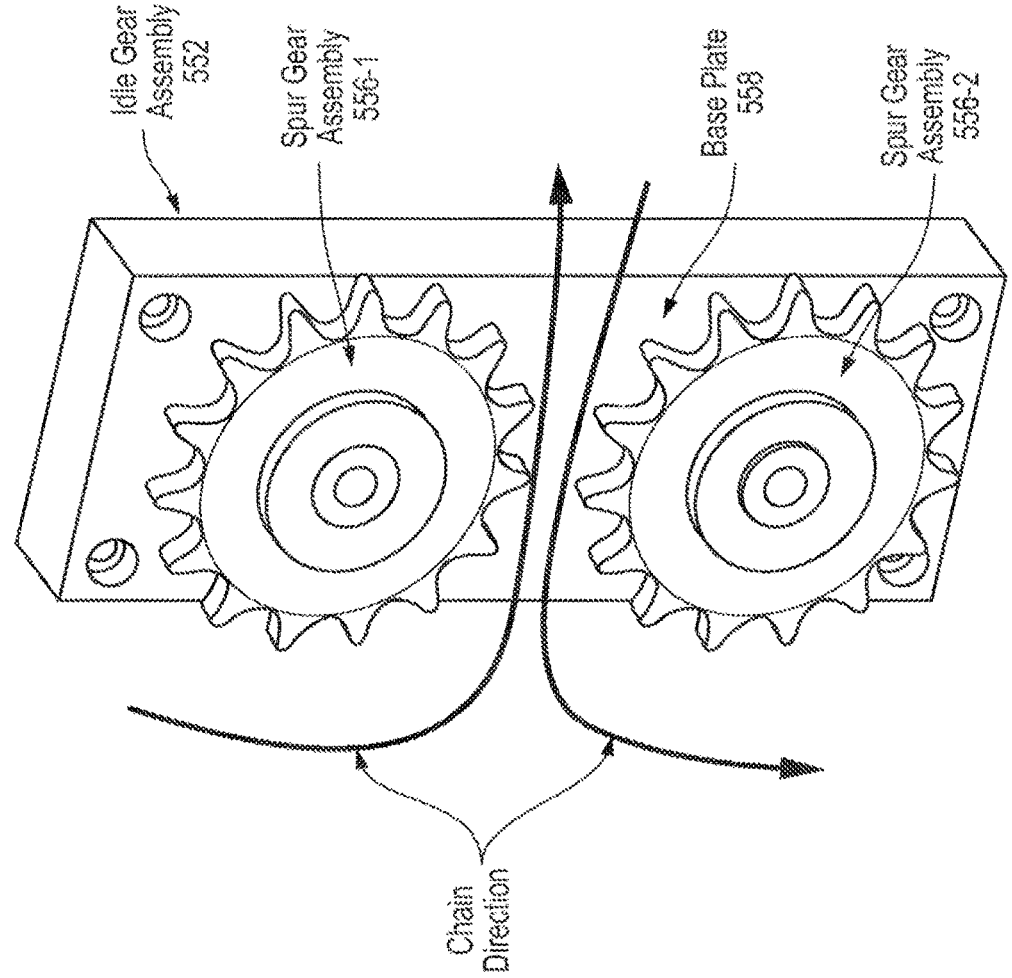

Now, this carriage 501 can be positioned through drive assemblies included within loader 500-A. These two assemblies can be a lift drive assembly 548 and a translation drive assembly 560. An example of lift drive assembly can be seen in the example configuration shown in FIGS. 89 through 91. An example of the translation drive assembly 560 can be seen in FIGS. 91 and 92.

Beginning with the lift drive assembly 548, there can be two major subassemblies: the vertical grip assembly 554 and motor assembly. As shown in the example configuration of FIG. 89, there can four (or more) roller assemblies 511 which may rotatably engage a vertical support of frame 202 as shown in FIGS. 14 and 15. Essentially, the roller assemblies 511 can guide the loader 500-A vertically. The motor assembly, on the other hand, is a more complicated assembly, which can provide lift. The lift can be provided by way of a chain (not shown) which is statically mounted to the frame 202. Along the exterior of the chassis 502, an idle gear assembly 552 may be secured. This idle gear assembly 552 may be generally comprised of a base plate 558 (which may be bolted, glued, brazed, or integrally formed with the chassis 502) and a pair of spur gear assemblies 556-1 and 556-2. The spur gear assemblies 556-1 and 556-2 can typically function as tensioners and guides for the static chain secured to the frame 202. As an example, the chain (not shown) may engage the spur gear assemblies 556-1 and 556-2 in the direction depicted by the arrows in FIG. 90 and may "looped around" the lift drive gear 550. That way, the lift drive gear 550 can provide the lift. These assemblies (e.g., 554, 552, and 550) are also symmetrically placed (e.g., on each side of the chassis 502).

Figure 91:
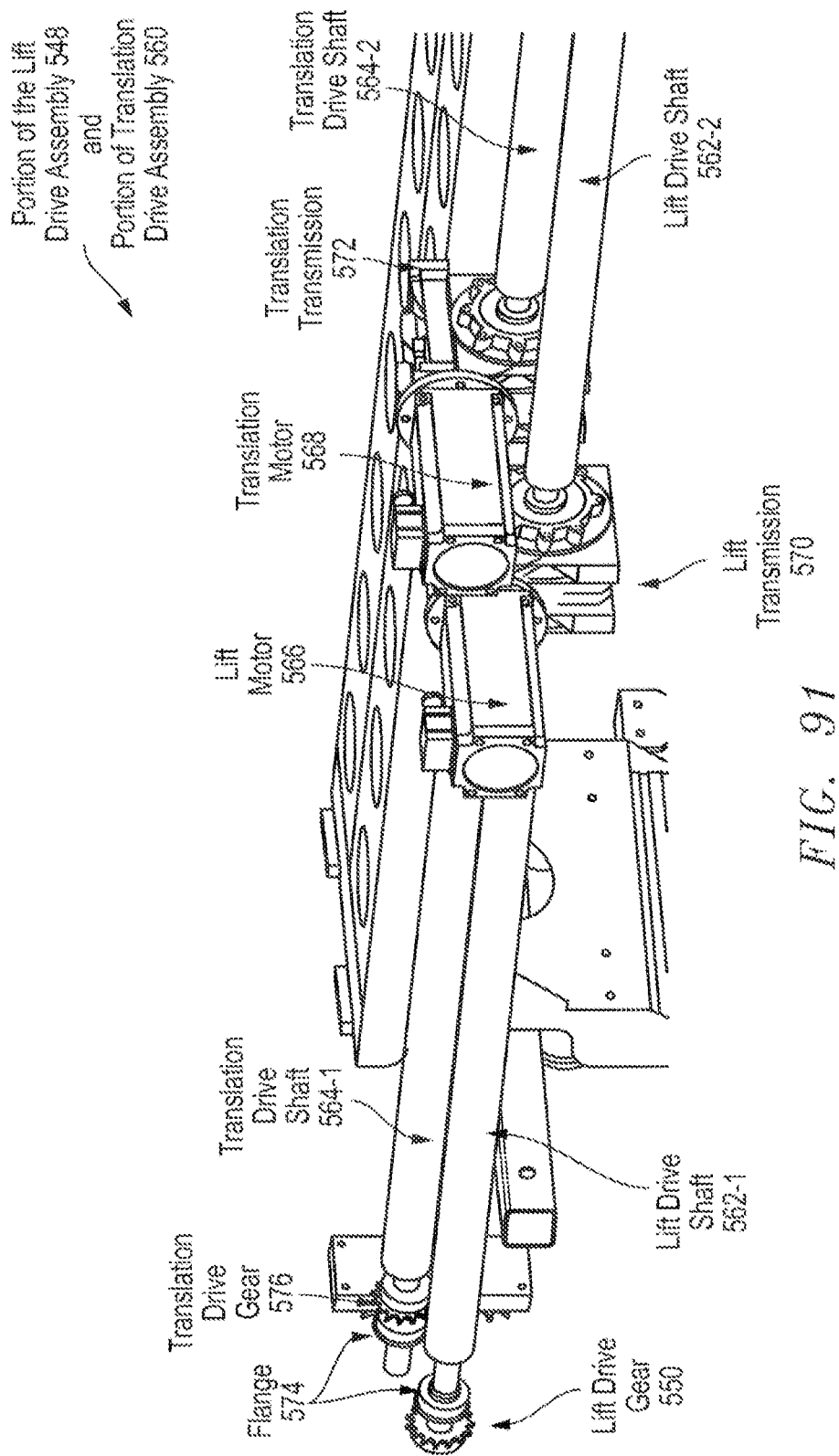

Housed within the motor housing 514 of chassis 502, the motor assembly may be secured. As shown in the example of FIG. 91, portions of both the translation drive assembly 560 and lift drive assembly 548 can be secured. Each of these assemblies 560 and 548, includes a motor 566 and 568, a transmission 570 and 572, and a pair of drive shafts 564-1/564-2 and 562-1/562-2. In operation, the transmission 570 or 572 can provide substantially simultaneous torque from the motor 566 or 568 to the pair of drive shafts 564-1/564-2 and 562-1/562-2 so as to provide lift or translation. In the case of the lift drive assembly 548, the pair of drive shafts 562-1/562-2 lift drive gear 550 (on each side of the chassis 502) to turn. In order for this to occur, though, flanges 574 (on with side of the chassis 502) can be employed; specifically and for example, the flanges 574 for the pair of drive shafts 562-1/562-2 are secured within ports 522-2 and 522-4 of the chassis 502 (as depicted in the example of FIG. 78). Typically, flanges 574 can include roller or ball bearing assemblies.

Figure 92:
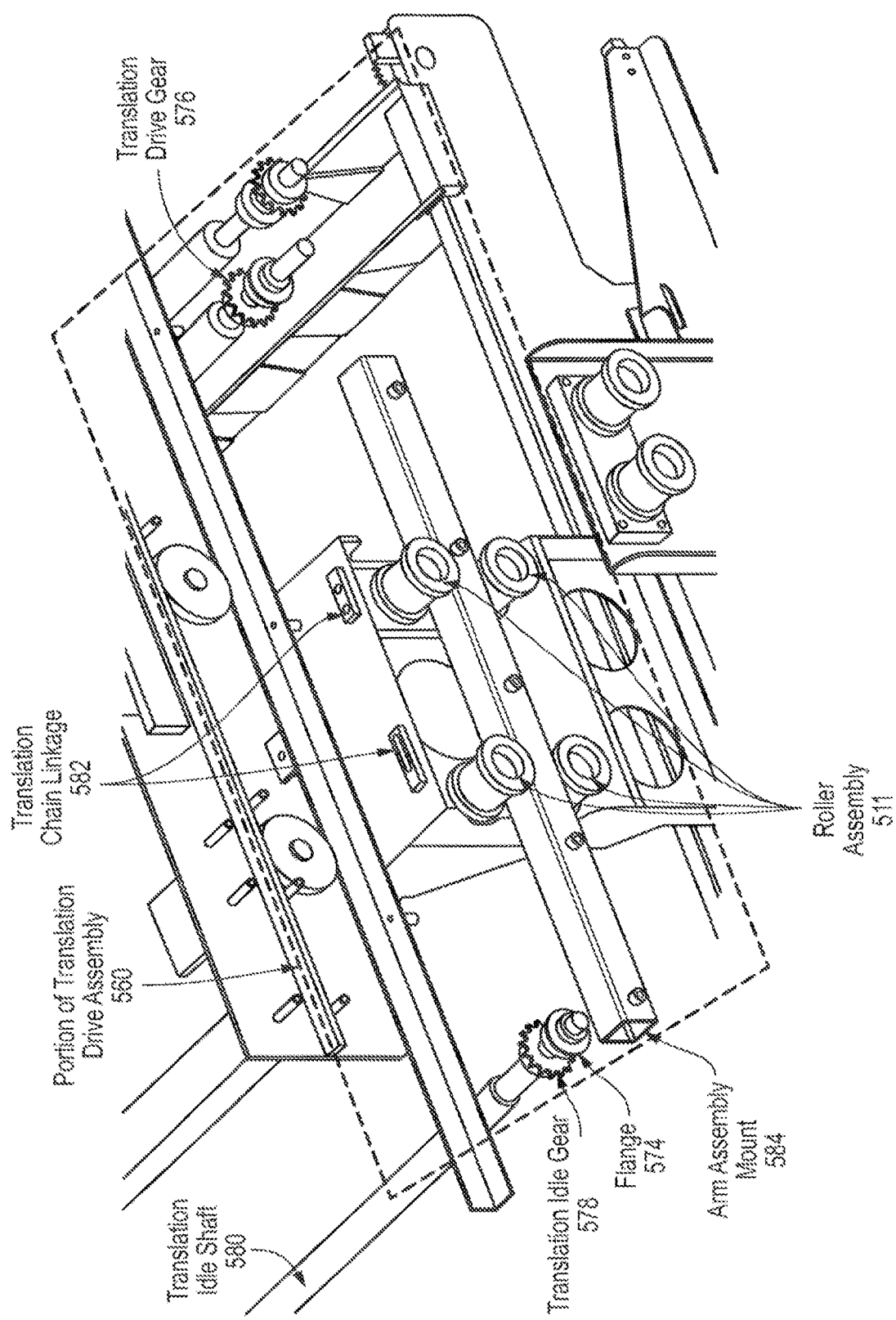

Unlike the lift drive assembly 548, the translation drive assembly 560 uses an internal drive mechanism. As shown in this example, the flanges 574 can be secured in ports 522-1 and 522-3 of the chassis 502 (as depicted in the example of FIG. 78) with an inwardly secured translation drive gear 576. As shown in the example of FIG. 92, the ends of a chain (not shown) can be secured to the translation chain linkages 582—which themselves may be secured to (e.g., welded, glued, brazed, bolted or integrally formed) the top surface 528 of carriage cross-member 524. Opposite the translation drive shafts 564-1/564-2 and translation drive gears 576, there may be an idle gear assembly (which can be comprised of a shaft 580, flanges 574, and translation idle gear 578). Also, similar to the lift drive assembly 548, there can be roller assemblies 511. These roller assemblies 511 can be mounted to the side panels 526-1/526-2 of the cross-member 524 and rotatably engage the arm assembly mount 584 (which is secured to the chassis 502)—thus allowing lifting of the arm assembly 530-A.

Figure 94:
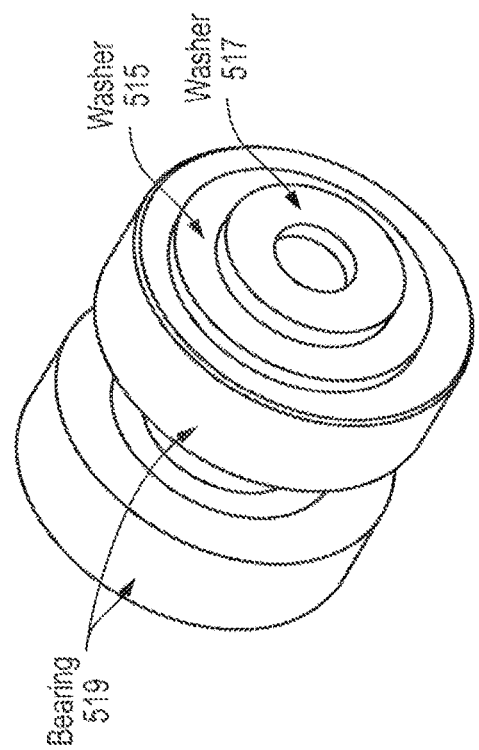
Figure 95:
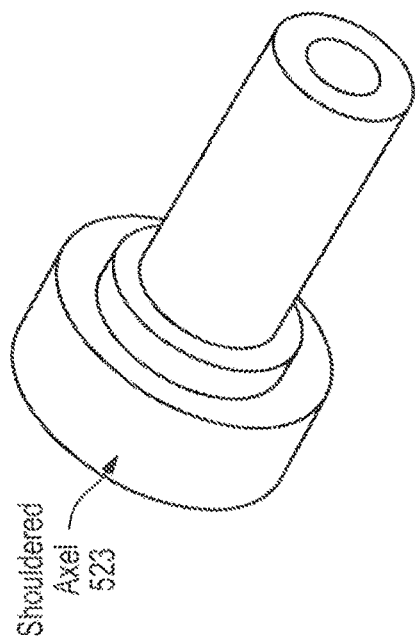
Figure 93:
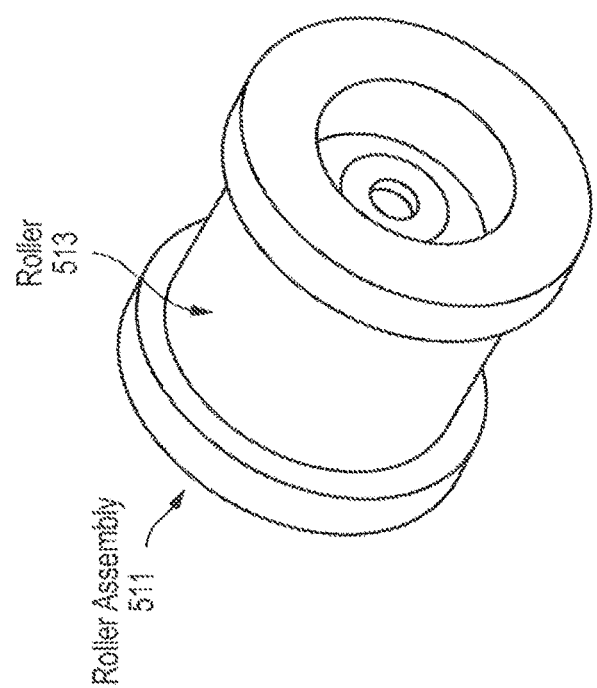

Turning to FIGS. 93 through 95, an example of the roller assemblies 511 can be seen. These roller assemblies 511 can be comprised of a pair of bearings 519 (which may be roller or ball bearing assemblies) secured to a shouldered axel 511. Washers 515 and 517 and bolts (not shown) can be used to hold the assembly. Moreover, a grooved roller 513 can form an interference fit with the outer diameter of the bearings 519.

Figure 100:
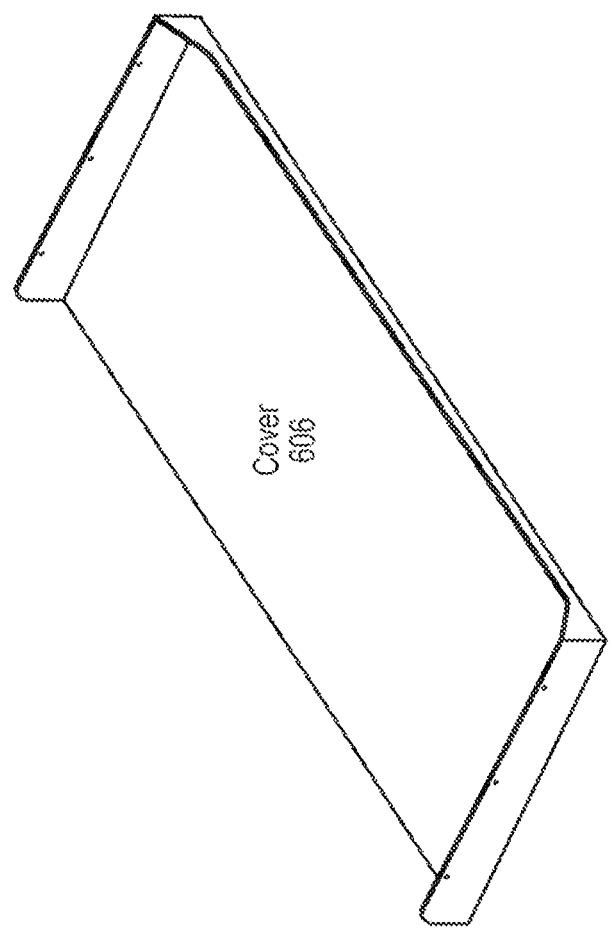
Figure 105:
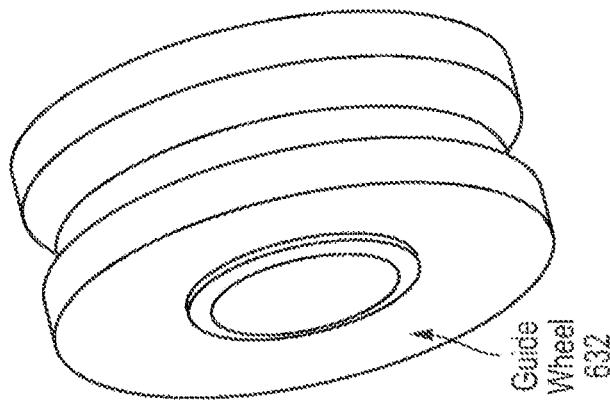
Figure 104:
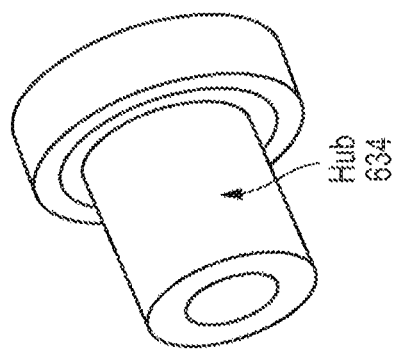
Figure 103:
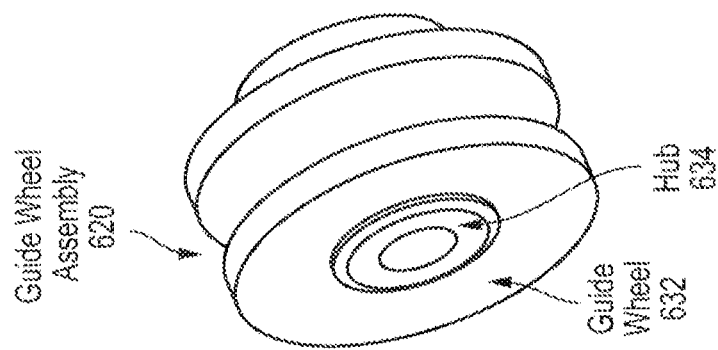
Figure 102:
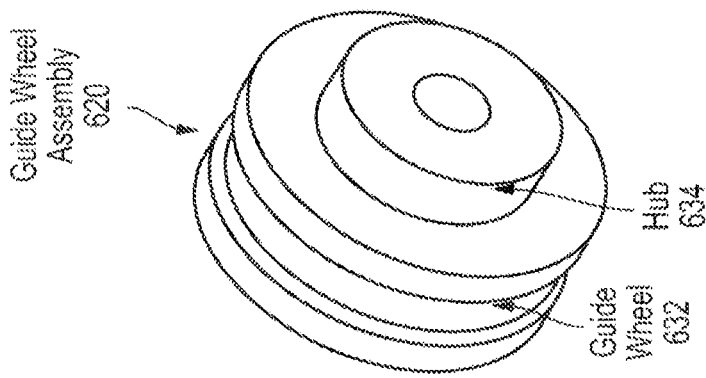
Figure 106:
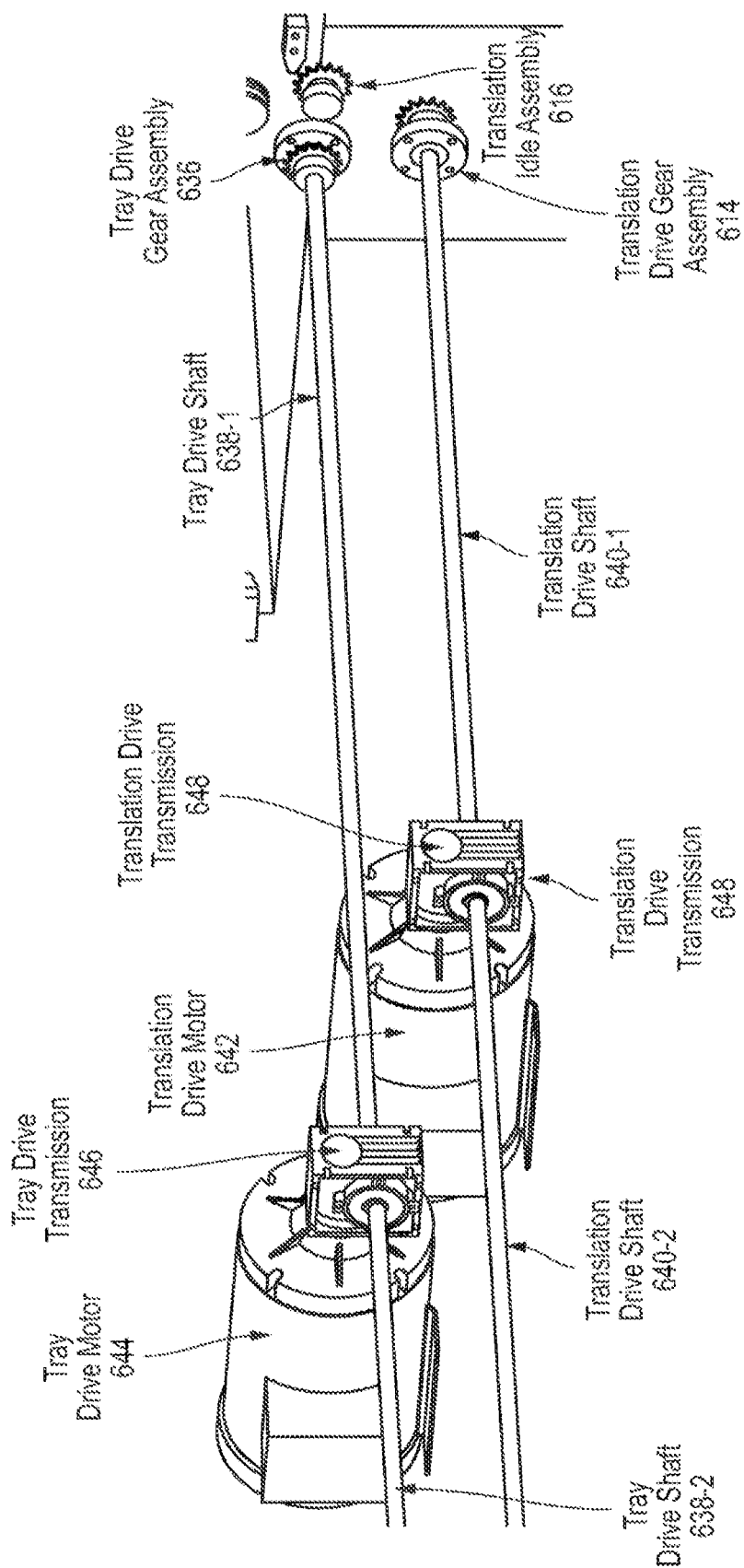
Figure 107:
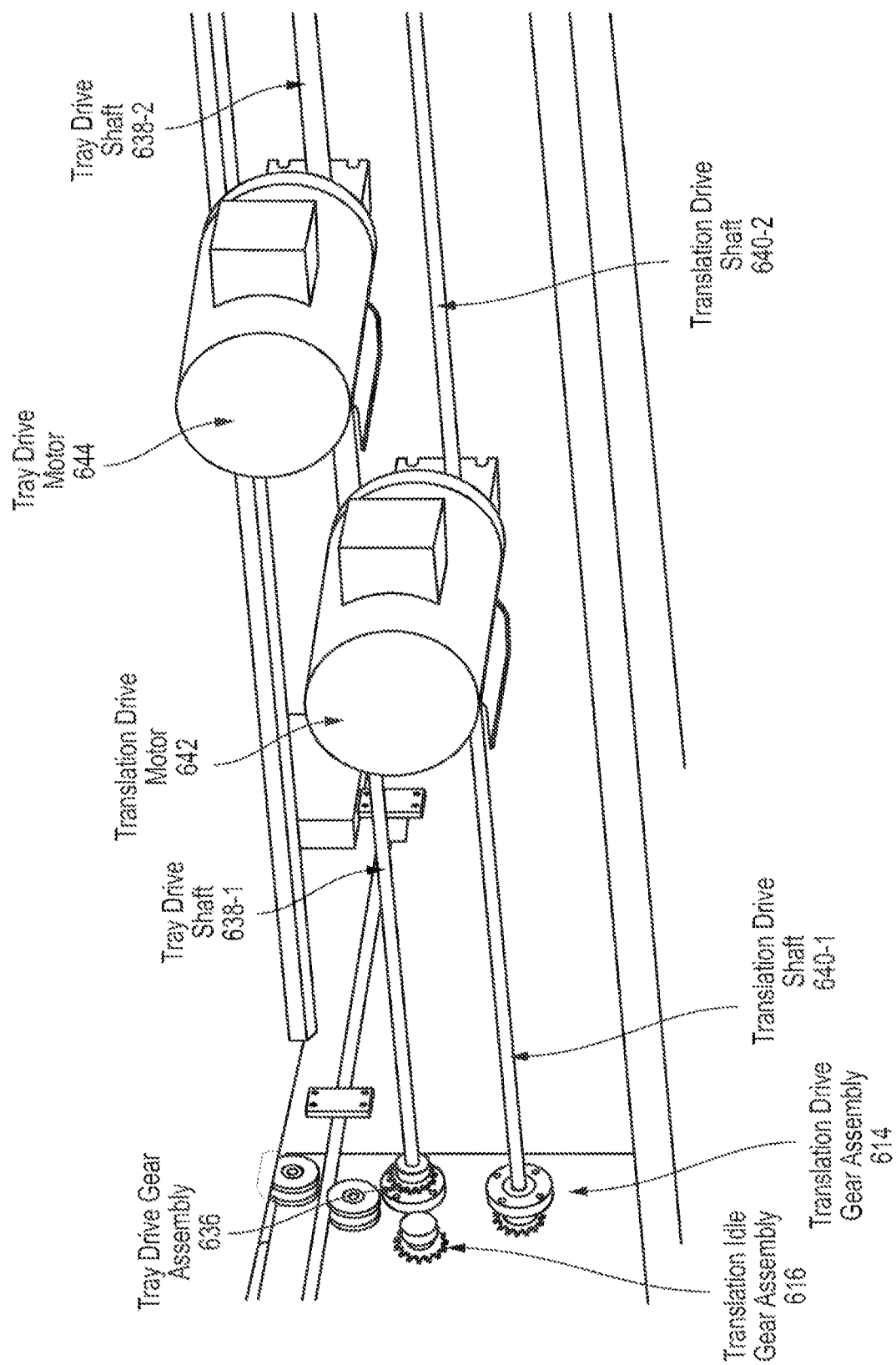

Moving now to the queue 600-B, an example can be seen in FIGS. 96 to 113. In this example, the main body of the assembly is the housing 602, which itself may be translated and which may move trays 104 riding on it. The front of the housing 602 in this example includes a drain compartment 622 which allows the nutrient rich drip-water from roots of the freshly removed plants to collect. Compartment 622 can be sloped and can have sloped sidewalls which can guide or channel the drip-water to drain 624. That way, the drip-water can be collected and reused. The motor compartment 626 in this example can be located behind the drain compartment 622. The motor compartment 626 may be generally parallelepiped in shape with an open bottom. Access to the motors (discussed below) housed within the motor compartment 626 may be provided through ports 628-1 to 628-4, and the motors may be secured (e.g., bolted) to motor mounts 630. An additional cover 606 (shown in FIG. 100) may be also secured (e.g., bolted) over the rear of the housing 602. This cover 606 can be sloped as well toward the drain compartment 622 so that there is a mechanism for capturing drip-water over the entire travel length of any tray placed in the queue 600-B. Compartment 626 may also be used to house other electronics.

Because it is desirable to have the queue 600-B be translatable so as to allow for easy access to trays, queue 600-B can include a translation assembly 604—an example of which is depicted in FIGS. 96 and 102 to 113. Similar to the other translation assembly 560, a chain (not shown) can be secured to translation chain linkages 521 (FIG. 81) and used for motion. Again, like the lift drive assembly 548, there are a pair of translation idle gears 616 (which can be used to tension and guide the chain to the translation drive gear assembly 614. While moving back and forth, the queue 600-B uses guide wheels 620 to "roll along" the translation guide 616 (which itself can be secured to the housing 202 with brackets 612-1, 612-2, and 618).

The guide wheel assemblies 620 can be similar to roller assemblies 511 in that they can provide rolling engagement. Because the load borne by the guide wheel assemblies 620 is generally less than that of roller assemblies 511, their complexity can be reduced. In the example depicted in FIGS. 102 to 105, a guide wheel 632 can be mounted in a hub by way of an interference fit, and the inner diameter of the hub 634 may ride on an axle or shaft secured (e.g., bolted) to the queue mounting brackets 507.

Similarly, the translation idle gear assemblies 616 can have a similar construction to the spur gear assemblies 556-1 and 566-2. An example of this assembly 616 can be seen in FIGS. 108-111. Here, there can be a hub 652 with a shouldered shaft. A bearing 654 (e.g., roller or ball bearing assembly) can form slip fit with this shaft and rest against the shoulder. This bearing 654 can be held in place with a lock ring 656 and abut a washer 658. A keyed spur gear 650 can then ride over the outer diameter of the bearing 654.

Figure 113:
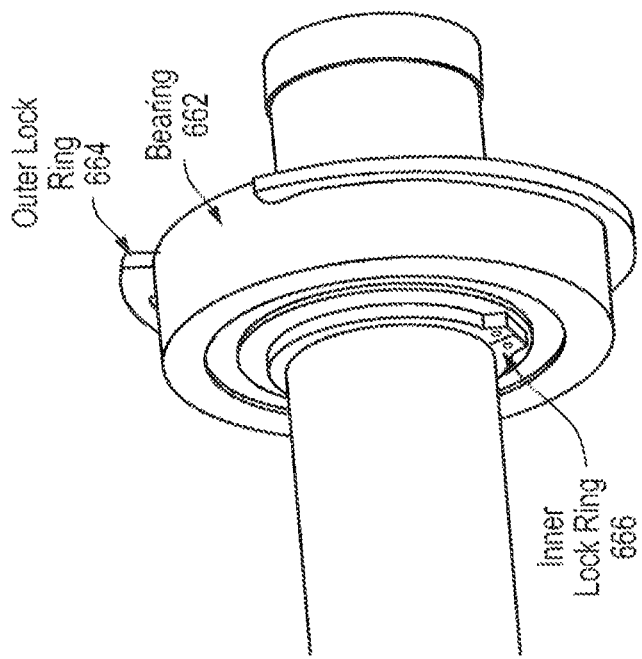
Figure 112:
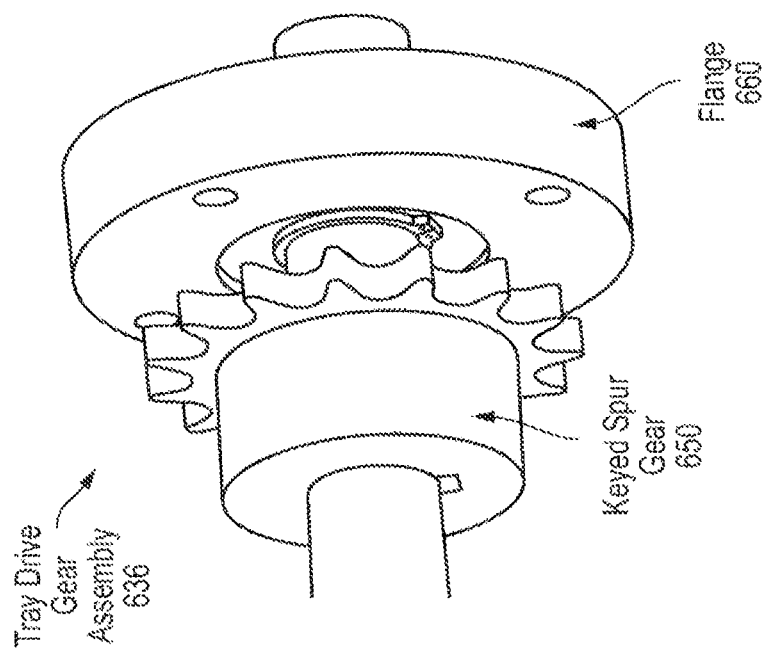
Figure 114:
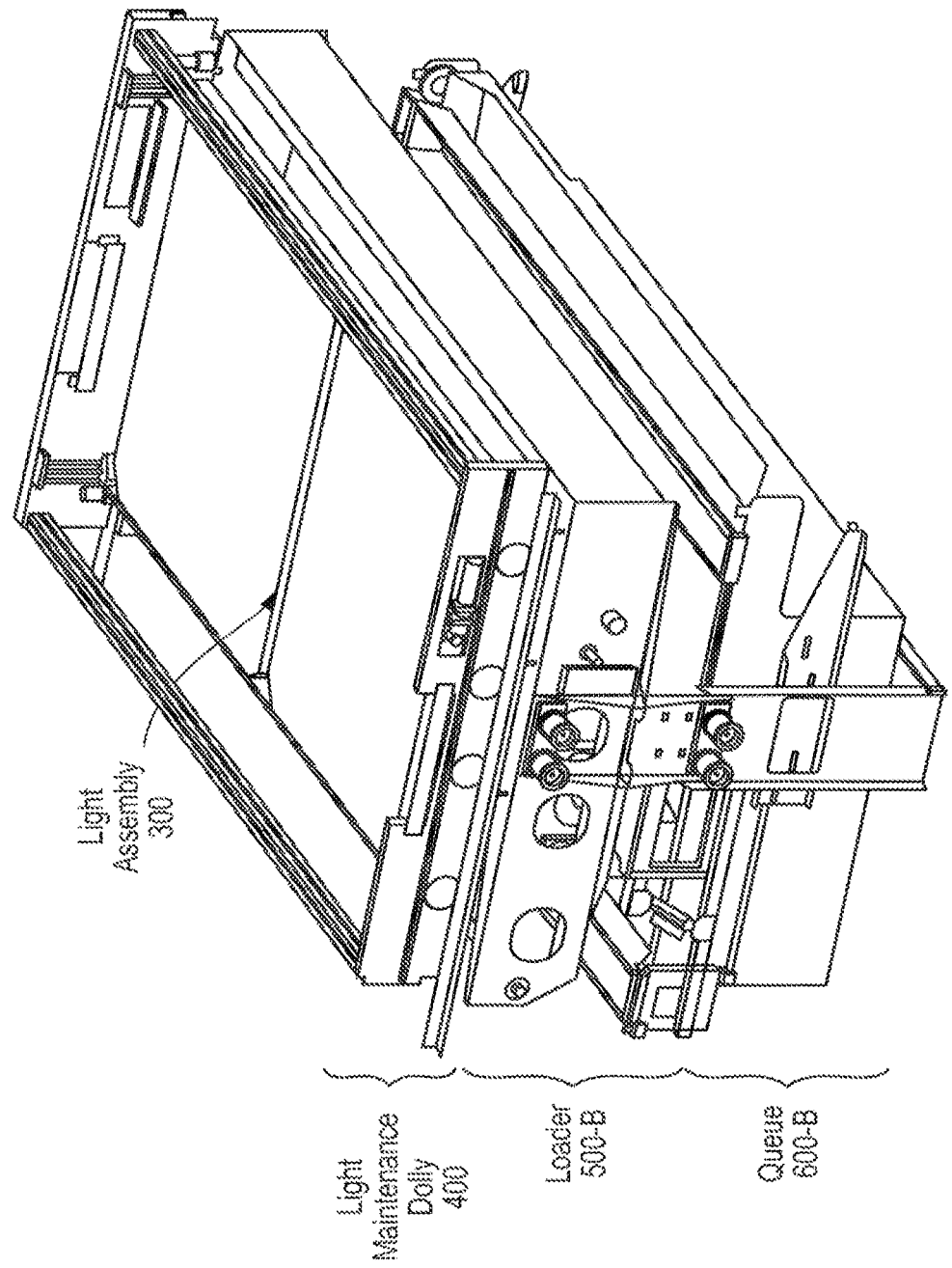
FIG. 114 depicts an alternative working assembly.
Figure 115:
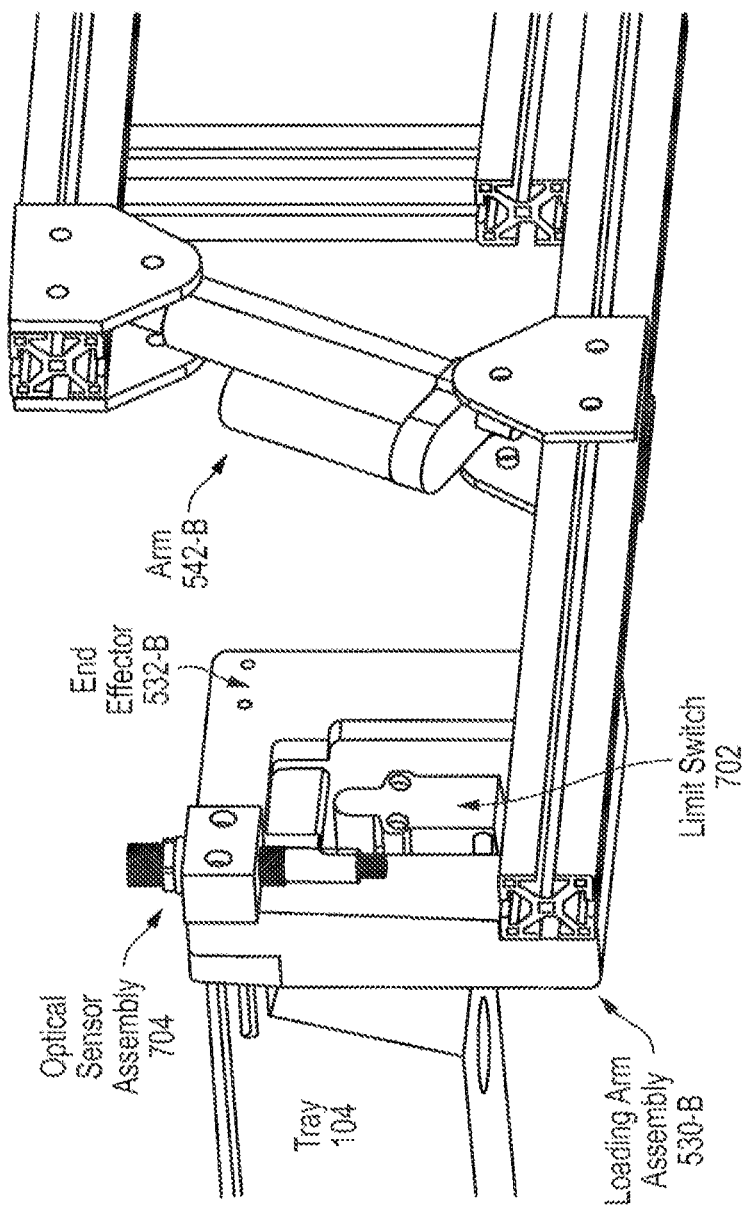
Figure 116:
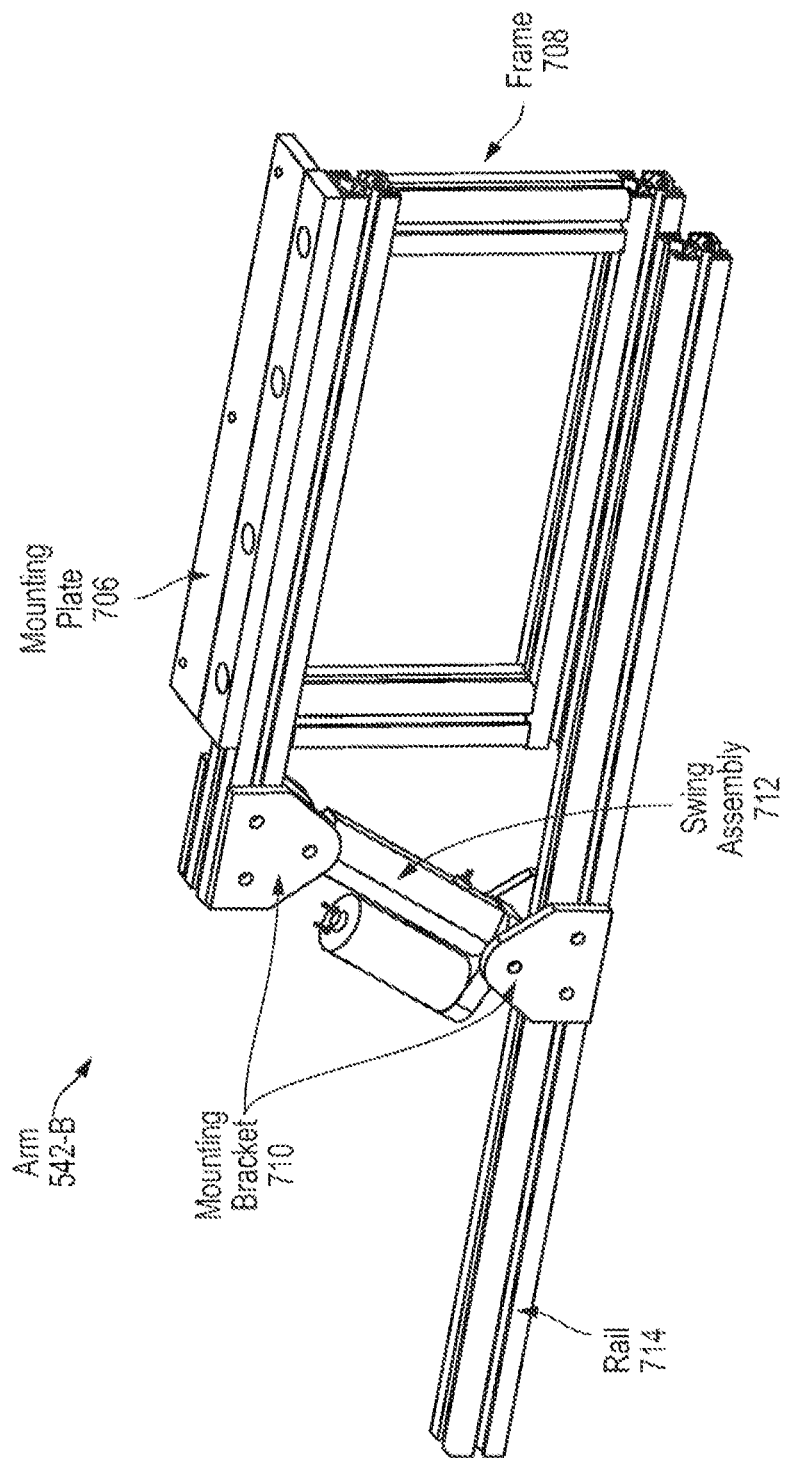
Figure 118:
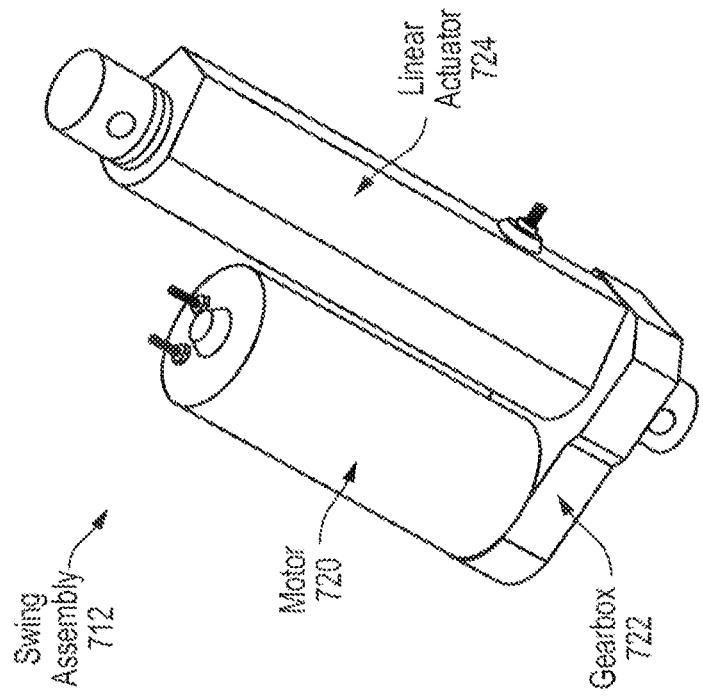

Turning to the translation drive assembly 604, motion can be accomplished by way of actuation of a motor 642. The translation drive motor 642 (which itself can include a transmission 648) can be secured to one of the motor mounts 630 and drives shafts 640-1 and 640-2. These shafts 640-1 and 640-2 can extend through ports 628-2 and 628-4 and may be held in place by a hub assembly (an example of which is depicted in FIGS. 112 and 113). This hub assembly includes a flange 660 that can be secure (e.g., bolted) to the housing 602 with an internal bearing 662 (e.g., ball or roller bearing assembly) held in place inner and outer lock rings 666 and 664. This allows the translation drive gear assembly 614 to engage the chain.

Figure 96:
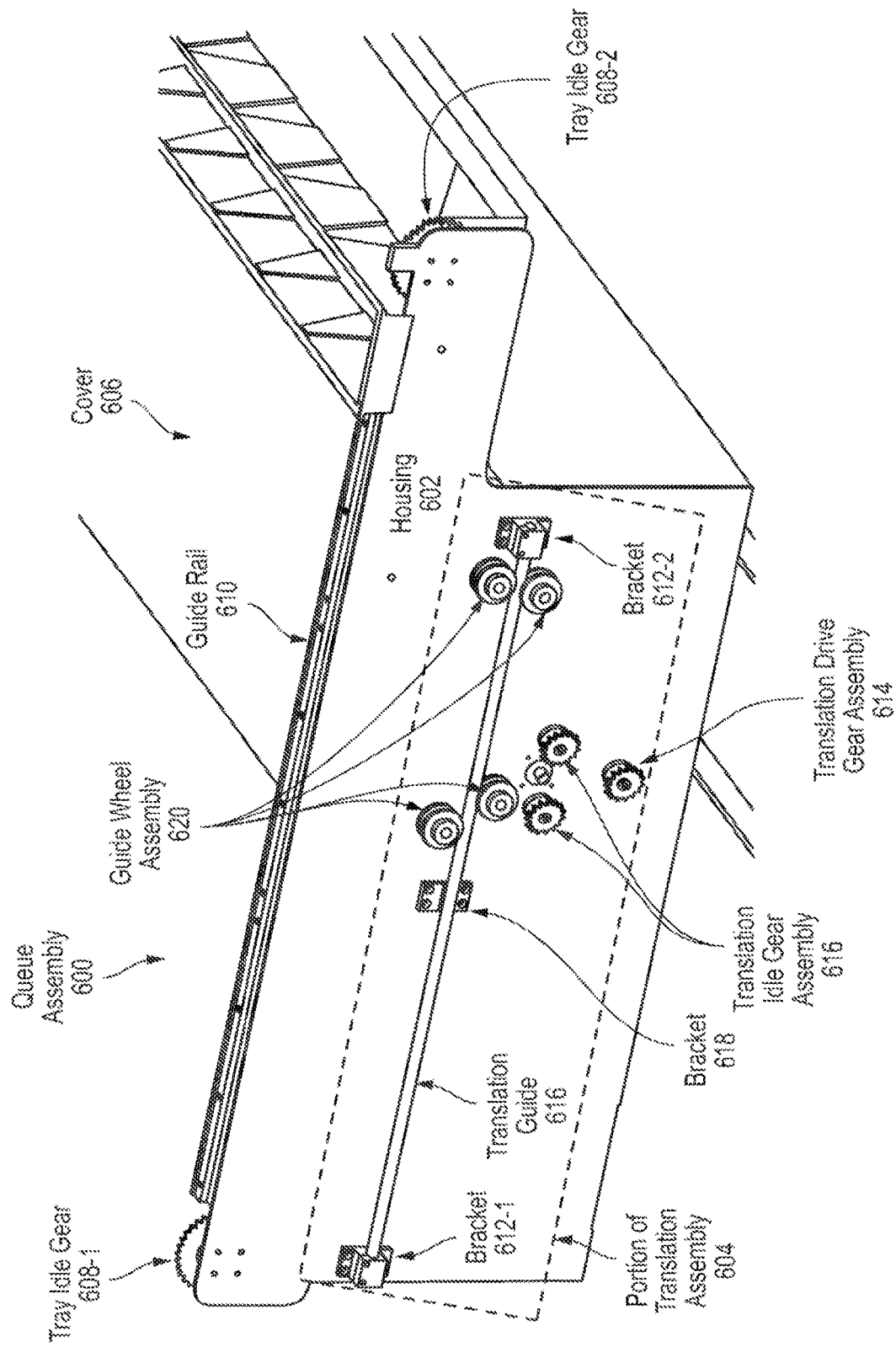
Figure 98:
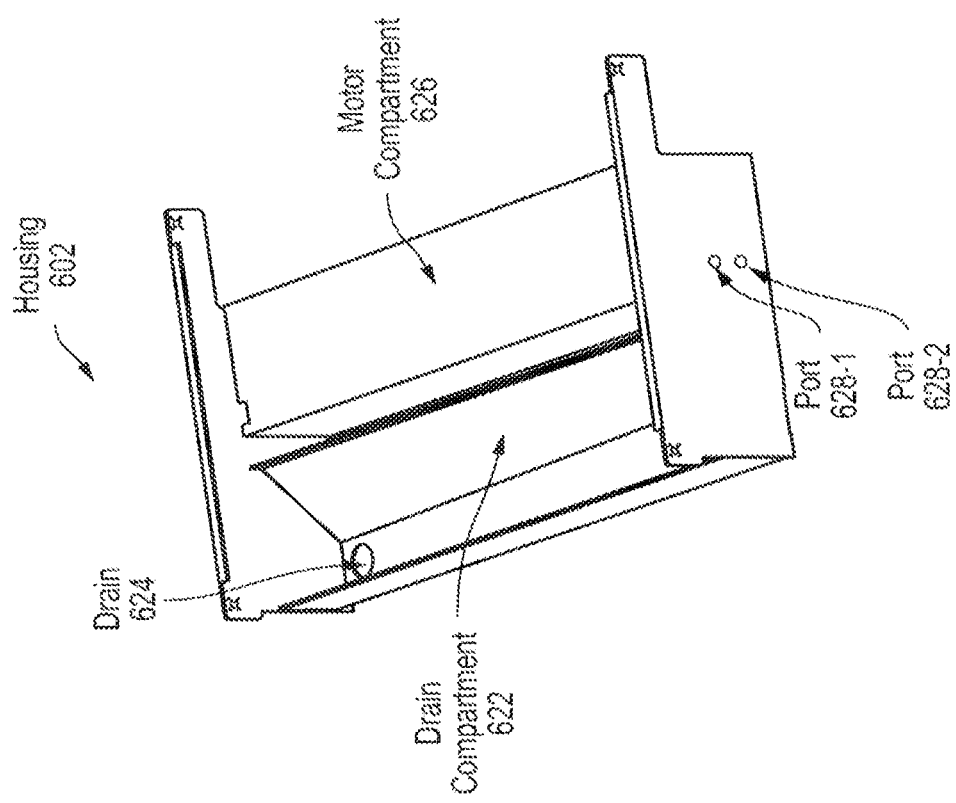
Figure 97:
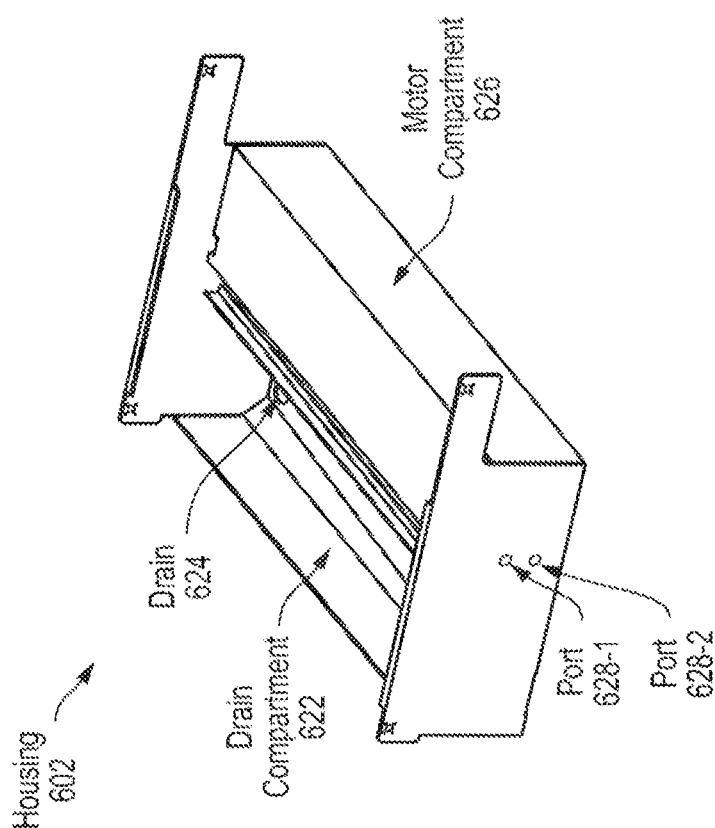
Figure 99:
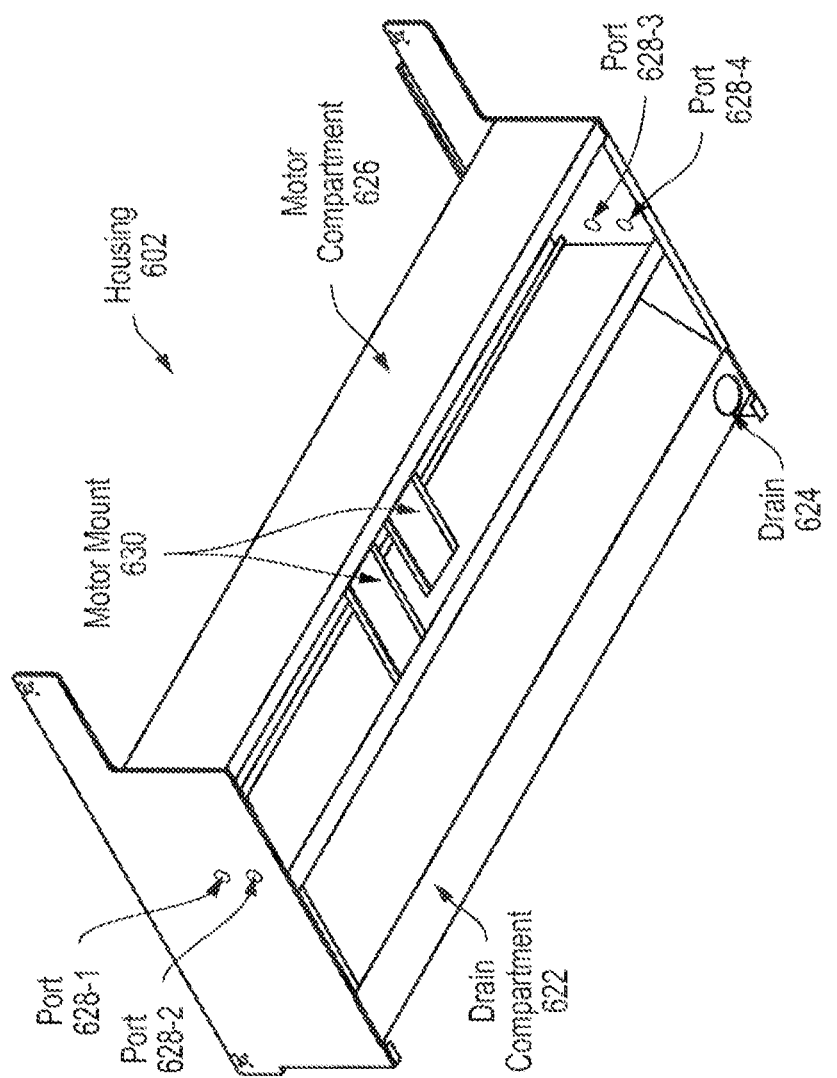
Figure 101:
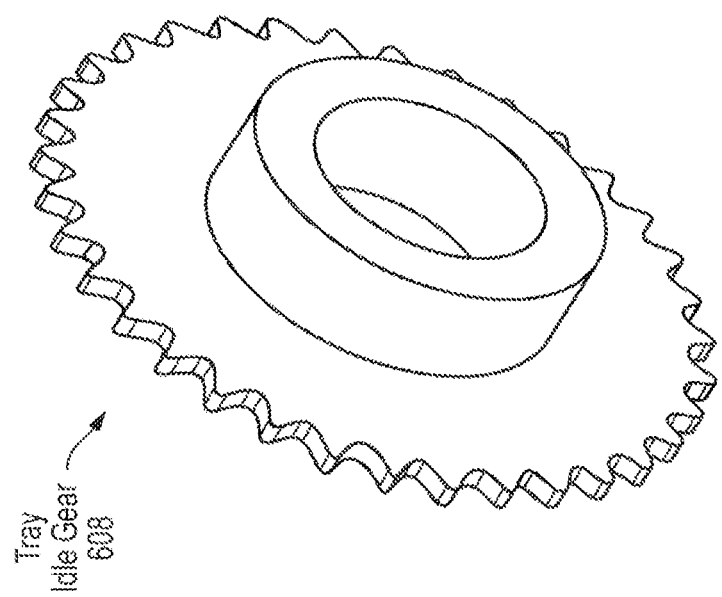

The tray drive assembly can be similarly positioned to that of the drive assembly 604. It may be mounted within compartment 626 and extent through ports 628-4 and 628-3. The tray drive assembly can also include motor 644, shafts 638-1 and 638-2, and tray drive gear assemblies 646. A difference is that the keyed spur gear 650 used to drive the chain (not shown) is inwardly mounted which is opposite to that of the translation gear drive assembly 614. This chain (not shown) used for driving trays 104 may also be different in that it is a continuous loop (like that of a bicycle) which engages tray idle gears 608 (examples of which are depicted in FIGS. 101 and 96). Thus, trays 104 may ride on guide rail 610 and be pulled by a chain (not shown) driven next to guide 610 (as depicted in FIG. 96).

Now turning to FIGS. 114 to 127, an alternate loading arm 530-B can be shown (which is used in conjunction with loader 500-B). This example loading arm assembly 530-B depicted can include an arm 542-B with a frame 708, rail 714, a swing assembly 712, mounting brackets 710, and a mounting plate 706. As shown in this example, the rail 714 can be rotatably secured (e.g., with a hinge) to the frame 708. The swing assembly 712 (which includes motor 720, gearbox 722, and linear actuator 724) can then be secured to the rail 714 and frame 708 so as to allow the rail to be "swung down" and to allow greater mobility when moving trays 104. The frame 708 can also be secured to the cross-member 524 by way of mounting plate 706. The end-effector 532-B may also be secured to the end of the rail 714 opposite the frame 708.

Figure 117:
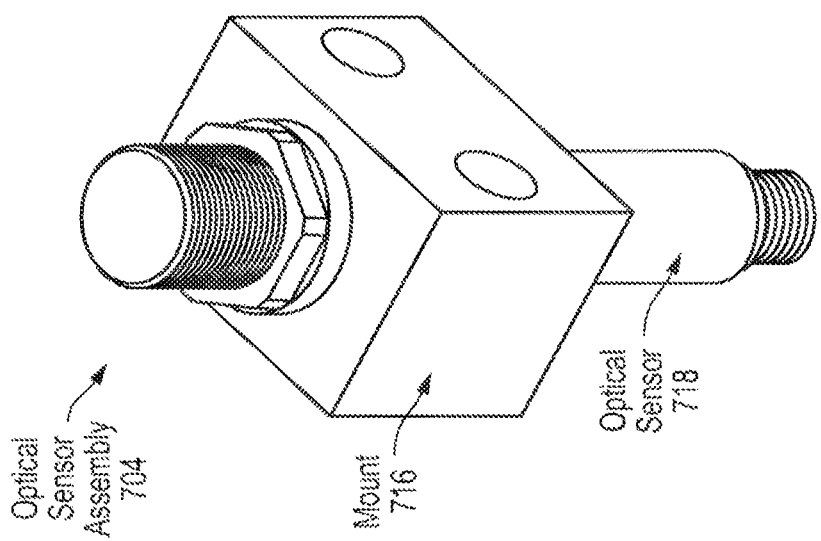
Figure 119:
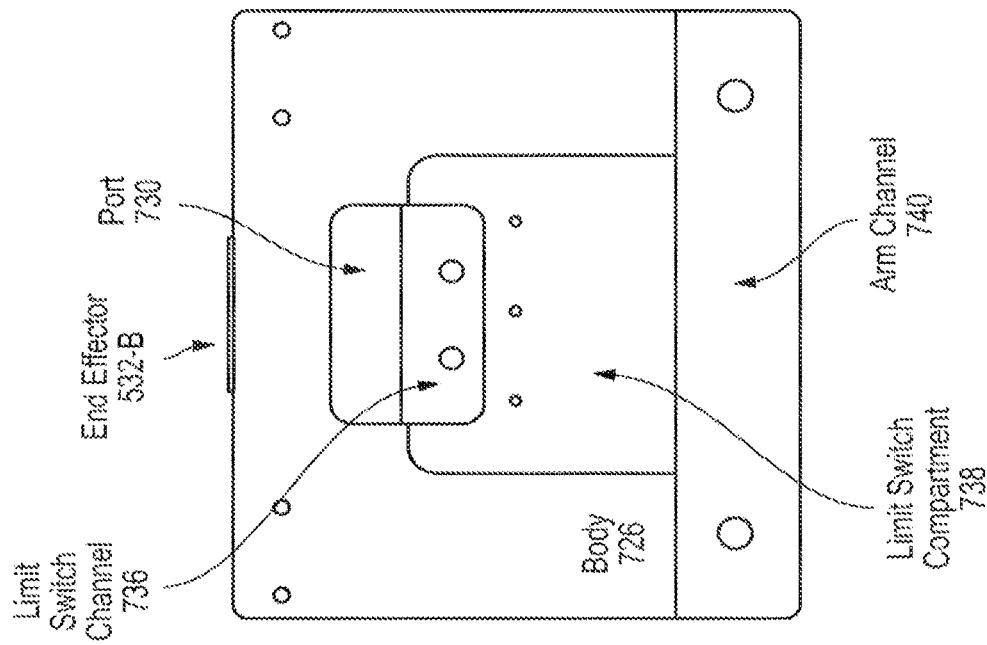
Figure 120:
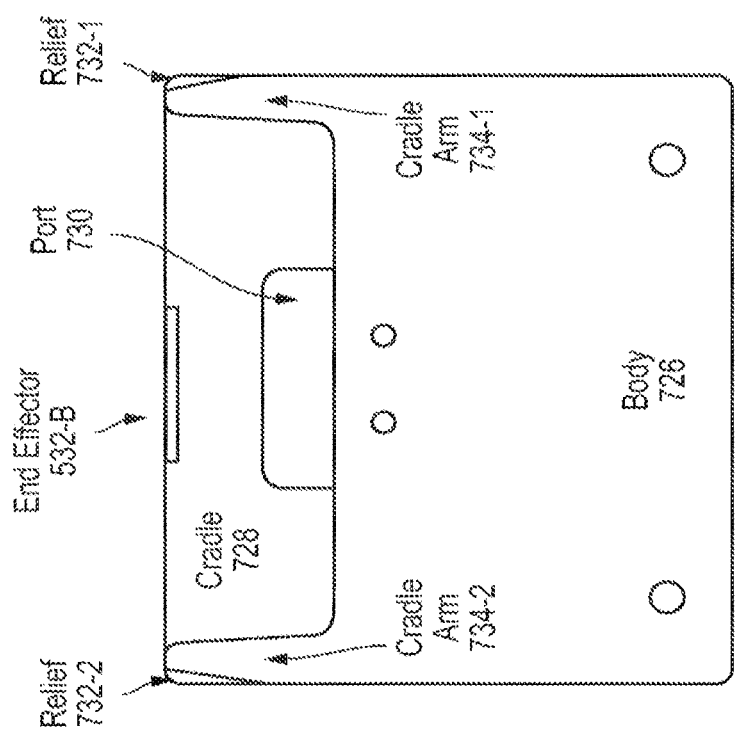
Figure 124:
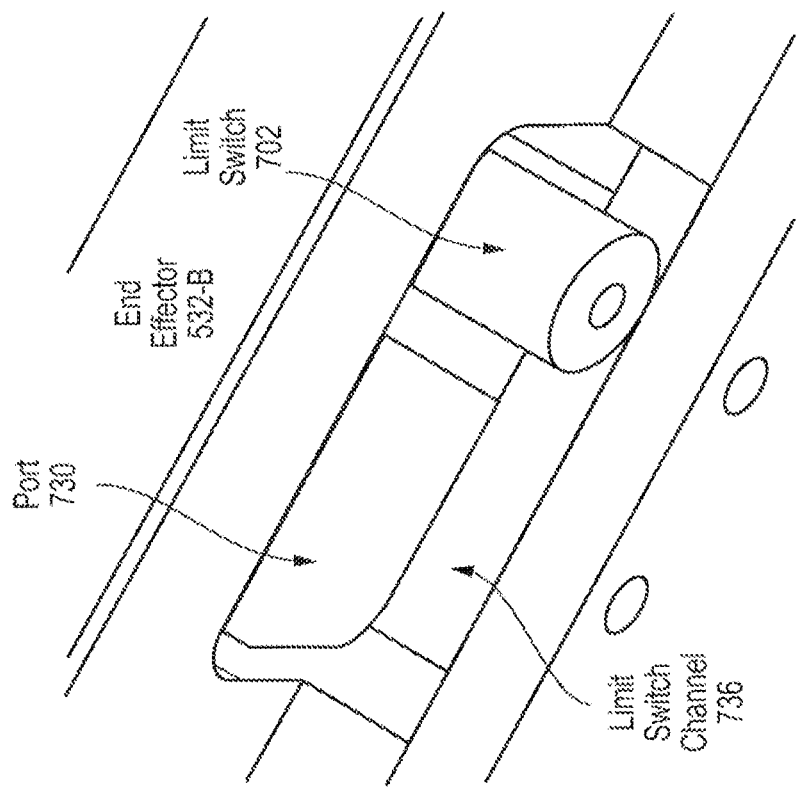
Figure 123:
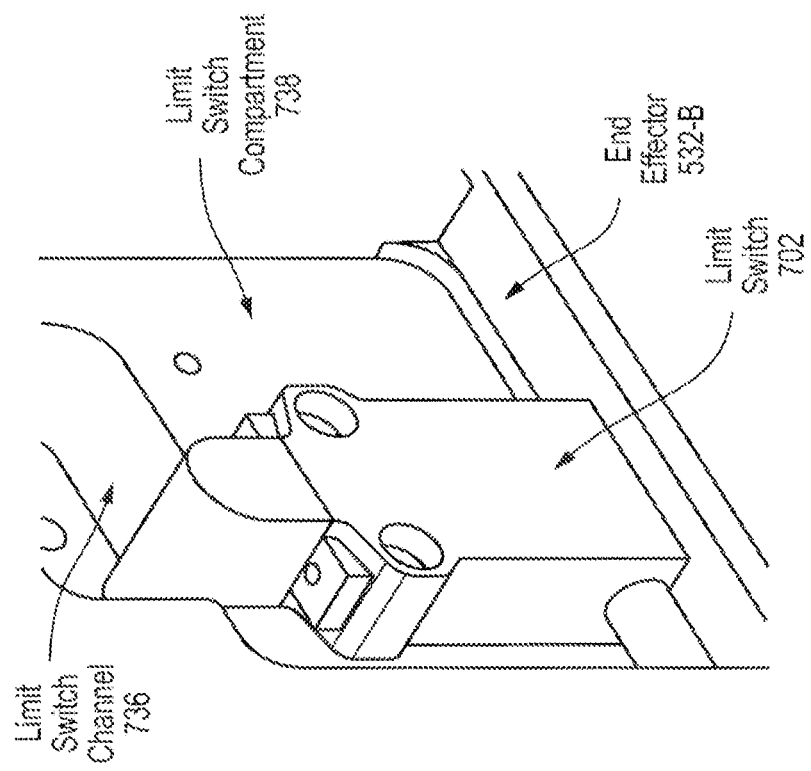
Figure 127:
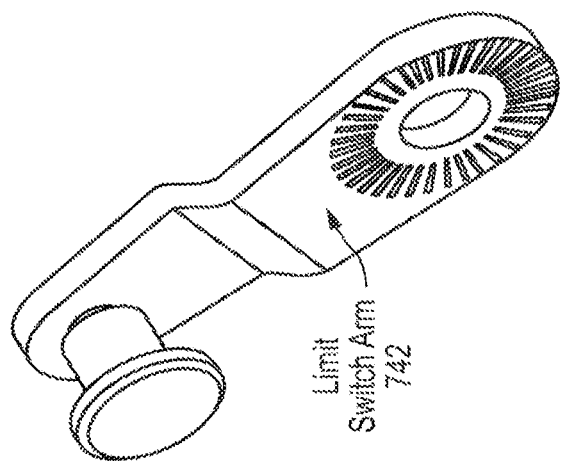
Figure 126:
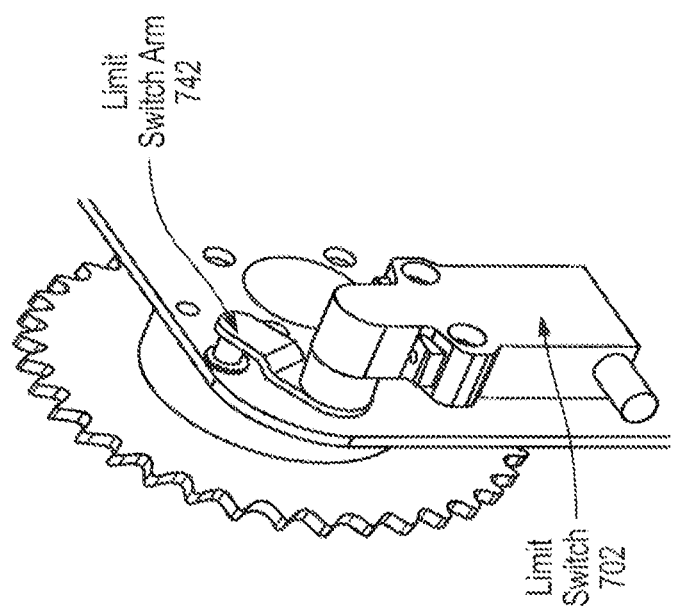
Figure 125:
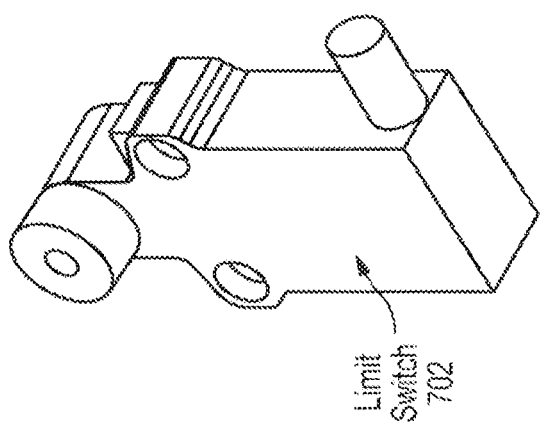

The end effector 532-B can generally perform the same function as end effector 532-A, but is configured for greater mobility. An example of this end effector 532-B can be seen in FIGS. 120-122. Overall, the end effector 532-B can have body 726 with a generally parallelepiped shape having front, rear, top and bottom surfaces. In this example depicted, there is an arm channel 740 formed in the front face along the periphery adjacent to the bottom face. This arm channel 740 depicted can be dimensions to receive the end of the rail 714 and may include one or more countersunk bolt holes to secure the end effector 532-B to rail 714. Above arm channel 740, a limit switch compartment 738 can be formed in the front face of the body 726 and generally in the center. As shown in this example, the depth of the arm channel 740 is greater than that of the limit switch compartment 738 with both having a generally square shape. Along a portion of the upper periphery of the limit switch compartment 738, a limit switch channel 736 may be formed having a generally rectangular shape. This limit switch channel 736 has a greater depth than that of the limit switch compartment 738. Again, in this example, a port 730 can be formed in the front face (which extend through the body 726) adjacent to the limit switch channel 736. Then, again as depicted in this example, there is a cradle 728 formed in the rear face along the periphery between the rear and top faces of the body 726. The cradle 728 shown in this example is a channel bounded by cradle arms 734-1 and 734-2 and exposing the port 730 and limit switch channel 736 (at the bottom of the cradle 728). The edges of the cradle arms 734-1 and 734-2 also include reliefs 732-1 and 732-2. Moreover, there may be a relief formed on the outer periphery of the cradle arms 734-1 and 734-2. An optical sensor assembly 704 (an example of which is depicted in FIG. 117 and which includes a mount 716 and optical sensor 718) can be secured (e.g., bolted) to the front face of the body 726. A limit switch 702 can then be secured (e.g., bolted) to the body 726 in the limit switch compartment 738 with its head extending into the channel 736. The limit switch arm 742 can then extend from the head of the limit switch 702 through the port 730 so that a tray 104 can actuate the switch 702. As shown in FIG. 117, the optical sensor 718 may be an axial (diffuse) sensor commonly available for automated application, but for the sake of clarity the cable associated with the sensor 718 has been omitted.

Having thus described the present disclosure by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present disclosure may be employed without a corresponding use of the other features. Accordingly, it is appropriate that the appended claims be construed broadly.

The invention claimed is:

1. An apparatus comprising:
    a service frame;
    a queue;
    a loader that is secured to the queue, wherein the loader comprises:
        a track assembly that is configured to travel between a plurality of levels of the service frame;
        a carriage that is secured to the track assembly, wherein the carriage is configured to move a tray between the queue and an aligned trough assembly from a plurality of trough assemblies of a grow frame;
        a first dolly staging rail and a second dolly staging rail substantially parallel to one another, wherein the first and second dolly staging rails are secured to the loader and spaced apart from one another by a distance;
    a light maintenance dolly that is secured to the loader, the light maintenance dolly including:
        a rolling frame that is dimensioned to span the distance, wherein the rolling frame is configured to rest on the first and second dolly staging rails during travel between the plurality of levels; and
        a plurality of panel lifters, wherein each panel lifter is secured to at the rolling frame, wherein each panel lifter includes:
            an upper mounting bracket having a top face and a bottom face, wherein the upper mounting bracket further comprises:
                a first opening formed in the bottom face of upper mounting bracket and that extends into the upper mounting bracket;
                a second opening formed in the top face of the upper mounting bracket and that extends into the upper mounting bracket, wherein the second opening is substantially aligned with the first opening, and wherein the second opening is smaller than the first opening, and wherein the first and second openings intersect; and
                a third opening that extends through the upper mounting bracket from its top face to its bottom face, wherein the third opening is spaced apart from the first and second openings;
            a lower mounting bracket; and
            a lift bracket.

2. The apparatus of claim 1, wherein the queue comprises a gravity fed roller assembly.

3. The apparatus of claim 1, further comprising:
    a first and second lift arms that are substantially parallel to one another, wherein each panel lifter is secured to at least one of the first and second lift arms.

4. The apparatus of claim 1, wherein the lower mounting bracket with a top face, a bottom face, and a rear face, wherein the lower mounting bracket further comprises:
    a plurality of motor mount openings that extend through the lower mounting bracket from the top face to the bottom face;
    a fourth opening formed in the bottom face of the lower mounting bracket and that extends into the lower mounting bracket;
    a fifth opening formed in the top face of the lower mounting bracket and that extends into the lower mounting bracket, wherein the fourth opening is substantially aligned with the fifth opening, and wherein the fifth opening is smaller than the fourth opening, and wherein the fourth and fifth openings intersect; and
    a sixth opening that extends through the lower mounting bracket from its top face to its bottom face, wherein the sixth opening is spaced apart from the fourth and fifth openings.

5. The apparatus of claim 4, wherein the lower mounting bracket further comprises:
    a relief formed in the lower mounting bracket that extends from the rear face of the lower mounting bracket to the fourth and fifth openings; and
    a countersunk tap formed in the rear face of the lower mounting bracket and that extends through the lower mounting bracket, wherein the countersunk tap extends across the relief.

6. The apparatus of claim 4, wherein the lift bracket has a top face and a bottom face, wherein the lift bracket further comprises:
    seventh and eighth openings that extend through the lift bracket from its top face to its bottom face;
    a first bearing secured in the seventh opening;
    a linkage secured in the eighth opening, and
    a guide that extends through the first bearing and that is secured in the sixth openings.

7. The apparatus of claim 4, wherein the lift bracket further comprises:
    a second bearing secured in the first opening;
    a third bearing secured in the fourth opening, and
    a leadscrew having a first shoulder and a second shoulder with a threaded member extending therebetween, wherein the first shoulder extends through the second bearing and at least a portion of the second opening, and wherein the second shoulder extends through the third bearing and the fifth opening, and wherein the threaded member extends through and engages a linkage.

8. The apparatus of claim 1, further comprising
    a motor secured to the lower mounting bracket through a plurality of motor mount openings, wherein the motor has a drive shaft; and
    a transmission that is secured to the drive shaft and a second shoulder of a leadscrew.

9. The apparatus of claim 1, wherein the carriage further comprises:
    a pair of opposing loading arm assemblies; and
    a cross-member that spans a distance between the opposing loading arm assemblies.

10. The apparatus of claim 9, wherein the cross-member further comprises;
   a top panel; and
   a pair of opposing side panels.

11. The apparatus of claim 10, wherein the top panel further comprises:
   a top face and a bottom face;
   a number of supports extending generally perpendicular from the bottom face; and
   a number of ports formed in the top panel.

12. The apparatus of claim 10, wherein the side panels further comprise:
   a center panel; and
   opposing side supports extending generally perpendicular from a front face of the center panel;
   a bottom support extending between the side supports generally perpendicular to the front face of its center panel;
   a pair of cross-supports extending from a rear face of the center panel.

13. The apparatus of claim 12, wherein the cross-supports of the side panels are secured to the side panels and top panel to prevent inwardly bending of the side panels when the cross-member is under load.

14. The apparatus of claim 10, wherein the side panels further comprise:
   a plurality of notches configured to allow for uninhibited operation of portions of drive assemblies of the loader; and
   a plurality of ports configured to allow for at least one of weight reduction, securing the loading arm assemblies to respective center panels, securing the loading arm assemblies to the cross member, and combinations thereof.

15. An apparatus comprising:
   a service frame;
   a queue;
   a loader that is secured to the queue, wherein the loader comprises:
      a track assembly that is configured to travel between a plurality of levels of the service frame;
      a carriage that is secured to the track assembly, wherein the carriage is configured to move a tray between the queue and an aligned trough assembly from a plurality of trough assemblies of a grow frame;
      a first dolly staging rail and a second dolly staging rail substantially parallel to one another, wherein the first and second dolly staging rails are secured to the loader and spaced apart from one another by a distance;
   a light maintenance dolly that is secured to the loader, the light maintenance dolly including:
      a rolling frame that is dimensioned to span the distance, wherein the rolling frame is configured to rest on the first and second dolly staging rails during travel between the plurality of levels; and
      a plurality of panel lifters, wherein each panel lifter is secured to at the rolling frame, wherein each panel lifter includes:
         an upper mounting bracket;
         a lower mounting bracket having a top face, a bottom face, and a rear face, wherein the lower mounting bracket further comprises:
            a plurality of motor mount openings that extend through the lower mounting bracket from the top face to the bottom face;
            a fourth opening formed in the bottom face of the lower mounting bracket and that extends into the lower mounting bracket;
            a fifth opening formed in the top face of the lower mounting bracket and that extends into the lower mounting bracket, wherein the fourth opening is substantially aligned with the fifth opening, and wherein the fifth opening is smaller than the fourth opening, and wherein the fourth and fifth openings intersect; and
            a sixth opening that extends through the lower mounting bracket from its top face to its bottom face, wherein the sixth opening is spaced apart from the fourth and fifth openings; and
         a lift bracket.

16. The apparatus of claim 15, wherein the queue comprises a gravity fed roller assembly.

17. The apparatus of claim 15, further comprising:
   a first and second lift arms that are substantially parallel to one another, wherein each panel lifter is secured to at least one of the first and second lift arms.

18. The apparatus of claim 15, wherein the upper mounting bracket has a top face and a bottom face, wherein the upper mounting bracket further comprises:
   a first opening formed in the bottom face of upper mounting bracket and that extends into the upper mounting bracket;
   a second opening formed in the top face of the upper mounting bracket and that extends into the upper mounting bracket, wherein the second opening is substantially aligned with the first opening, and wherein the second opening is smaller than the first opening, and wherein the first and second openings intersect; and
   a third opening that extends through the upper mounting bracket from its top face to its bottom face, wherein the third opening is spaced apart from the first and second openings.

19. The apparatus of claim 15, wherein the lower mounting bracket further comprises:
   a relief formed in the lower mounting bracket that extends from the rear face of the lower mounting bracket to the fourth and fifth openings; and
   a countersunk tap formed in the rear face of the lower mounting bracket and that extends through the lower mounting bracket, wherein the countersunk tap extends across the relief.

20. The apparatus of claim 15, wherein the lift bracket further comprises:
   a second bearing secured in the first opening;
   a third bearing secured in the fourth opening; and
   a leadscrew having a first shoulder and a second shoulder with a threaded member extending therebetween, wherein the first shoulder extends through the second bearing and at least a portion of the second opening, and wherein the second shoulder extends through the third bearing and the fifth opening, and wherein the threaded member extends through and engages a linkage.

* * * * *